United States Patent
Aikoh et al.

(10) Patent No.: US 9,811,465 B2
(45) Date of Patent: Nov. 7, 2017

(54) COMPUTER SYSTEM AND CACHE CONTROL METHOD

(71) Applicant: Hitachi, Ltd., Chiyoda-ku, Tokyo (JP)

(72) Inventors: Kazuhide Aikoh, Tokyo (JP); Keisuke Hatasaki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 393 days.

(21) Appl. No.: 14/412,335

(22) PCT Filed: Jul. 2, 2013

(86) PCT No.: PCT/JP2013/068135
§ 371 (c)(1),
(2) Date: Dec. 31, 2014

(87) PCT Pub. No.: WO2014/007249
PCT Pub. Date: Jan. 9, 2014

(65) Prior Publication Data
US 2015/0161051 A1    Jun. 11, 2015

(30) Foreign Application Priority Data

Jul. 5, 2012 (WO) .................. PCT/JP2012/004360

(51) Int. Cl.
*G06F 12/00* (2006.01)
*G06F 12/0831* (2016.01)
(Continued)

(52) U.S. Cl.
CPC ...... *G06F 12/0833* (2013.01); *G06F 9/45558* (2013.01); *G06F 12/084* (2013.01);
(Continued)

(58) Field of Classification Search
USPC ......................................... 711/119
See application file for complete search history.

(56) References Cited

U.S. PATENT DOCUMENTS 6,092,097 A    7/2000  Suzuoka 8,799,396 B2 *  8/2014  Grevers .............. H04L 67/2842
                                                 709/213
(Continued)

FOREIGN PATENT DOCUMENTS

JP    5-216760 A    8/1993
JP    6-266683 A    9/1994
(Continued)

OTHER PUBLICATIONS

International Search Report (PCT/ISA/210) dated Sep. 17, 2013, with English translation (two (2) pages).

*Primary Examiner* — Adam M Queler
*Assistant Examiner* — Edmund Kwong
(74) *Attorney, Agent, or Firm* — Crowell & Moring LLP

(57) ABSTRACT

A plurality of nodes includes an I/O (Input/Output) node and a plurality of computation nodes. Each computation node sends an I/O request to the I/O node. The I/O node includes a first storage device which stores data to be written or read according to the I/O request and a first memory device on which a first cache area is based to temporarily store the data written in the first storage device or read from the first storage device. The computation node includes a second memory device on which the second cache area is based to temporarily store the data according to the I/O request. At least one of the I/O node and the computation node stores management information which contains information on a physical storage area in the cache area of the other one of the I/O node and the computation node, and information on a virtual storage area which is associated with the physical storage area and has a part of its own cache area. A target node in the plurality of nodes controls arrangement of data stored in the second cache area based on the management information of the computation node or the management information of the I/O node.

14 Claims, 46 Drawing Sheets

(51) Int. Cl.
*G06F 9/455* (2006.01)
*G06F 12/0811* (2016.01)
*G06F 12/0817* (2016.01)
*G06F 12/084* (2016.01)
*G06F 12/0871* (2016.01)
*H04L 29/08* (2006.01)

(52) U.S. Cl.
CPC ...... *G06F 12/0811* (2013.01); *G06F 12/0817* (2013.01); *G06F 12/0871* (2013.01); *G06F 2212/1044* (2013.01); *G06F 2212/1048* (2013.01); *G06F 2212/283* (2013.01); *G06F 2212/62* (2013.01); *H04L 67/1002* (2013.01)

(56) References Cited

U.S. PATENT DOCUMENTS

| | | | |
|---|---|---|---|
| 2009/0150511 A1* | 6/2009 | Gross | G06F 12/0813 709/213 |
| 2013/0042066 A1* | 2/2013 | Price | G06F 12/0866 711/119 |

FOREIGN PATENT DOCUMENTS

| | | |
|---|---|---|
| JP | 2002-99465 A | 4/2002 |
| JP | 2003-150445 A | 5/2003 |

* cited by examiner

FIG. 6

| Capacity (GB) 21211 | Usage (GB) 21212 | Physical address 21213 | 2121 |
|---|---|---|---|
| 32 | 10 | 0 | |
| | | 1 | |
| | | 2 | |

FIG. 7

| Page number 21221 | Physical address 21222 | Data 21223 | Valid bit 21224 | 2122 |
|---|---|---|---|---|
| 0 | 3 | a | Valid | |
| 2 | 2 | b | Invalid | |

FIG. 8

| Node identifier 31211 | Communication mode 31212 | Capacity (GB) 31213 | Usage (GB) 31214 | 3121 |
|---|---|---|---|---|
| 0 | Memory reference | 64 | 50 | |
| | | 64 | 30 | |
| A | RDMA | 32 | 10 | |
| B | RDMA | 32 | 20 | |
| C | RDMA | 32 | 10 | |

FIG. 9

| Page number 31221 | Virtual address 31222 | Valid bit 31223 | 3122 |
|---|---|---|---|
| 0 | 3 | Valid | |
| 1 | - | Invalid | |
| 2 | 5 | Invalid | |
| 3 | 2 | Valid | |
| 4 | - | Valid | |

FIG. 10

| Virtual address (31231) | Attribute value (31232) | Physical location (31233) | Physical address (31234) | Utilization status (31235) |
|---|---|---|---|---|
| 0 | Extension | Local memory | 0 | Used |
| 1 | | | 1 | Unused |
| 2 | Shared | | 2 | Used |
| 3 | Virtual A | Computation node A | 0 | Used |
| 4 | | | 1 | Unused |
| 5 | Virtual B | Computation node B | 0 | Used |
| 6 | | | 1 | Unused |
| 7 | Virtual C | Computation node C | 0 | Unused |
| 8 | | | 1 | Unused |

3123

| Virtual address | Attribute value | Physical location | Physical address | Utilization status |
|---|---|---|---|---|
| 0 | Extension | I/O node | 0 | Used |
| 1 | | | 1 | Unused |
| 2 | Shared | | 2 | Used |
| 3 | Virtual A | Computation node A | 0 | Used |
| 4 | | | 1 | Unused |
| 5 | Virtual B | Computation node B | 0 | Used |
| 6 | | | 1 | Unused |
| 7 | Virtual C | Computation node C | 0 | Unused |
| 8 | | | 1 | Unused |

| 31231 | 31232 | 31233 | 31234 | 31235 |
|---|---|---|---|---|
| Virtual address | Attribute value | Physical location | Physical address | Utilization status |
| 0 | Extension | Local memory | 0 | Used |
| 1 | | | 1 | Unused |
| 2 | Shared | | 2 | Used |

FIG. 35

| Physical location | Capacity (GB) | Usage (GB) | Physical address |
|---|---|---|---|
| Local | 32 | 10 | 0 |
| | | | 1 |
| | | | 2 |
| Remote | 10 | 5 | — |
| | | | — |
| | | | — |

| Computation node identifier | Application identifier |
|---|---|
| Computation node A | Work 1 |
| | Work 2 |
| Computation node B | Work 3 |
| | Work 4 |
| Computation node C | Work 5 |

| Virtual address (51231) | Attribute value (51232) | Physical location (51233) | Utilization status (51234) |
|---|---|---|---|
| 0 | Extension | I/O node memory | Used |
| 1 | Extension | I/O node memory | Unused |
| 2 | Shared | I/O node memory | Used |
| 3 | Virtual A | Computation node A | Used |
| 4 | Virtual A | Computation node A | Unused |
| 5 | Virtual B | Computation node B | Used |
| 6 | Virtual B | Computation node B | Unused |
| 7 | Virtual C | Computation node C | Unused |
| 8 | Virtual C | Computation node C | Unused |

FIG. 46

| Physical location | Capacity (GB) | Usage (GB) | Physical address |
|---|---|---|---|
| Local memory | 32 | 10 | 0 |
| | | | 1 |
| | | | 2 |
| | | | --- |
| Remote memory | 10 | 5 | --- |
| | | | --- |
| | | | --- |
| Local disk | 1000 | 500 | 0 |
| | | | 1 |
| | | | 2 |
| | | | --- |
| Remote disk | 300 | 200 | --- |
| | | | --- |
| | | | --- |

| Virtual address | Attribute value | Physical location | Physical address | Utilization status |
|---|---|---|---|---|
| 0 | Extension | I/O node | 0 | Used |
| 1 | | | 1 | Unused |
| 2 | Shared | | 2 | Used |
| 3 | Storage device | | 0 | Used |
| 4 | | | 1 | Unused |
| 5 | Virtual A | Computation node A | 0 | Used |
| 6 | | | 1 | Unused |
| 7 | Storage device | | 0 | Used |
| 8 | | | 1 | Unused |
| 9 | Virtual B | Computation node B | 0 | Used |
| 10 | | | 1 | Unused |
| 11 | Storage device | | 0 | Used |
| 12 | | | 1 | Unused |
| 13 | Virtual C | Computation node C | 0 | Unused |
| 14 | | | 1 | Unused |

COMPUTER SYSTEM AND CACHE CONTROL METHOD

TECHNICAL FIELD

The present invention relates to cache control.

BACKGROUND ART

For the purpose of utilizing the big data, attention to the high-speed analysis technology of big data is increasing. An IT platform capable of accessing large amounts of data at high speeds is needed to realize this high-speed analysis technology.

To meet this requirement, for example, Patent Literature 1 discloses a parallel processor having multiple processors, a distributed shared memory (cache memory) provided for each processor, and an information transfer line therebetween. Specifically, each processor is able to store data, which is being held in a distributed shared memory of another processor, in its own distributed shared memory as needed. That is, each processor disclosed in Patent Literature 1 is able to share data with another processor using the distributed shared memory. Thus, the entire parallel processor is able to access large amounts of data at high speeds without increasing the capacity of the distributed shared memory.

However, in a case where the capacity of the distributed shared memory is large enough to be able to store all the data targeted by an application pursuant to processing large amounts of data, the distributed shared memory, although fast, becomes very expensive. For this reason, it is conceivable that an I/O (Input/Output) node, which comprises a nonvolatile storage device and a cache memory for temporarily storing data to be input/output to/from this storage device, be coupled to a processor (computation node) comprising a cache memory, frequently used data be stored in the cache area of the processor, and infrequently used data be stored in the I/O node storage device.

For example, Patent Literature 2 discloses a technology for hierarchizing a storage area, which includes the computation node cache memory, the I/O node cache memory, and the I/O node storage device, linking this hierarchized storage area to the processing of an application, and arranging data required by the application in a storage area belonging to a prescribed tier.

CITATION LIST

Patent Literature

[PTL 1]
Japanese Patent Application Laid-open No. H06-266683
[PTL 2]
Japanese Patent Application Laid-open No. 2003-150445

SUMMARY OF INVENTION

Technical Problem

However, in Patent Literature 2, the management of the cache memory in the computation node and the management of the cache memory in the I/O node are independent of one another. The management of a cache memory is optimized for the node (the I/O node or the computation node) comprising the cache memory. Therefore, cache memory utilization efficiency deteriorates in a computer system, which comprises multiple computation nodes and I/O nodes (I/O nodes, which are examples of computers) coupled thereto. For example, the same data could remain in both the computation node cache memory and the I/O node cache memory, or infrequently used data could be left in the cache memory.

Solution to Problem

A plurality of nodes includes an I/O (Input/Output) node and a plurality of computation nodes. Each computation node sends an I/O request to the I/O node. The I/O node includes a first storage device which stores data to be written or read according to the I/O request and a first memory device on which a first cache area is based to temporarily store the data written in the first storage device or read from the first storage device. The computation node includes a second memory device on which the second cache area is based to temporarily store the data according to the I/O request. At least one of the I/O node and the computation node stores management information which contains information on a physical storage area in the cache area of the other one of the I/O node and the computation node, and information on a virtual storage area which is associated with the physical storage area and has a part of its own cache area. A target node in the plurality of nodes controls arrangement of data stored in the second cache area based on the management information of the computation node or the management information of the I/O node. Further, the memory device may be a volatile memory such as a DRAM (Dynamic Random Access Memory), a nonvolatile memory such as a flash memory, or a device (for example, an SSD (Solid State Drive)) which includes one or a plurality of volatile or nonvolatile memories.

BRIEF DESCRIPTION OF DRAWINGS

FIG. 6 shows an example of a configuration management table 2121 of the computation node 2.

FIG. 7 shows an example of a cache management table 2122 of the computation node 2.

FIG. 8 shows an example of a configuration management table 3121 of the I/O node 3.

FIG. 9 shows an example of a cache management table 3122 of the I/O node 3.

FIG. 10 shows an example of an address management table 3133 of the I/O node 3.

FIG. 35 shows an example of the configuration management table 2121 of the computation node 2 related to Example 5.

FIG. 36 shows an example of a configuration management table 5121 of the management server 5 related to Example 5.

FIG. 38 shows an example of an address management table 5133 of the management server 5 related to Example 5.

FIG. 46 shows an example of the configuration management table 2121 of the computation node 2 related to Example 6.

FIG. 47 shows an example of an address management table 2133 of the computation node 2 related to Example 6.

DESCRIPTION OF EMBODIMENTS

A number of examples will be explained.

In the following explanation, various types of information may be explained using the expression "xxx table", but the various information may also be expressed using a data structure other than a table. To show that there is no dependence on the data structure, "xxx table" can be called "xxx information".

Furthermore, in the following explanation, there may be cases where processing is explained having a computer program as the doer of the action, but since stipulated processing is performed in accordance with a program being executed by a controller-equipped processor (for example, a CPU (Central Processing Unit)) while using a storage resource (for example, a memory) and a communication control device (for example, a communication port) as needed, the processor may also be regarded as the doer of the processing. A process, which is explained having the program as the doer of the action, may be regarded as a process performed by a controller, which comprises the processor executing this program, or an apparatus comprising this controller (for example, a computation node or an I/O node). Furthermore, either part or all of a program may be realized using dedicated hardware. The controller may comprise the dedicated hardware in addition to a processor. A computer program may be installed in respective computers from a program source. The program source, for example, may be either a program delivery server or a storage medium.

In the following explanation, in a case where like elements "ttt" are explained by distinguishing therebetween, these elements may be expressed by combining reference signs like "tttA" and "tttB", but when no particular distinction is made between these elements, the elements are described simply as "ttt".

Example 1

Figure 1:
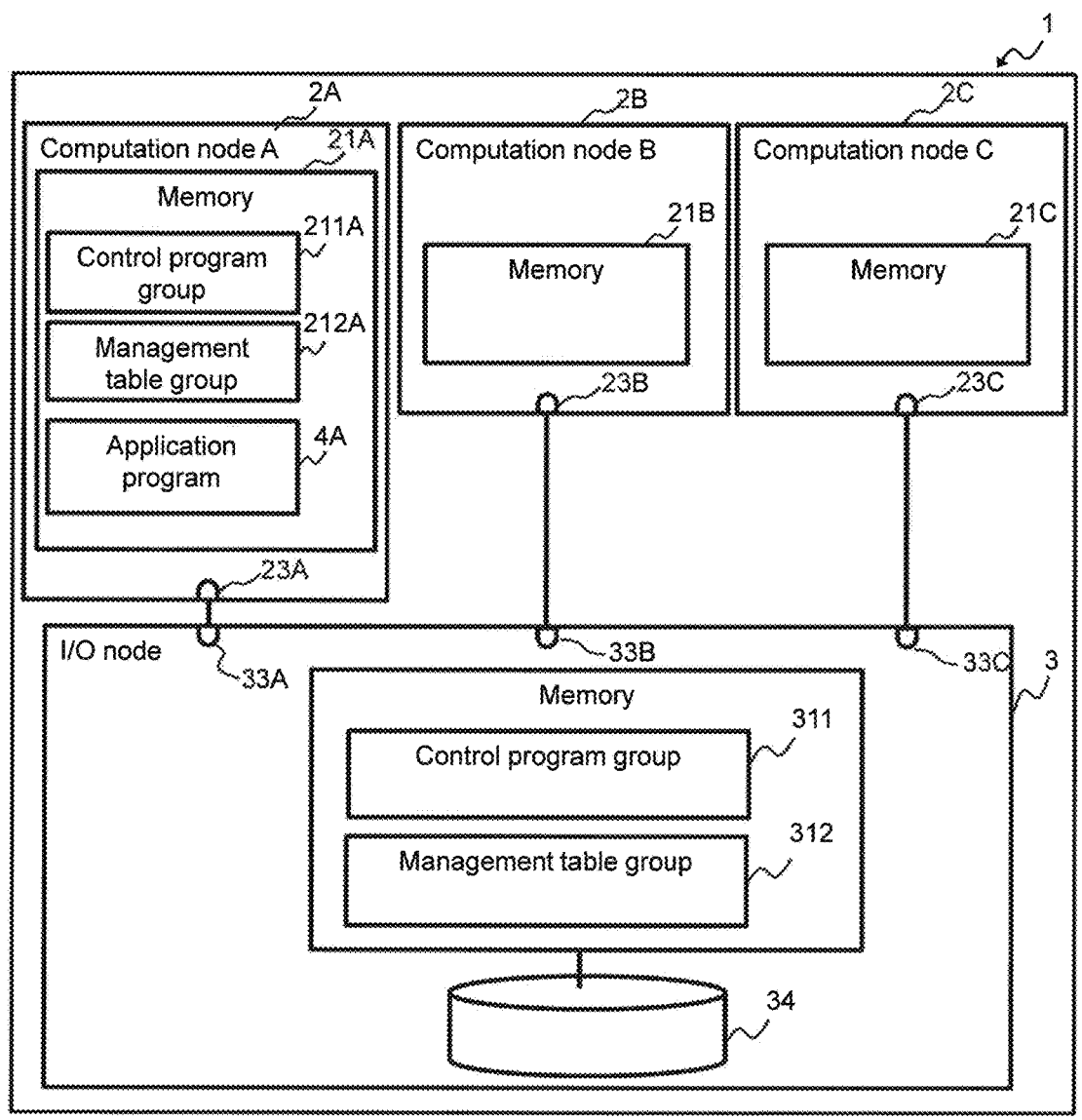
FIG. 1 is a block diagram showing an example of the entire configuration of a computer system related to Example 1.

FIG. 1 is a block diagram showing an example of the entire configuration of a computer system 1 related to Example 1. A computer system 1 comprises a computation node 2 and an I/O node 3, and these components (the computation node 2 and the I/O node 3) are installed in the same enclosure. The computation node 2 and the I/O node 3 are coupled inside the enclosure using a prescribed interface (for example, a PCI (Peripheral Components Interconnect bus)) 23, 33. The computation node 2, for example, is a host computer. The I/O node 3, for example, is a storage apparatus to which the host computer is coupled.

The computation node 2 and the I/O node 3 do not have to be disposed in the same enclosure. The computation node 2 and the I/O node 3 may also be coupled via a prescribed communication network (for example, a SAN (Storage Area Network)).

The computation node 2, for example, is a type of computer. The computation node 2 stores a control program group 211, a management table group 212, and an application program 4 in a memory 21. The application program 4 is software, which has been designed for a certain purpose (for example, software for enabling a computer to function as a word processor). The control program group 211 and the management table group 212 will be explained further below.

The I/O node 3, for example, is a type of input/output device, and specifically, as was explained hereinabove, is a storage apparatus. The I/O node 3 comprises a nonvolatile storage device 34 and a memory 31, and stores a control program group 211 and a management table group 212 in the memory 31.

Figure 2:
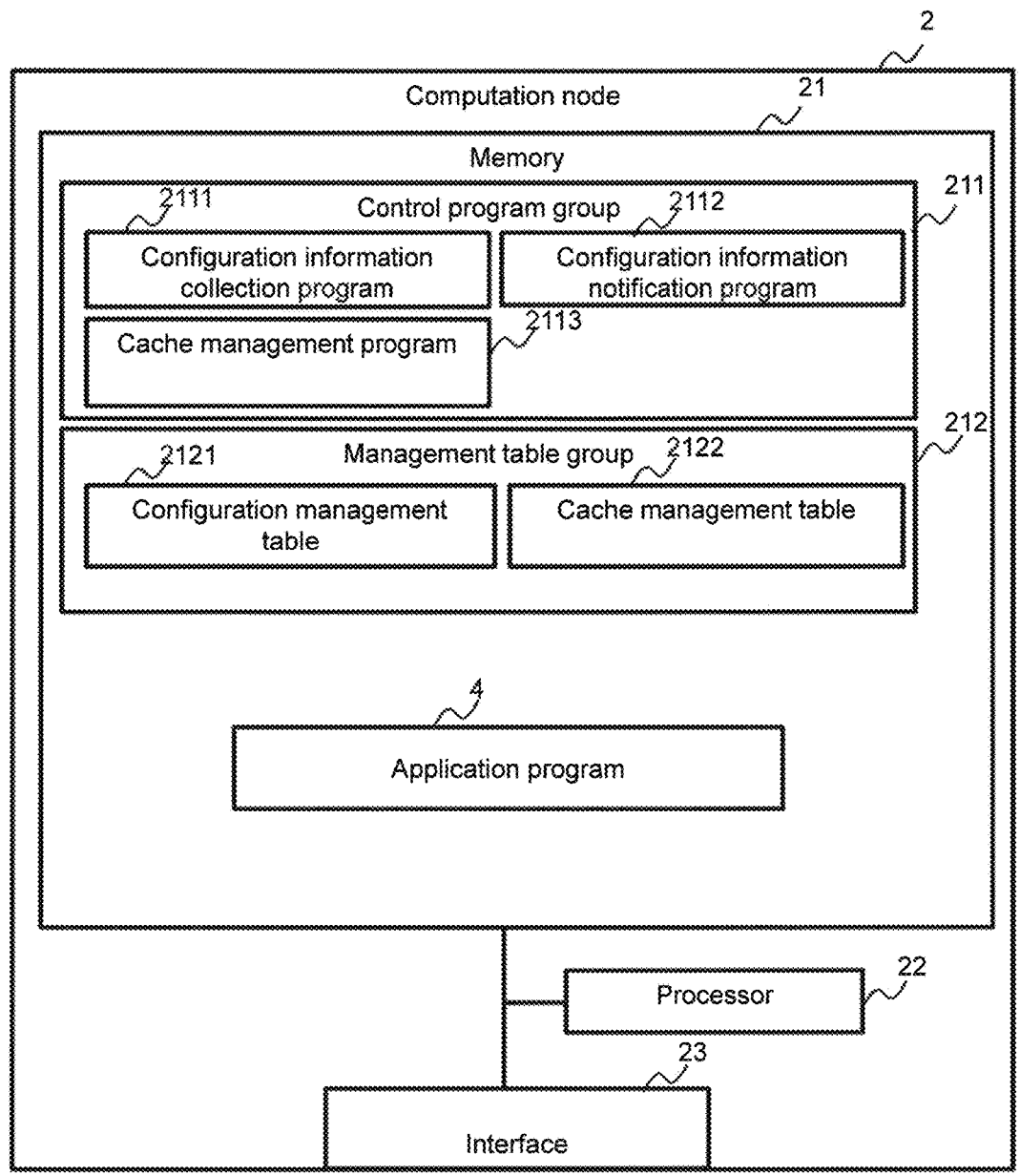
FIG. 2 is a block diagram showing an example of the configuration of a computation node 2.

FIG. 2 is a block diagram showing an example of the configuration of the computation node 2.

The computation node 2 comprises a memory 21, an interface 23, and a processor (for example, a CPU (Central Processing Unit)) 22 coupled thereto.

The processor 22 is responsible for controlling the operation of the computation node 2, and executes the necessary processing based on the control program group 211 and management table group 212 stored in the memory 21. The memory 21, in addition to being used to store the control program group 211 and the management table group 212, is also used as working memory for the processor 22. The interface 23 is a communication interface, and controls the protocol when the computation node 2 communicates with the I/O node 3.

The control program group 211 comprises a configuration information collection program 2111, a configuration information notification program 2112, and a cache management program 2113. The programs 2111 through 2113 in the drawing may be realized using a single program, or may be divided into either two or less, or four or more parts depending on the implementation.

The configuration information collection program 2111, for example, operates as an interface for configuring a configuration management table 2111, which will be explained further below. The configuration information collection program 2111, for example, configures and/or updates the configuration management table 2121 by invoking a setting API (Application Program Interface).

The configuration information notification program 2112 notifies the I/O node 3 of information being held in the configuration management table 2121 and information being stored in a cache management table 2122, which will be explained further below, when a not-shown OS (Operating System) of the computation node 2 is booted up, and in accordance with a request from a configuration information collection program 3111 and a shared cache management program 3112 of the I/O node 3, which will be explained further below.

The cache management program 2113 stores data from the I/O node 3 (the memory 31 or the storage device 34) in a local cache area 215, and updates the data stored in the local cache area 215 in accordance with a request from the application program 4. Specifically, for example, the cache management program 2113 adds an entry to a cache management table 2122 and updates the entry.

The management table group 212 comprises the configuration management table 2121 and the cache management table 2122. These management tables 2121 and 2122 will be explained further below.

Figure 3:
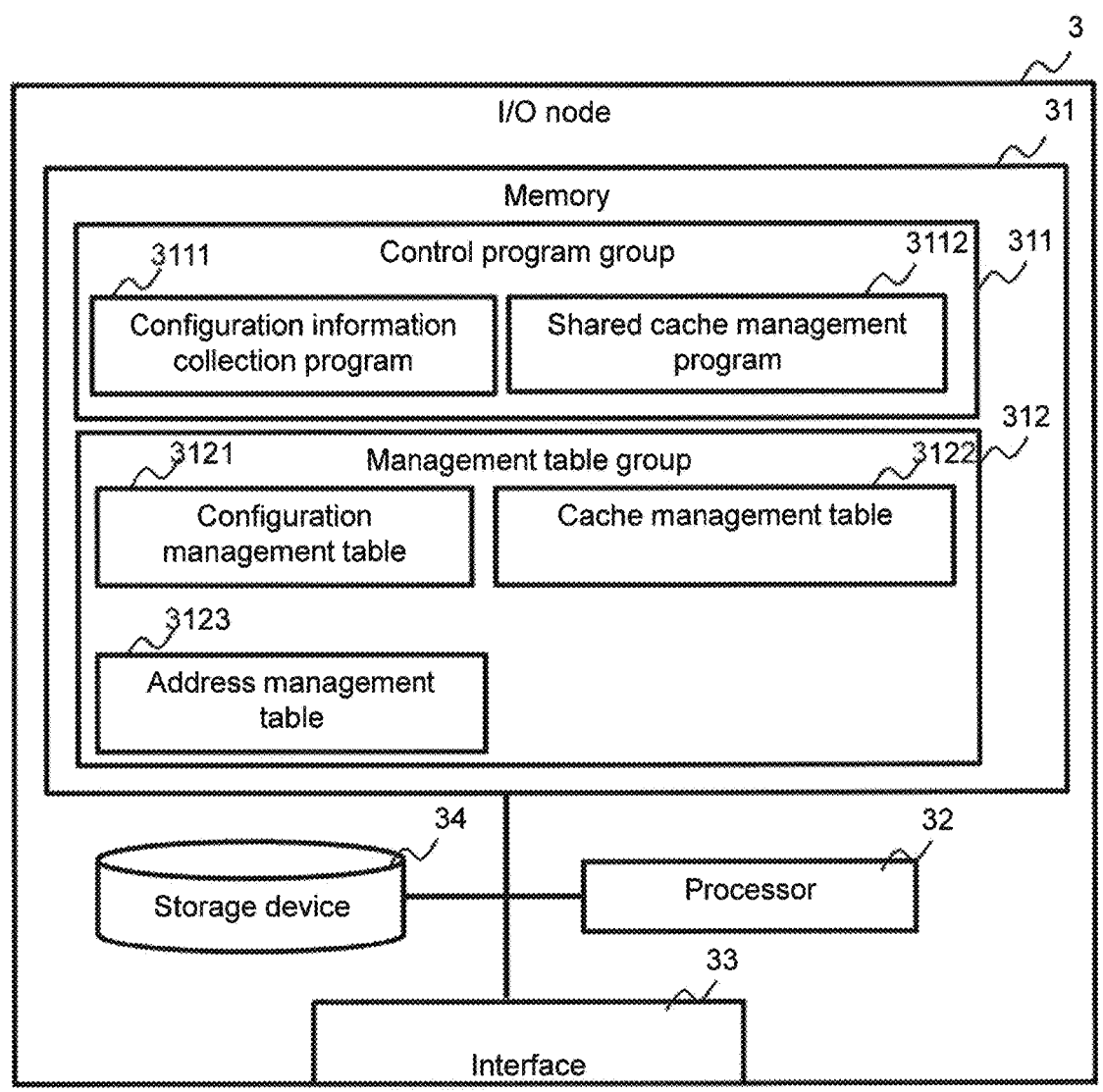
FIG. 3 is a block diagram showing an example of the configuration of an I/O node 3.

FIG. 3 is a block diagram showing an example of the configuration of the I/O node 3.

As shown in FIG. 3, the I/O node 3 comprises a memory 31, a processor 32, an interface 33, and a storage device 34.

The memory 31, processor 32 and interface 33 respectively comprise substantially the same functions as the memory 21, processor 22, and interface 33 of the computation node 2, and as such, detailed explanations thereof will be omitted.

The storage device 34, for example, may by multiple physical storage devices configured as a RAID (Redundant Array of Inexpensive Disks), or may be a logical storage device based on either an internal or external physical storage device. For example, data, which is used by the computation node 2 application program 4, is stored in the storage device 34, and this data is stored in the memory 21 and used when needed by the application program 4.

The control program group 311 stored in the memory 31 includes a configuration information collection program 3111 and a shared cache management program 3112. The programs 3111 and 3112 may be realized by being consolidated into a single part, or may be divided into three or more parts depending on the implementation.

The configuration information collection program 3111 updates a configuration management table 2121 and an address management table 3123 in accordance with a request from the information notification part 2112 of the computation node 2.

The shared cache management program 3112, in accordance with a request from the cache management program 2113 of the computation node 2, acquires data from the storage device 34, reads/writes the data from/to the cache area of the memory 31, and updates a shared cache management table 3122, which will be explained further below.

The management table group 312 stored in the memory 31 comprises a configuration management table 3121, a cache management table 3122, and an address management table 3123. These tables 3121 through 3123 will be explained further below.

Figure 4:
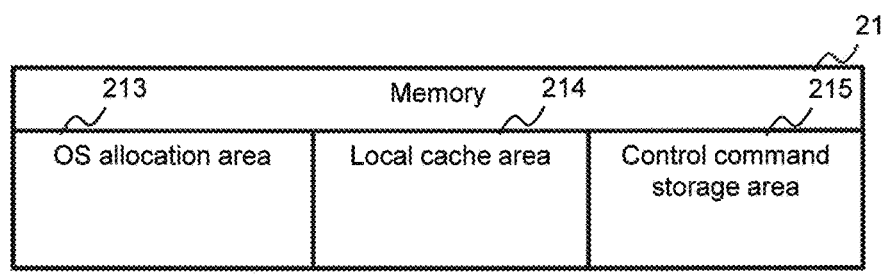
FIG. 4 is a schematic diagram for illustrating an example of a method for using a memory 21 of the computation node 2.

FIG. 4 is a schematic diagram for illustrating a method for using the memory 21 of the computation node 2.

The computation node 2 allocates and uses the storage area of the memory 21 with respect to the above-mentioned management table group 212 and the respective programs (4, 211), and, in addition, logically partitions and uses the memory 21 storage area as an OS allocation area 213, a local cache area 214, and a control command storage area 215.

The OS allocation area 213 is an area used as a working area by the OS, the application program 4, and the control program groups 211. The local cache area 214 is used as a cache area by the control program group 211. The control command storage area 215 is for storing the contents of a processing request (command) from the local cache area 214 and the I/O node 3.

Figure 5:
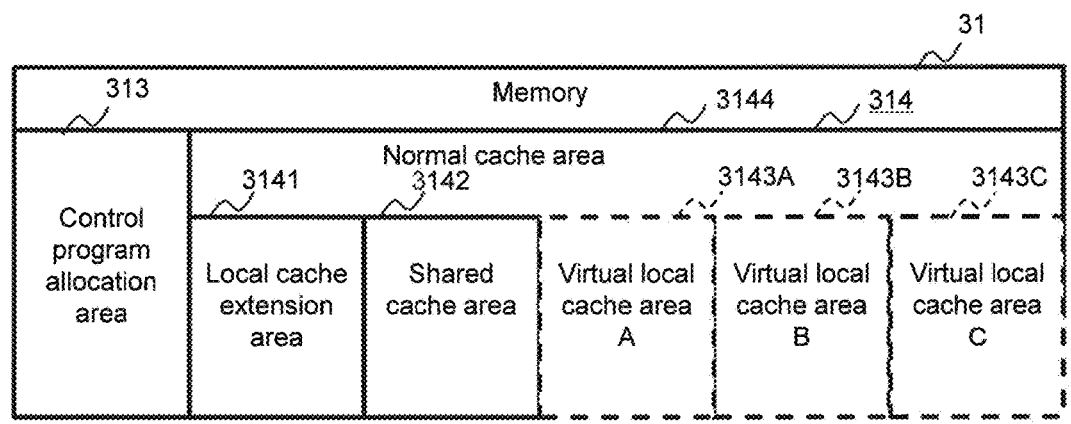
FIG. 5 is a schematic diagram for illustrating an example of a method for using a memory 31 of the I/O node 3.

FIG. 5 is a schematic diagram for illustrating a method for using the memory 31 of the I/O node 3.

The I/O node 3 allocates the storage area of the memory 31 to the above-mentioned management table group 312 and the control program group 311, and, in addition, allocates the memory 31 storage area to a control program allocation area 313 and a cache area 314, and logically partitions and uses the control program allocation area 313 and the cache area 314.

Of these, the I/O node 3 logically partitions and manages the cache area 314 as a normal cache area 3144, a local extended cache area 3141, and a shared cache area 3142, and, in addition, manages multiple virtual local cache areas 3143 respectively corresponding to the multiple local cache areas 214.

The normal cache area 3144 is for temporarily storing data inputted/outputted to/from the storage device 34.

The local extended cache area 3141 stores data from the computation node 2 local cache area 214. The shard cache area 3142 stores data, which is referenced by multiple computation nodes 2.

The virtual local cache area 3143 is associated with the local cache areas 214 of the respective computation nodes 2. That is, the virtual local cache area 3143 exists in proportion to the number of computation nodes 2 communicating with the I/O node 3. For example, the drawing shows a case in which the I/O node 3 is communicating with three computation nodes 2A through 2C, and virtual local cache areas 3143A through 3143C, which respectively correspond to local cache areas 214A through 214C of the respective computation nodes 2A through 2C, exist in the memory 31. A single virtual local cache area 3143A will be given as an example of the virtual local cache area as deemed appropriate hereinbelow.

The I/O node 3 associates the addresses (physical addresses, which will be explained further below) of the local cache areas 214A through 214C of the computation nodes 2A through 2C with the address (virtual addresses, which will be explained further below) of the corresponding virtual local cache areas 3143A through 3143C, and, in addition, manages the utilization statuses of the local cache areas 214A through 214C. This makes it possible for the I/O node 3 to integratively manage the computation node 2 local cache areas 214A through 214C and the I/O node 3 cache area 314.

The virtual local cache area 3143A is associated with the local cache area 214A, but does not actually store data (for example, data used by the application program 4). The data in the virtual local cache area 3143A is actually stored in the corresponding local cache area 214A. The I/O node 3 can access data in the corresponding local cache area 214A by referencing the virtual local cache area 3143A. The virtual local cache area 3143A does not store the same data as the data stored in the local cache area 214A, thereby making it possible to conserve the capacity of the I/O node 3 cache area 314.

There is one local extended cache area 3141, and this local extended cache area 3141 is logically partitioned, and a partitioned area is provided to each computation node 2. This approach promises to keep the capacity of the local extended cache area 3141 small. However, a local extended cache area 3141 may also be provided to each computation node 2.

FIG. 6 shows an example of the configuration management table 2121 of the computation node 2.

The configuration management table 2121 comprises a capacity 21211, a used capacity 21212, and a physical address 21213. The capacity 21211 shows the capacity of the local cache area 214. The used capacity 21212 shows the amount of data actually used by the computation node 2 with respect to the capacity of the local cache area 214. The physical address 21213 shows multiple physical addresses belonging to the local cache area 214.

FIG. 7 shows an example of the cache management table 2122 of the computation node 2.

The cache management table 2122 comprises a page number 21221, a physical address 21222, a data 21223, and a valid bit 21224.

The storage device 34 comprises multiple pages (storage areas), and the page number 21221 is the number of a page of the storage device 34. The physical address 21222 is the same as the physical address 21213 of the configuration management table 2121, that is, it shows the physical address of the local cache area 214. Based on a combination of the page number 21221 and the physical address 21222, it is clear where data, which is stored in a certain page of the storage device 34, is stored in the local cache area 214. The data 21223 shows the type of data being stored in an area (an area in the local cache area 214) identified from the physical address 21222.

The valid bit 21224 is information showing whether the data stored in the area identified using the physical address 21222 is "valid" or "invalid". "Invalid" shows that the data stored in the area identified in accordance with the physical address 21222 is different from data stored in a page of the storage device 34 associated with the relevant area. Alternatively, "valid" shows that the data stored in the area identified using the physical address 21222 is the same as data stored in the page associated with the relevant area.

FIG. 8 shows an example of the configuration management table 3121 of the I/O node 3.

The configuration management table 3121 correspondingly manages a node identifier 31221, a communication mode 31212, a capacity 31213, and a used capacity 31214 for each computation node 2 or I/O node 3.

The node identifier 31221 is information for identifying the computation nodes 2A through 2C and the I/O node 3. The node identifier "O" denotes the I/O node 3. The node identifiers "A through C" respectively denote the computation nodes 2A through 2C.

The communication mode 31212 shows the mode by which the I/O node 3 accesses data, which is associated with the cache area 314, and data, which is stored in the cache area 314. The modes for accessing data, for example, are RDMA (Remote Direct Memory Access), and memory reference. "DMA" shows that the I/O node 3 accesses data stored in the local cache area 214, which is associated with a virtual local cache area 3143. "Memory reference" shows that the I/O node 3 accesses data stored in the local extended cache area 3141 and the shared cache area 3142, which are areas of the cache area 314 other than the virtual local cache area 3143.

The capacity 31213 shows the capacity of both the local extended cache area 3141 and the shared cache area 3142 in a case where the node identifier 31211 is "0". In a case where the node identifier 31211 is "A through C", the capacity 31213 shows the capacity of each of the local cache areas 214A through 214C.

The used capacity 31214 shows the capacity, which is actually being used with respect to the capacity 31213.

In a case where the node identifier 31211 is "0", the capacity 31213 and the used capacity 31214 are divided into two rows. The upper row shows the capacity 31213 and the used capacity 31214 of the local extended cache area 3141, and the lower row shows the capacity 31213 and the used capacity 31214 of the shared cache area 3142. In addition, in a case where the node identifier 31211 is "A through C", the capacity 31213 and the used capacity 31214 of the virtual local cache area 3143 corresponding to the local cache areas 214A through 214C of the respective computation nodes 2A through 2C are shown. FIG. 9 shows an example of a cache management table 3122 of the I/O node 3.

FIG. 9 shows an example of the cache management table 3122 of the I/O node 3.

The cache management table 3122 shows whether or not data stored in the cache area 314 and data stored in the storage device 34 are redundant.

The cache management table 3122 comprises a page number 31221, a virtual address 31222, and a valid bit 31223.

The page number 31221 is a number of a page in the storage device 34. The virtual address 31222 shows multiple virtual addresses, which belong to the cache area 314. For example, in the example shown in the drawing, the page number 31221 "0" is associated with the virtual address "3", and this shows that data stored in the page of the page number "0" is stored in the area (the area in the cache area 314) belonging to virtual address "3". Meanwhile, an invalid value "–" is associated as the virtual address 31222 with the page number 31221 "1". This shows that data stored in the storage device 34 is not stored in the cache area 314.

The valid bit 31223 is information showing whether data stored in the storage device 34 is "valid" or "invalid". The valid bit 31223 is substantially the same as the valid bit 21223 of the cache management table 2122. For example, in the drawing, the page number "2" of the storage device 34 is associated with the virtual address "5" of the cache area 314, but the valid bit 21223 is "invalid", thereby indicating that the data stored in the area (the area in the cache area 314) of the virtual address "5" differs from the data being stored in the page of page number "2".

FIG. 10 shows an example of the address management table 3133 of the I/O node 3.

The address management table 3123 comprises a virtual address 31231, an attribute value 31232, a physical location 31233, a physical address 31234, and a utilization status 31235 for each area in the cache area 314. The information of the address management table 3123 will be explained below by taking one area in the cache area 314 (referred to as "target area" in the explanation of FIG. 10) as an example.

The virtual address 31231 shows the virtual address of the target area.

The attribute value 31232 shows the type of area, which comprises the target area. The attribute value 31232 "extended" shows that the target area is being used as the local extended cache area 3141. The attribute value 31232 "shared" shows that the target area is being used as the shared cache area 3142. Also, the attribute value 31233 "virtual A" shows that the target area is being used as the virtual local cache area 3143A. This attribute value 31232 may be omitted.

The physical location 31233 shows the place where the data stored in the target area is actually stored. "Local memory" shows that the data stored in the target area is actually being stored in the memory 311 of the I/O node 3. In addition, "Computation node A" shows that the data stored in the target area is actually being stored in the memory 21 of the computation node 2A.

The physical address 31234 shows the physical address of the target area. The utilization status 31235 shows whether data is being stored in the area indicated by the physical address 31234 of the target area. "Used" shows that data is being stored in the area indicated by the physical address 31234 of the target area. "Unused" shows that data is not being stored in the area indicated by the physical address 31234 of the target area.

How data is migrated between caches will be explained next.

Figure 22:
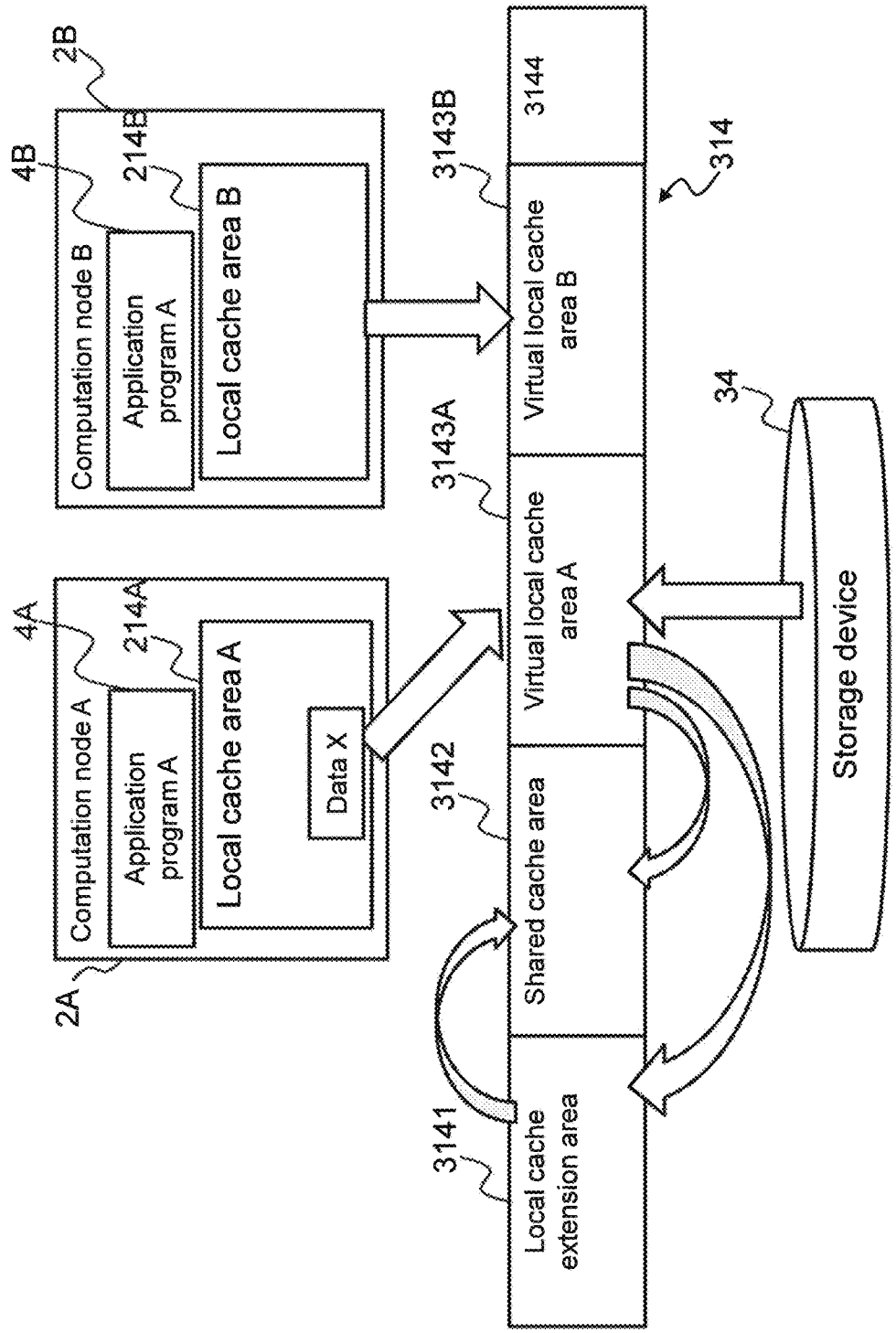
FIG. 22 is a schematic diagram for illustrating the migration of data between caches.

FIG. 22 is a schematic diagram for illustrating the migration of data between caches. Furthermore, in the explanation of FIG. 22, it is supposed that the computer system 1 is as described in (1) through (5) below.

(1) The local cache area A (214) of the computation node A (2A) is an area for storing data acquired at the time of an application program A (4A) (the application program of the computation node A (2A)) read request. The same also holds true for the local cache area 214B of the computation node B (2B), which is used at the time of an application program B (4B) (the application program of the computation node B (2B)) read request.

(2) The virtual local cache areas A (214A) and B (214B) are area names, which appear in the cache management table 3122 of the I/O node 3 for determining whether or not the I/O node 3 writes data to the local cache areas A (214A) and B (214B) of computation nodes A (2A) and B (2B), and are not a physical area in the cache area 314 of the I/O node 3. In a case where the I/O node 3 decides to read/write data from/to the virtual local cache areas A (214A) and B (214B), the I/O node 3 issues a read/write request to the local cache areas A (214A) and B (214B) to the computation nodes A (2A) and B (2B).

(3) The local extended cache area 3141 is for use as a migration destination for data prior to an overwrite when a data overwrite has been generated in the local cache areas A (214A) and B (214B).

(4) The shared cache area 3142 is for storing data, which has been referenced by both application programs A (4A) and B (4B). In a case where there is a cache hit for either the local cache area B (214B) (A (214A)) or the local extended cache area 3141 with respect to a read request from the application program A (4A) (B (4B)), the cache hit data is migrated to the shared cache area 3142.

(5) Both of the application programs A (4A) and B (4B) can use the data in the local cache areas A (214A) and B (214B) of the computation nodes A (2A) and B (2B), and the data in the cache area 314 of the I/O node 3 by going through the I/O node 3.

<Data Migration Process (1)>

A process for migrating data from the local cache area A (214A) (virtual local cache area A (3143A)) to the shared cache area 3142 will be explained here.

In a case where there has been a read request from the application program A (4A) to read data X from a page of the storage device 34, the computation node A (2A) sends the read request to the I/O node 3 without determining whether or not the data X is in the local cache area A (214A). The I/O node 3 reads the data X from the storage device 34 to the normal cache area 3144, and sends the read data X to the computation node A (2A), which is the source of the read request. The computation node 2A stores the received data X in the local cache area A (214A).

Then, in a case where there has been a read request of the data X from an application program B (4B) of a computation node B (2B) other than the computation node A (2A), the computation node B (2B) sends the read request to the I/O node 3 without determining whether or not the data X is in the local cache area B (214B). The I/O node 3 receives the read request, and identifies that the data X is stored in the virtual local cache area A (3143A). The I/O node 3 reads the data X from the local cache area A (214A) corresponding to the virtual local cache area A (3143A), stores the read data X in the normal cache area 3144, and sends the data X from the normal cache area 3144 to the computation node B (2B). The computation node B (2B) stores the received data X in the local cache area B (214B). Then, the I/O node 3 migrates the data X (the data X stored from the local cache area A (214A) to the normal cache area 3144) stored in the normal cache area 3144 from the normal cache area 3144 to the shared cache area 3142. Therefore, in a case where the application B (4B) targets the data X for a read again, even if the data X disappears from the local cache area B (214B), the cache hit is generated since the data X is stored in the shared cache area 3142. With this configuration, in a case where the I/O node 3 receives the read request targeting the data X for a read from the computation node B (2B), the data X can be rapidly sent without placing a load on the computation node A (2A) and, in addition, without relying on the cache update frequency of the application A (4A).

<Data Migration Process (2)>

Herein, the migration process of data from the local cache area A (214A) (the virtual local cache area A (3143A)) to a local extended cache area 3141 will be explained.

The I/O node 3 checks the remaining amount of capacity (or the free area ratio, which is the percentage of remaining amount of capacity relative to the capacity of the local cache area A (214A)) of the local cache area A (214A) of the computation node A (2A) at cache update time. Then, in a case where the remaining amount of capacity of the local cache area A (214A) of the computation node A (2A) is equal to or less than the size of the update data, the I/O node 3 migrates the data (for example, infrequently used data) X satisfying a predetermined condition from among data stored in the local cache area A (214A) from the local cache area A (214A) (the virtual local cache area A (3143A)) to the local extended cache area 3141.

<Data Migration Process (3)>

Herein, the migration process of data from the local extended cache area 3141 to the shared cache area 3142 will be explained.

After the data migration process (2) is performed, in a case where there is the read request for the data X from the application program B (4B), the computation node B (2B) sends the read request to the I/O node 3. The I/O node 3 receives the read request, once migrates the data X stored in the local extended cache area 3141 from the local extended cache area 3141 to the normal cache area 3144, and sends the data X from the normal cache area 3144 to the computation node B (2B). The computation node B (2B) stores the received data X in the local cache area B (214B). Thereafter, the I/O node 3 migrates the data X from the normal cache area 3144 to the shared cache area 3142.

In this way, there may be a case where once storing the data (for example, infrequently used data) X, which satisfies a predetermined condition, in the local extended cache area 3141 temporarily rather than suddenly swapping this data out of the storage device 34 makes it possible to reduce the frequency with which the data X must be read from the storage device 34. Furthermore, in a case where the data X stored in the local extended cache area 3141 is targeted for a read by the computation node B (2B), the data X is migrated to the shared cache area 3142.

The flow of processing of each program will be explained next.

Figure 11:
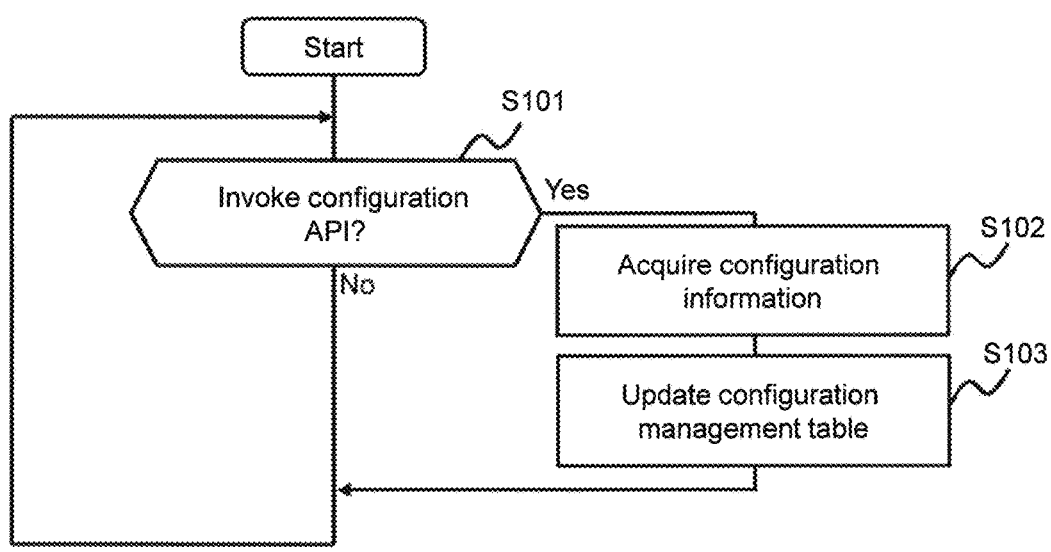
FIG. 11 is an example of a flowchart of the processing of a configuration information collection program 2111 of the computation node 2.

FIG. 11 is an example of a flowchart of the processing of the configuration information collection program 2111 of the computation node 2.

The configuration information collection program 2111 detects the execution of a setting API from the application program 4 (S101).

In a case where the execution of the setting API has not been detected (S101: No), the configuration information collection program 2111 performs the processing of S101.

In a case where the configuration information collection program 2111 has detected the execution of the setting API (S101: Yes), the configuration information collection program 2111 uses the setting API to collect the configuration information to be notified (8102), and writes the collected configuration information to the configuration management table 2121 (S103).

The configuration management table 2121 is either generated or updated in accordance therewith.

Figure 12:
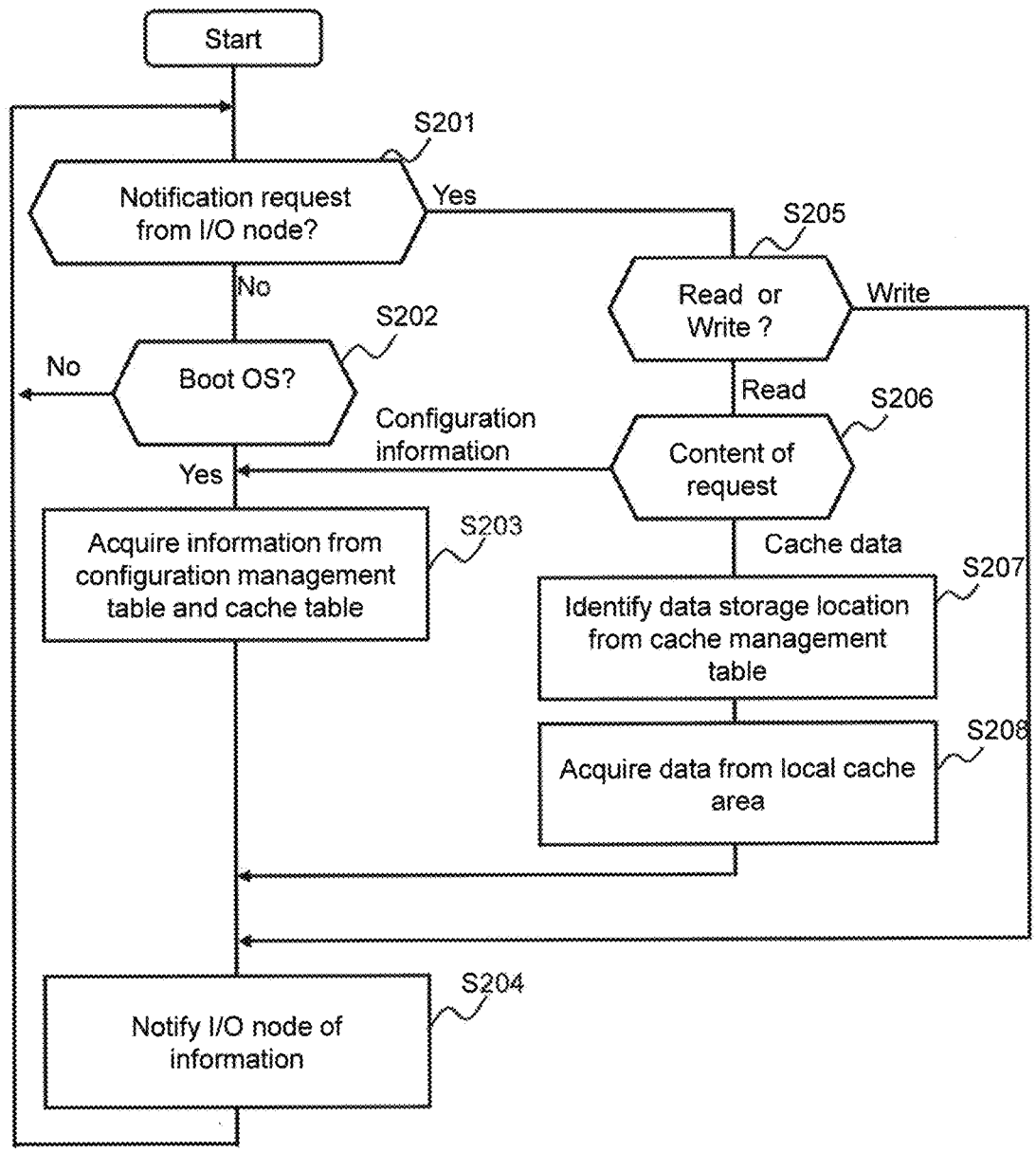
FIG. 12 is an example of a flowchart of the processing of an information notification program 2112 of the computation node 2.

FIG. 12 is an example of a flowchart of the processing of the information notification program 2112 of the computation node 2.

The information notification program 2112 determines whether or not there has been a configuration information acquisition request from the I/O node 3 (S201). As used here, the configuration information is information, which is managed by the configuration management table 2121 and the cache management table 2122 of the computation node 2.

In a case where a configuration information acquisition request from the I/O node 3 has not been detected (S210: No), the information notification program 2112 checks whether or not a computation node 2 OS boot-up process has been executed (S202).

In a case where the execution of the OS boot-up process has not been detected (S202: No), the information notification program 2112 returns to the processing of S201.

In a case where the execution of the OS boot-up process has been detected (S202: Yes), the information notification program 2112 collects information related to the local cache area 213 from the configuration management table 2121 and the cache table 2122 (S203), and sends the collected information to the I/O node 3 as configuration information (S204). Thereafter, the information notification program 2112 performs the processing of S201 again.

In a case where a configuration information acquisition request from the I/O node 3 has been detected (S201: Yes), the information notification program 2112 determines the type of the request (read or write) from the I/O node 3 (S205).

In a case where the determination of S205 is that the request is a read request, the information notification program 2112 performs the processing of S206. In a case where the request is a write request, the information notification program 2112 performs the processing of S204.

In a case where the determination of S206 is that the read request is a request to acquire configuration information, the information notification program 2112 performs the processing of S203.

In a case where the determination of S206 is that the read request is a request to acquire cache data (the data in the local cache area 213), a physical address will be specified in this read request. The configuration information notification program 2112 uses the physical address of the read request to reference the cache management table 2122, identifies the storage location of the read-target data (S207), and acquires the read-target data from the identified storage location (an area in the local cache area 312) (S208). Thereafter, the information notification program 2112 performs the processing of S204.

Figure 13:
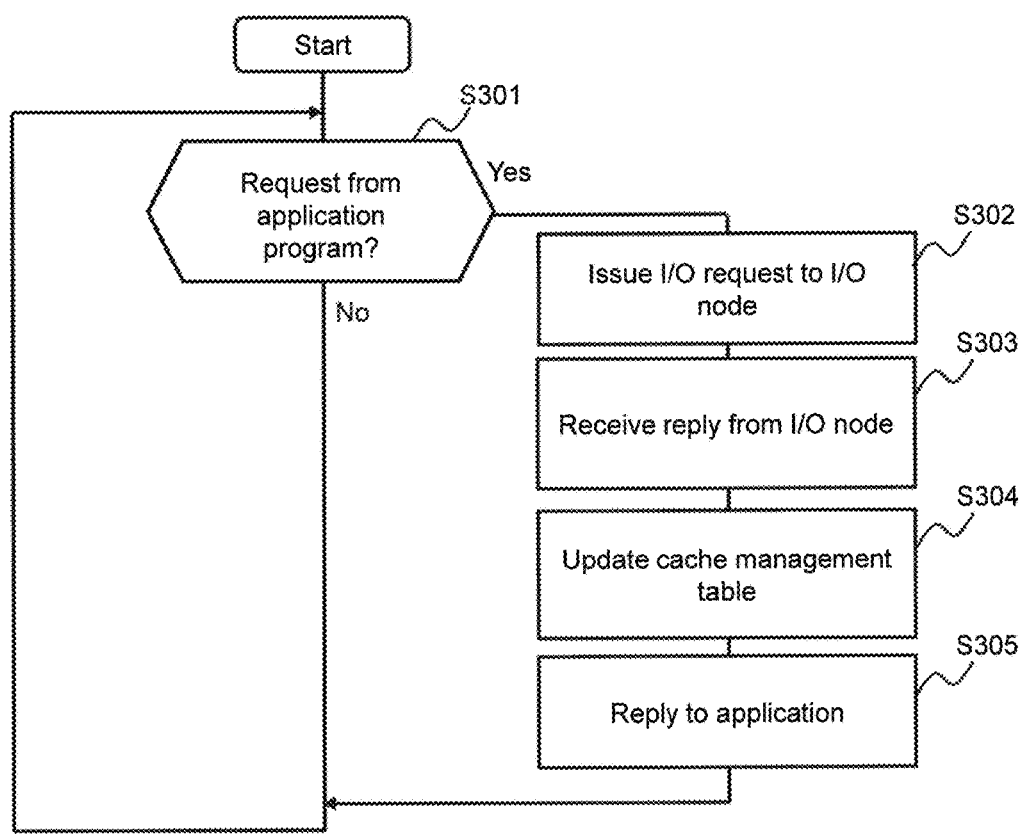
FIG. 13 is an example of a flowchart of the processing of a cache management program 2113 of the computation node 2.

FIG. 13 is an example of a flowchart of the processing of the cache management program 2113 of the computation node 2.

The cache management program 2113 checks whether or not an I/O request has been generated in accordance with a certain computer program (assumed to be the application program 4 in the explanation of FIG. 13) being executed (S301).

In a case where there is no I/O request from the application program 4 (S301: No), the cache management program 2113 performs the processing of S301.

In a case where there is an I/O request from the application program 4 (S301: Yes), the cache management program 2113 sends the I/O request from the application program 4 to the I/O node 3 without determining whether or not data conforming to this I/O request is in the local cache area 214 (S302).

The cache management program 2113 receives a reply (hereinafter referred to as I/O reply) with respect to the I/O request from the I/O node 3 (S303). Specifically, for example, the cache management program 2113, in accordance with the I/O reply from the I/O node 3, stores the data conforming to the I/O request in the area (the area in the local cache area 214) belonging to the physical address specified in the I/O reply.

The cache management program 2113 updates the cache management table 2122. For example, the cache management program 2113 adds an entry conforming to the I/O request to the cache management table 2122, stores a page number, a physical address, and data included in the received reply in the added entry, and, in addition, configures the valid bit 21223 in this entry to "valid". The cache management program 2113 updates the value of the used capacity 21212 of the configuration management table 2121 to the value specified in the I/O reply from the I/O node 3 (S304).

The cache management program 2113 replies to the application program 4 that the I/O processing has been completed (S305).

Figure 14:
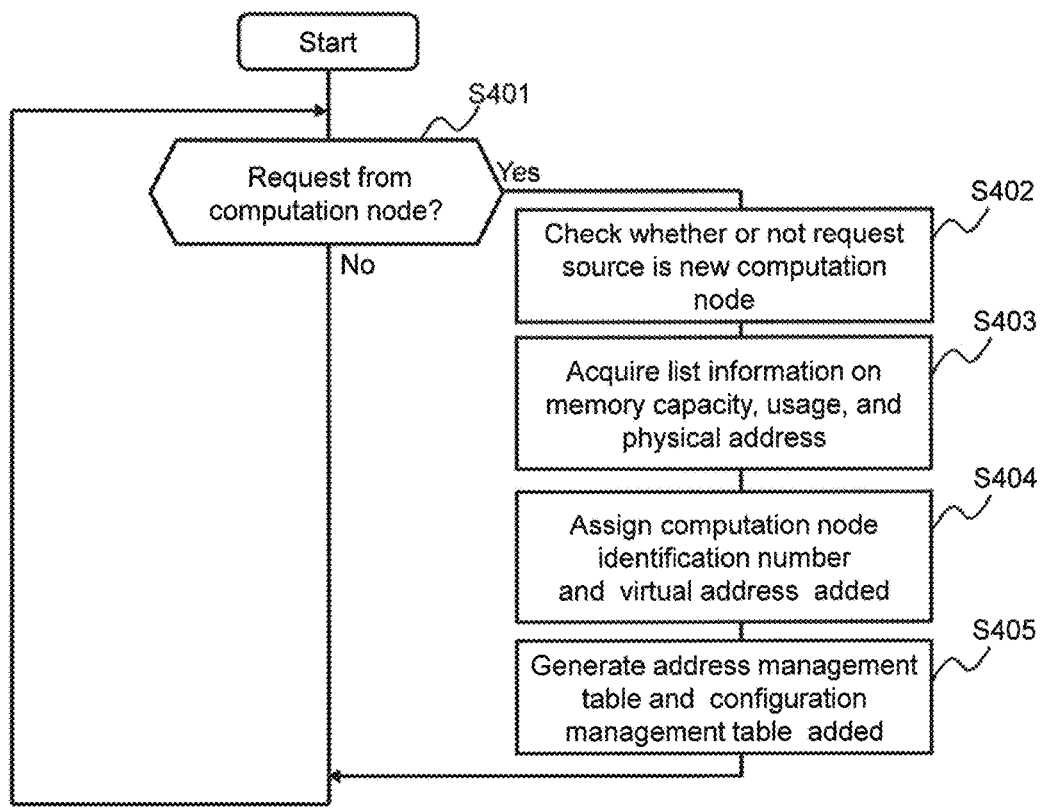
FIG. 14 is an example of a flowchart of the processing of a configuration information collection program 3111 of the I/O node 3.

FIG. 14 is an example of a flowchart of the processing of the configuration information collection program 3111 of the I/O node 3.

The I/O node 3 determines whether or not there is a configuration information notification request from the computation node 2 (S401).

In a case where there is no configuration information notification request from the computation node 2 (S401: No), the configuration information collection program 3111 performs the processing of S401.

In a case where there is a configuration information notification request from the computation node 2 (S401: Yes), the configuration information collection program 3111 determines whether or not the notification request-source computation node 2 is a new computation node 2 (S402). A new computation node 2 is a computation node, which is not registered in the address management table 3123. Specifically, for example, the configuration information collection program 3111 identifies a PCI pin number from which the communication was generated, and determines whether the identified computation node 2 is a new computation node 2 by determining whether or not the identified computation node 2 is registered in the address management table 3123.

The configuration information collection program 3111 stores information conforming to the configuration information notification request in the memory 31 of the I/O node 3 as the configuration information, and/or updates the memory 31 with the information conforming to the configuration information notification request (S403).

The configuration information collection program 3111, in a case where the computation node 2 is a new computation node 2, for example, configures the PCI pin number as the identification number of this computation node 2, and based on the capacity of the usable memory 21 (local cache memory 214) of this computation node 2, allocates a virtual address 3143, which is an area constituting a portion of the cache area 314, to the memory 21 (S404).

The configuration information collection program 3111 stores configuration information related to the computation node 2 registered in the address management table 3123 and/or configuration information related to the new computation node 2 in the cache management table 3122 and the address management table 3123 (S405). Thereafter, the configuration information collection program 3111 performs the processing of S401 once again.

According to the processing shown in FIG. 14, the I/O node 3 is able to integratively manage the information being managed by the computation node 2 configuration management table 2121 and the cache management table 2122 of each computation node 2.

Figure 15:
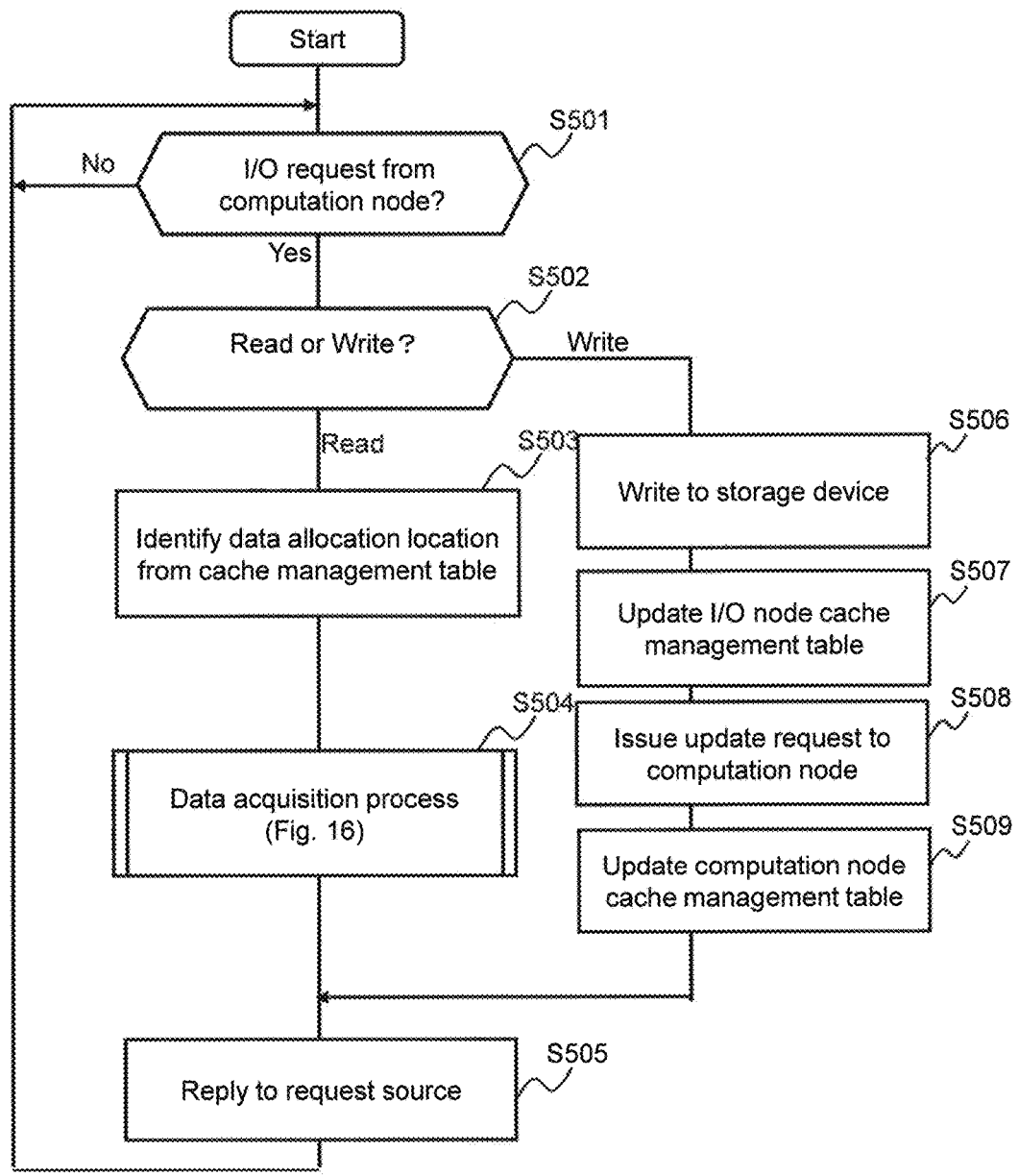
FIG. 15 is a detailed example of S503 of FIG. 15.

FIG. 15 is an example of a flowchart of the processing of the shared cache management program 3112 of the I/O node 3.

The shared cache management program 3112 determines whether or not there is an I/O request from the computation node 2 (S501).

In a case where there is no I/O request from the computation node 2 (S501: No), the shared cache management program 3112 once again performs the processing of S501.

In a case where there is an I/O request from the computation node 2 (S501: Yes), the shared cache management program 3112 determines whether the I/O request is a read request or a write request (S502).

In a case where the I/O request is a read request, the shared cache management program 3112 identifies the storage location of data conforming to the read request from the cache management table 3122 (S503). The data storage location here shows the page number 31221 of the storage device 34. Initially, the data conforming to the read request is not stored in any of the local cache areas 214 associated with the local cache area 3141, shared cache area 3142, and virtual local cache area 3143.

The shared cache management program 3112 reads the data from the read-source page (the page to which the read request-specified address belongs) of the storage device 34 in which the data conforming to the read request is stored, and stores the read data in the normal cache area 3144 (S504).

The shared cache management program 3112 sends a reply (response) including this data to the request-source (the source of the read request) computation node 2 (S505).

Alternatively, in a case where the I/O request is a write request, the shared cache management program 3112 writes the data conforming to the write request (the write-target data) to the write-destination page (the page to which the write request-specified address belongs) of the storage device 34 (S506). The shared cache management program 3112 does not write the write-target data to the normal cache area 3144 at this point, but may temporarily store this data in the normal cache area 3144, and thereafter write this data to the write-destination page from the normal cache area 3144.

The shared cache management program 3112 configures the valid bit 31223 corresponding to the write-destination page to "invalid" in the cache management table 3122 (S507). This process, for example, is for prohibiting the application program 4 from using pre-update data stored in the cache areas 214 and 314. Processing such as this is performed because data read to the cache areas 214 and 314 from the storage device 34 prior to updating will differ from the post-update data stored in the storage device 34 as a result of data stored in the storage device 34 having been updated.

The shared cache management program 3112 references the address management table 3123, and sends a cache management table 2122 update request to the computation node 2 corresponding to the virtual address for which the valid bit 31223 was configured to "invalid" in S507 (S508). This update request specifies the physical address corresponding to the virtual address for which the valid bit 31223 was configured to "invalid" in S507.

The computation node 2, which is the destination of the update request of S508, receives this update request, and configures the valid bit 21223 corresponding to the physical address specified in this update request to "invalid" in the cache management table 2122 (S509). Thereafter, the shared cache management program 3112 once again performs the processing of S505.

Figure 16:
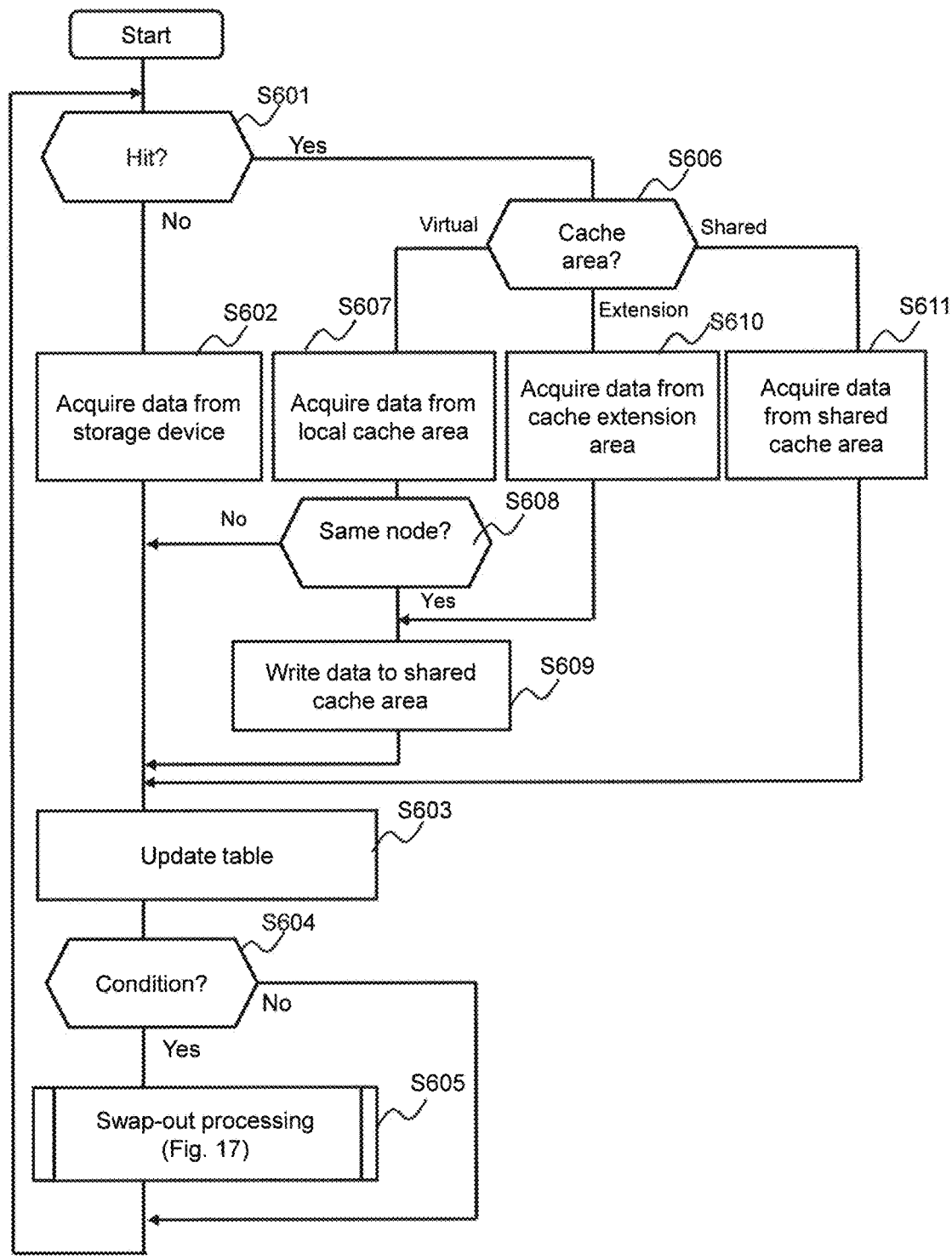
FIG. 16 is a detailed example of data acquisition processing (S504 of FIG. 15).

FIG. 16 is a detailed example data acquisition processing (S504 of FIG. 15).

The shared cache management program 3112 references the cache management table 3122 and determines whether or not there is a cache hit (S601). The "presence or absence of a cache hit" here refers to whether or not the read-target data is stored in the virtual local cache area corresponding to the computation node, which is the source of the read request, and specifically to whether or not the association between the read-source page number 31221 and virtual address 31222 exists in the cache management table 3122.

In a case where there is no cache hit (S601: No), the shared cache management program 3112 reads the read-target data from the read-source page (the storage device 34) (S602), stores the read data in the normal cache area 3144, includes this data in a reply to the request-source computation node 2, and, in addition, configures the valid bit 31223 corresponding to the read-source page to "valid" in the cache management table 3122 (S603).

Thereafter, the shared cache management program 3112 determines whether or not a prescribed condition regarding the virtual local cache area 3143 corresponding to the request-source computation node 2 has been satisfied (S604). Specifically, for example, the shared cache management program 3112 determines whether or not the remaining amount of capacity (or the free capacity ratio) for the virtual local cache area 3143 (the local cache area 214) corresponding to the request-source computation node 2 is equal to or smaller than a prescribed value. This determination can be made by referencing the configuration management table 3121.

In a case where the prescribed condition for the virtual local cache area 3143 corresponding to the request-source computation node 2 has been satisfied (S604: Yes), the shared cache management program 3112 executes a swap-out process (S605). As used here, "swap-out process", for example, refers to moving infrequently used data from among the data stored in the virtual local cache area 3143 (local cache area 214) to the storage device 34. This swap-out process increases the remaining amount of capacity of the virtual local cache area 3143 (local cache area 214).

In a case where there has been a cache hit (S601: Yes), the shared cache management program 3112 references the address management table 3123 and determines in which area of the cache area 314 (that is, which of the local extended cache area 3141, the shared cache area 3142, and the virtual local cache area 3143) the cache hit occurs (the area storing the read-target data) (S606).

In a case where the determination of S606 is that the cache hit location is the virtual local cache area 3143, the shared cache management program 3112 uses a RDMA transfer process to acquire the read-target data from the local cache area 214, which is associated with the virtual local cache area 3143 (S607), and determines whether or not the data request-source computation node and the data acquisition-destination computation node are the same (S608). This determination processing is implemented by comparing the node identifiers 31211 in the configuration management table 3121.

In a case where the determination of S608 is that it is not the same node (S608: No), the shared cache management program 3112 performs the processing of S603.

In a case where the determination of S608 is that it is the same node (S608: Yes), the shared cache management program 3112 writes the acquired data to the shared cache area 3142 (S609). Thereafter, the shared cache management program 3112 performs the processing of S603.

In a case where the determination of S606 is that the cache hit location is the local extended cache area 3141, the shared cache management program 3112 acquires the read-target data from the local extended cache area 3141 (S610), and write this data to the shared cache area 3142 (S609). Thereafter, the shared cache management program 3112 performs the processing of S603.

In a case where the determination of S606 is that the cache hit location is the shared cache area 3142, the shared cache management program 3112 acquires the read-target data from the shared cache area 3142 (S611). Thereafter, the shared cache management program 3112 performs the processing of S603.

The determination as to whether or not there is a cache hit may be performed in order from the shared cache area, the virtual local cache area, and the local extended cache area. Specifically, for example, the shared cache management program 3112 may perform the cache hit determination for the shared cache area, and in a case where the result of this determination is negative, may perform the cache hit determination for the virtual local cache area, and in a case where the result of this determination is negative, may perform the cache hit determination for the local extended cache area. The reason the initial target of the cache hit determination is the shared cache area is because the preferential use of data, which has been stored in the shared cache area, avoids the frequently accesses to the computation node 2, thereby making it possible to hold the performance degradation of the application program 4 in check. In addition, the shared cache management program 3112 of the I/O node 3 may comprise a setting API for controlling the order of cache hit determinations, and may change the determination order in accordance with a specification from the application program 4.

Figure 17:
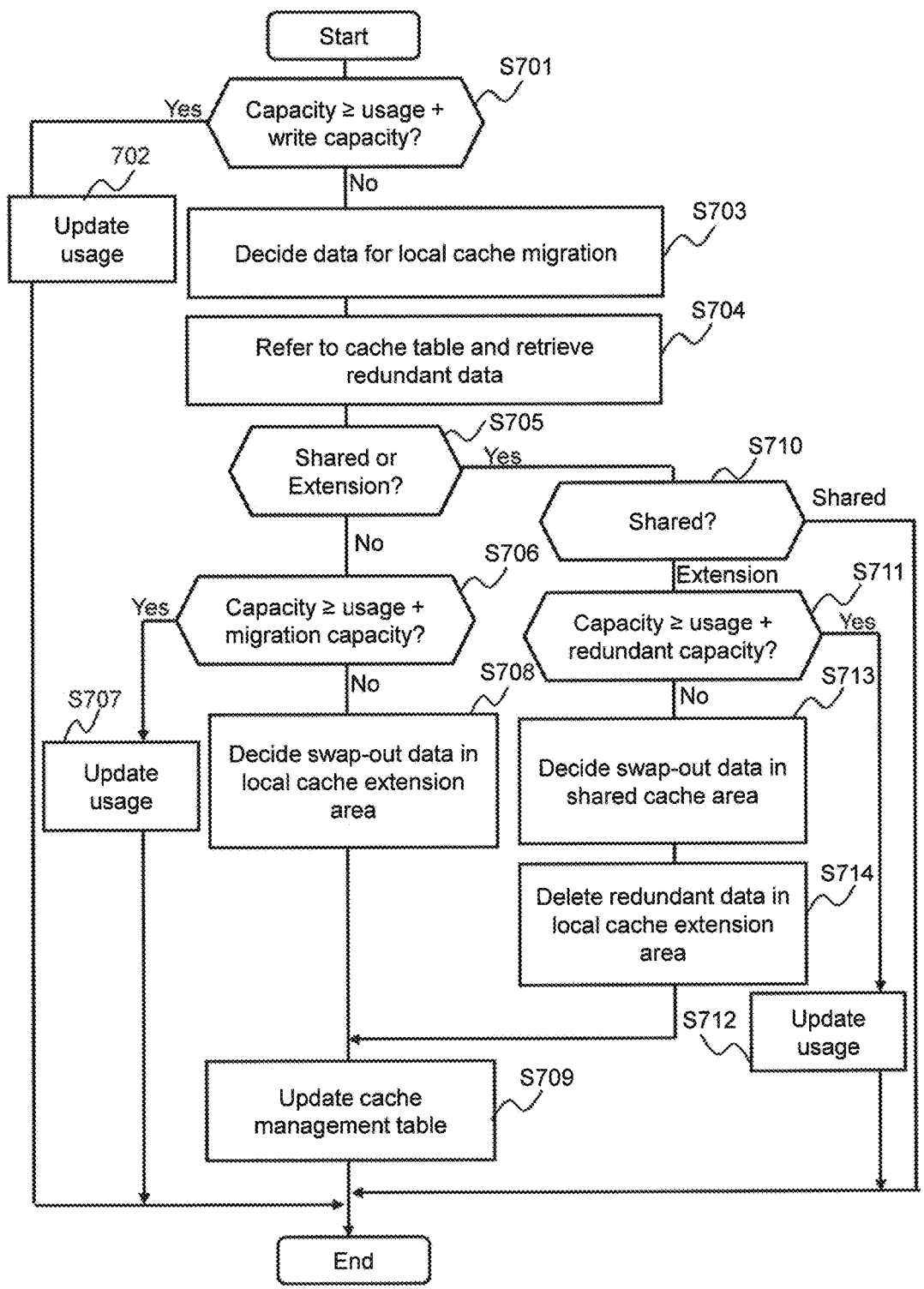
FIG. 17 is a detailed example of swap-out processing (S604 of FIG. 16).

FIG. 17 is a detailed example of swap-out processing (S604 of FIG. 16).

The swap-out process, for example, is performed based on the amount of remaining amount of capacity of the local cache area 214 associated with the virtual local cache area 3143. Specifically, for example, the shared cache management program 3112 references the configuration management table 3121 and determines whether or not the capacity 31213 of the request-source computation node 2 is equal to or larger than the sum of the used capacity 31214 and the write capacity (the size of the write-target data) (S701).

In a case where the capacity 31213 is equal to or larger than the sum of the used capacity 31214 and the write capacity (S701: Yes), the shared cache management program 3112 writes the write-target data to the local cache area 214 associated with the virtual local cache area 3143, and adds the value of the write capacity to the used capacity 31214 of the request-source computation node 2 (S702).

Alternatively, in a case where the capacity 31213 is less than the sum of the used capacity 31214 and the write capacity (S701: No), the shared cache management program 3112 decides migration-target data from among the data stored in the local cache area 214 of the request-source computation node 2 based, for example, on a LRU (Least Recently Used) algorithm (S703). The shared cache management program 3112 reads the migration-target data from the local cache area 214 and temporarily stores this migration-target data in the normal cache area 3144.

The shared cache management program 3112, based on the cache management table 3122 and the address management table 3123, uses the page number corresponding to the migration-target data to retrieve the migration-target data and redundant data (matching data) from the local extended cache area 3141 and the shared cache area 3142 (S704).

In a case where the redundant data is not being stored in either of the local extended cache area 3141 or the shared cache area 3142 (S705: No), the shared cache management program 3112 references the configuration management table 3121 (the capacity 31213 of the node having the node identifier 31211 of "0"), and determines whether or not the capacity 31213 of the local extended cache area 3141 is equal to or larger than the sum of the used capacity 31214 and the migration capacity (the size of the migration-target data) (S706).

In a case where the capacity 31213 is equal to or larger than the sum of the used capacity 31214 and the migration capacity (S706: Yes), the shared cache management program 3112 writes the migration-target data to a free area in the local extended cache area, and adds the migration capacity to the used capacity 31214 of the local extended cache area in the configuration management table 3121 (S707).

Alternatively, in a case where the capacity 31213 is less than the sum of the used capacity 31214 and the migration capacity (S706: No), the shared cache management program 3112 decides the data to be swapped out from among the data stored in the local extended cache area 3141 (for example, makes a decision based on the LRU algorithm), swaps out the decided data from the local extended cache area 3141 to the storage device 34, and writes the migration-target data to the free area of the local extended cache area 3143 (the area in which the swapped out data had been stored) (S708). In addition, the shared cache management program 3112 updates the cache management table 3122 with respect to the area in which the swapped out data had been stored (the write-destination area of the migration-target data) (S709). Specifically, for example, the page number 31211 for the relevant area is changed from the page number of the swapped out data to the page number of the migration-target data. In this example, the size of the swapped out data (decided data) matches the size of the migration-target data, and as such, the updating of the used capacity 31214 as in S707 need not be performed. The size of the swapped out data (the decided data) may also be larger than the migration-target data.

In a case where the migration-target data is stored in either the local extended cache area 3141 or the shared cache area 3142 (S705: Yes), the shared cache management program 3112 determines whether the location in which the migration-target data and the redundant data are being stored is the local extended cache area 3141 or the shared cache area 3142 (S710).

In a case where the determination of S710 is that the redundant data is stored in the local extended cache area 3141, the shared cache management program 3112 references the configuration management table 3121 and determines whether or not the capacity 31213 of the shared cache area 3142 is equal to or larger than the sum of the used capacity 31214 and the redundant capacity (the size of the redundant data) (S711).

In a case where the capacity 31213 is equal to or larger than the sum of the used capacity 31214 and the redundant capacity (S711: Yes), the shared cache management program 3112 writes the redundant data to the shared cache area 3142, and adds the size of the redundant data to the used capacity 31214 of the shared cache area in the configuration management table 2131 (S712).

In a case where the capacity 31213 is less than the sum of the used capacity 31214 and the redundant capacity (S711: No), the shared cache management program 3112 decides the data to be swapped out of the shared cache area 3142 (for example, makes a decision based on the LRU algorithm), and stores the decided data in the storage device 34. The shared cache management program 3112 writes the redundant data to the free area of the shared cache area 3142 (the area in which the swapped out data had been stored) (S713). In addition, the shared cache management program 3112 deletes this redundant data from the local extended cache area 3141 (S714). Thereafter, the shared cache management program 3112 performs the processing of S709. The size of the data decided in S713 matches the size of the redundant data, but may be larger than the size of the redundant data.

In a case where the determination of S710 is that the redundant data is stored in the shared cache area 3142, the shared cache management program 3112 ends the processing.

Figure 18:
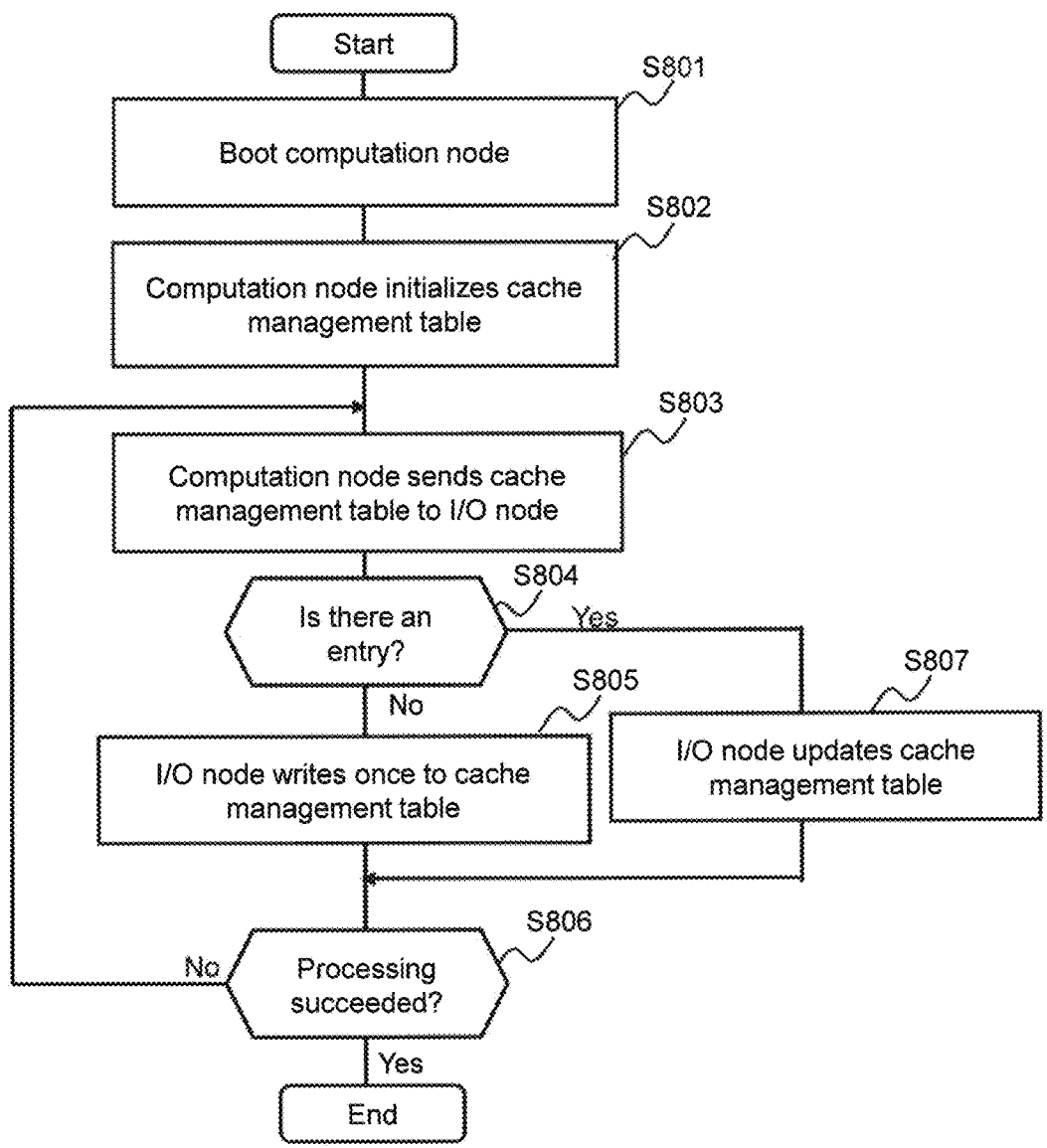
FIG. 18 is an example of a flowchart showing the flow of processing of the computation node 2 boot-up.

FIG. 18 is an example of a flowchart showing the flow of processing of the computation node 2 boot-up process.

When the computation node 2 is powered up (S801), the computation node 2 (the configuration information collection program 2111) executes an initialization process to delete all the data being managed in the cache management table 2122 (S802), and sends the configuration management table 2121 and the cache management table 2122 to the I/O node 3 (S803).

The I/O node 3 (the configuration information collection program 3111) receives the configuration management table 2121 and the cache management table 2122 from the computation node 2, and determines whether information based on these tables 2121 and 2122 is already registered in the address management table 3123 (S804).

In a case where there is no registration (S804: No), the I/O node 3 (the configuration information collection program 3111) references the unregistered configuration management table 2121 of the computation node 2, generates the same number of virtual addresses 31231 as there are physical addresses 21213, and registers the generated addresses in the address management table 3123 (S805). This processing associates the virtual local cache area 3143 of the I/O node 3 with the local cache area 214 of the computation node 2. Thereafter, the I/O node 3 determines whether or not this processing was a success (S806).

In a case where the processing was a success (S806: Yes), the I/O node 3 ends the processing. Alternatively, in a case where the processing failed (S806: No), the I/O node 3 performs the processing of S803.

In a case where the determination of S804 is that the information is registered (S804: Yes), the I/O node 3 configures the utilization statuses 31235 of all the computation nodes 2 corresponding to the address management table 3123 to unused (S807). Thereafter, the I/O node 3 performs the processing of S806.

Figure 19:
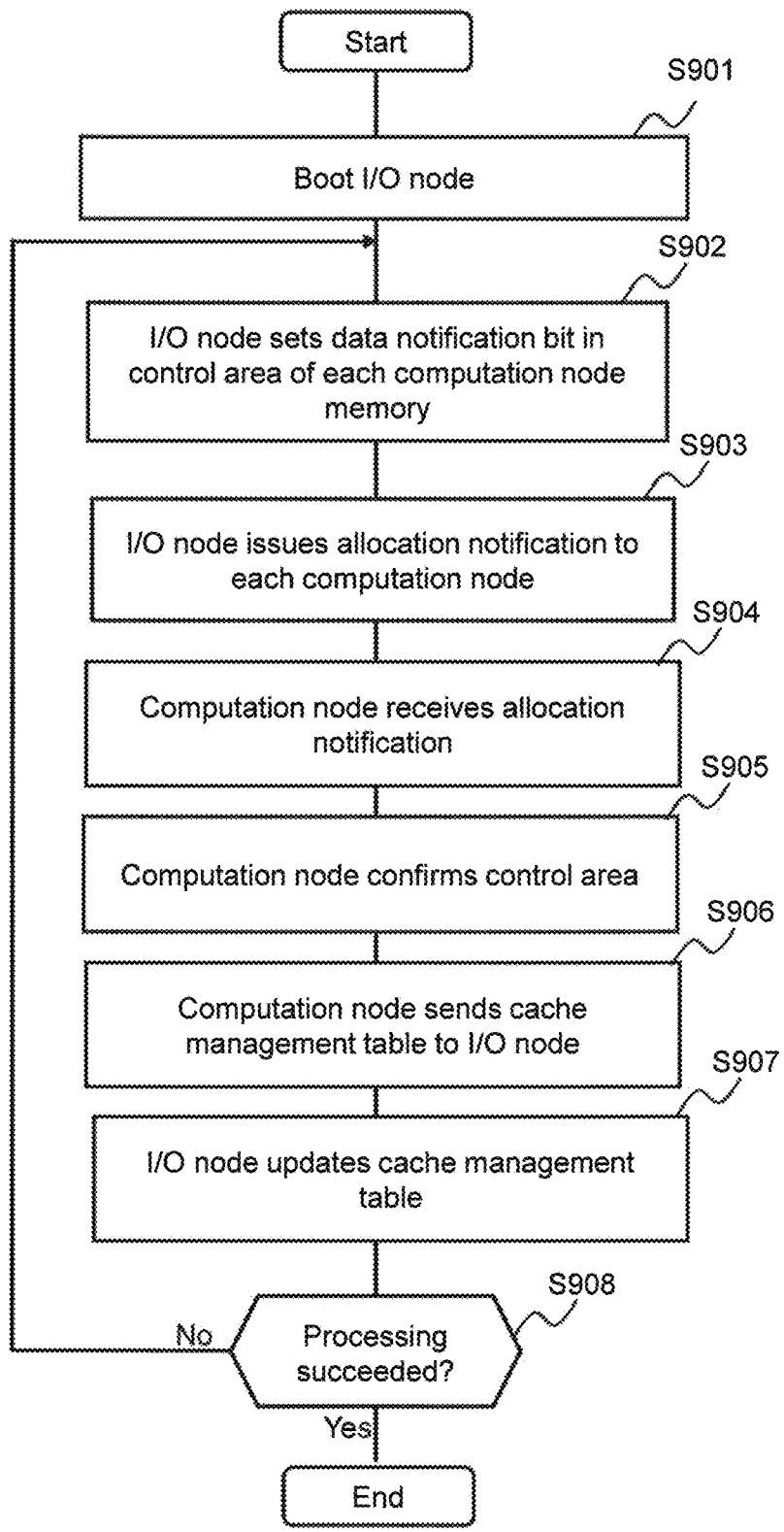
FIG. 19 is an example of a flowchart showing the flow of processing of an I/O node 3 boot-up.

FIG. 19 is an example of a flowchart showing the flow of processing an I/O node 3 boot-up process.

When the I/O node 3 is powered up (S901), the I/O node 3 (the configuration information collection program 3111) uses the RDMA function, sets a data notification bit in the control command storage area 215 of each computation node 2 memory (S902), and sends an interrupt notification to each computation node 2 (S903).

The computation node 2 (the configuration information collection program 2111) receives the interrupt notification from the I/O node 3 (S904), checks that a data notification bit is stored in the control command storage area 215 of the memory 21 (S905), and sends the cache management table 2122 information held by this computation node 2 to the I/O node 3 (S906).

The I/O node 3 receives the cache management table 2122 information from the computation node 2, and registers information based on this information in the cache management table 3122 (S907). The I/O node 3 determines whether or not the processing of S907 was a success (S908).

In a case where the processing was a success (S908: Yes), the I/O node 3 ends the processing. Alternatively, in a case where the processing failed (S908: No), the I/O node 3 performs the processing of S902.

According to Example 1, in a computer system 1 in which an I/O node 3 is coupled to multiple computation nodes 2, it is possible to share data in a cache area without duplication.

In addition, it is also possible to share frequently used data in a cache area between computation nodes 2 by forming a cache area (a shared cache area), which stores data referenced by multiple computation nodes 2. Therefore, it is possible to enhance the processing performance of an application program running on the computation node 3 without increasing the capacity of the cache area of each computation node 1, and, in addition, also enables I/O requests from multiple computation nodes to be concentrated in the local cache area of a computation node to avoid the deterioration of application program processing performance.

Example 2

Example 2 will be explained hereinbelow. In so doing, the differences with Example 1 will mainly be explained, and explanations of points in common with Example 1 will either be simplified or omitted.

In Example 2, in a case where there is an I/O request from the application program 4, each computation node 2 determines whether or not the request data is stored in the local cache area 214 of the computation node 2, and in a case where the data is being stored, returns the stored data to the application program 4 without sending the I/O request to the I/O node 3.

Figure 20:
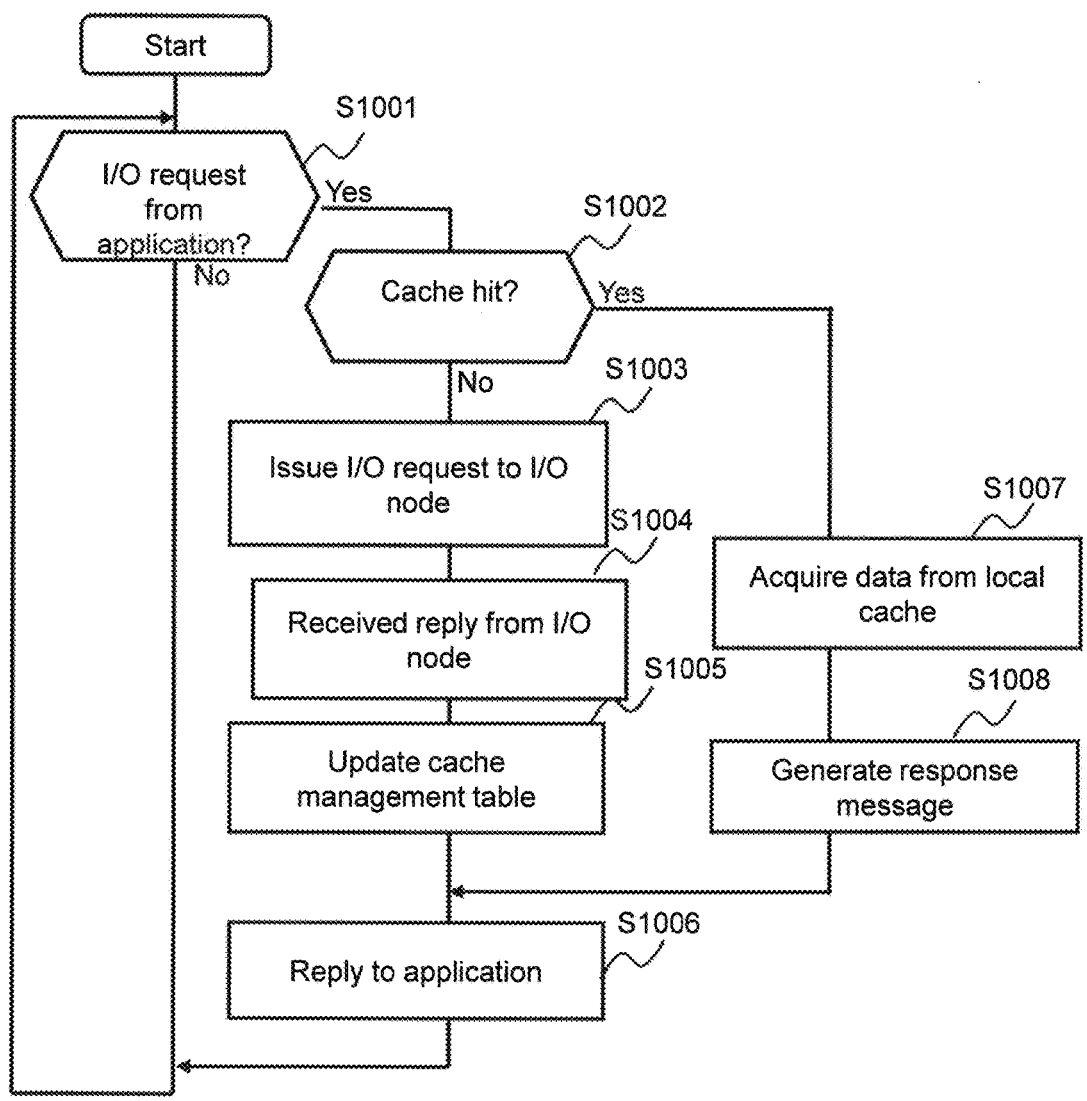
FIG. 20 is an example of a flowchart showing the flow of processing of a cache management program 2113 related to Example 2.

FIG. 20 is an example of a flowchart showing the flow of processing of a cache management program 2113 related to Example 2.

The cache management program 2113 determines whether or not there is an I/O request from the application program 4 (S1001).

In a case where there is no I/O request (S1001: No), the cache management program 2113 performs the processing of S1001.

Alternatively, in a case where there is an I/O request (S1001: Yes), the cache management program 2113 references the cache management table 2122, and determines whether the requested data is stored in the local cache area 214 (S1002).

In a case where the requested data is not being stored in the local cache area 214 (S1002: No), the same processing as the processing of S302 through S305 of FIG. 13 is performed (S1003 through S1006).

Alternatively, in a case where the requested data is stored in the local cache area 214 (S1002: Yes), the cache management program 2113 acquires the data from the local cache area 214 rather than from the cache area 314 of the I/O node 3 (S1007). The cache management program 2113 generates a response message for the application program 4 (S1008). Thereafter, the cache management program 2113 performs the processing of S1006.

Example 3

Example 3 will be explained. In so doing, the points of difference with Example 1 and Example 2 will mainly be explained, and explanations of the points in common with Example 1 and Example 2 will either be simplified or omitted.

In Example 3, the computation nodes 2 include a virtual node (a virtual computer) in addition to a physical node. There is no I/O node 3 in Example 3, and in place of the I/O node 3, any virtual node performs the same processing as the I/O node 3.

Figure 21:
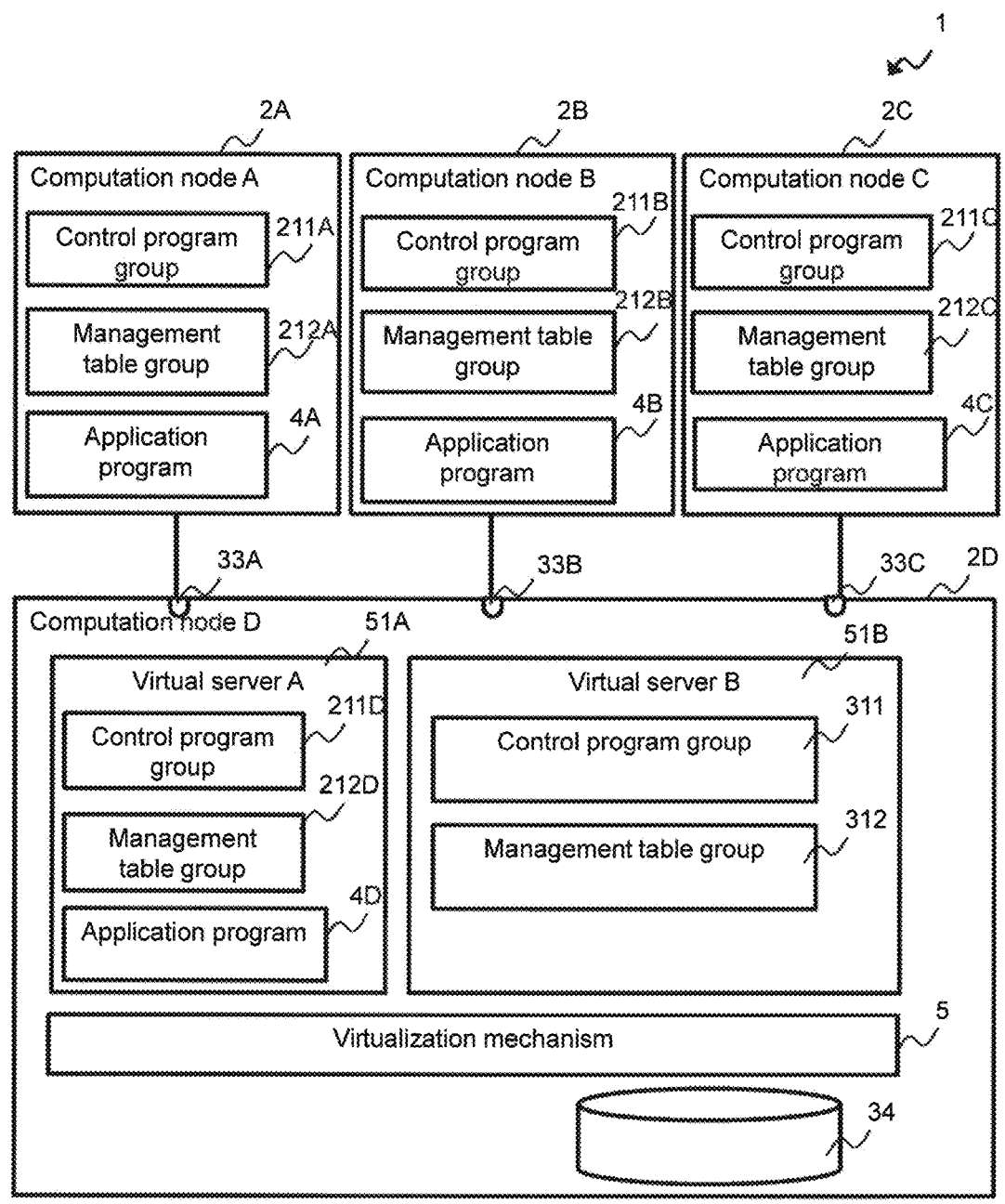
FIG. 21 shows an example of the overall configuration of a computer system 1 related to Example 3.

FIG. 21 shows the overall configuration of a computer system 1 related to Example 3.

There is a computation node 2D, which has a storage device 34. The computation node 2D generates and manages one or more virtual servers 51 by executing a virtualization mechanism 5 (for example, a hypervisor). The virtual servers 51 include a virtual server 51A, which is a virtual computation node 2, and a virtual server 51B, which performs the same processing as the I/O node 3.

The processor 22 executes processing as a computation node by executing the required processing based on a control program group 211D and a management table group 212D, which are stored in a memory area (omitted from the drawing) allocated to the virtual server 51A from within the memory 21. In addition, the processor 22 executes processing as an I/O node by executing the required processing based on a control program group 311 and a management table group 312, which are stored in a memory area (omitted from the drawing) allocated to the virtual server 51B from within the memory 21.

This example employs a configuration, which partitions processing using a virtualization mechanism, but either an OS thread partition or processing partition function may be employed without using the virtualization mechanism.

A number of examples have been explained hereinabove, but the present invention is not limited to these examples.

For example, in the examples described above, in the processing of S603 (refer to FIG. 16) of the computation node 2 cache management part 2113, data was written to an area corresponding to a request source, but a hash value or the like may be used to uniquely decide a computation node 2 for storing data so as not to duplicate data between computation nodes 2.

In the examples described above, the cache data of the local cache area 214, the local extended cache area 3141, and the shared cache area 3142 are updated at the time of a read request from the application program 4. However, the shared cache management program 4112 may comprise a control API to arrange data in accordance with a specification from the application program 4. In accordance with this, the processing of S603, S604, and S605 in the processing of the cache management program 4112 are omitted and not performed.

In the examples described above, in the shared cache management program 3112 of the I/O node 3, data was migrated from the one computation node 2 (for example, computation node 2A) to the other computation node (for example, computation node 2B) via the I/O node 3 in accordance with a RDMA communication in a case where a cache hit occurred in any virtual local cache 3143, but a direct RDMA communication process may be performed between the computation nodes 2 (for example, computation nodes 2A and 2B) without going through the cache area 314 of the I/O node 3.

In the examples described above, the application program 4 sends an I/O request, which specifies a page number, but an I/O request may be sent using a virtual address specification.

In addition, in the examples described above, the processing for specifying the capacity of the local cache area 214 is performed by the configuration information collection program 2111 of the computation node 2, but this processing may be performed by the configuration information collection program 3111 of the I/O node 3.

In addition, in the examples described above, one local extended cache area 3141 is formed in the memory 21, but multiple local extended cache areas 3141 may be formed in each computation node.

In the examples described above, the local extended cache area 3141 and the shared cache area 3142 were logically partitioned and managed in the memory 31, but the two areas may be managed as a single area.

In the examples described above, to ensure that data in the local extended cache area 3141 and the shared cache area 3142 was not duplicated, a check was performed to determine whether or not the data being stored in this two cache areas was redundant, but this processing may be omitted.

In the examples described above, the configuration is such that the interfaces 23 and 33 of the computation node 2 and the I/O node 3 are coupled without going through a prescribed apparatus, but, for example, the computation node 2 interface 22 and the I/O node 3 interface 33 can be coupled via a switch. In so doing, for example, in a case where there are multiple computation nodes 2 and I/O nodes 3, when data is to be sent from a certain computation node 2 to a specific I/O node 3, the computation node 2 may send information identifying the I/O node 3 to the switch apparatus at the same time as the I/O request. This makes it possible for the switch to identify a specific computation node 2, and to distribute an I/O request from the computation node 2 to the specific I/O node 3.

The storage device may comprise logical areas, and each logical area may an element comprising a stripe based on a RAID group. Each logical area group may be a component of a logical unit provided to an apparatus, which is the source of a write request (for example, either a host computer or another storage system), or may be an area group (an area group allocated to the write-destination virtual segment corresponding to the write to the virtual segment), which is dynamically allocated to any of multiple virtual segments (virtual storage areas) comprising a virtual logical unit (for example, a logical unit conforming to Thin Provisioning) provided to the write request source apparatus. In the case of the latter, a storage area pool may be configured using multiple logical segments, and may be allocated to the virtual segment in logical segment units. The storage area pool may comprise multiple logical units, and in accordance with this, each logical unit may comprise two or more logical segments.

The swap-out process may be performed at a different time either instead of or in addition to being performed during a series of processes (S504 of FIG. 15) performed after receiving the I/O request.

Hitherto, Examples 1 to 3 have been explained. In Examples 1 to 3, data arranged in the local cache areas of multiple computation nodes 2 is integratively managed in the cache area 314 of the I/O node 3. In other words, the I/O node 3 performs cache control processing in which the arrangement of the data in the local cache area of the computation node 2 is controlled. However, in this case, even when I/O is generated in any of the computation nodes 2, the communication between the computation node 2 and the I/O node 3 is generated, thereby the bandwidth utilization efficiency may deteriorate.

Therefore, in Examples 4 to 6 described below, multiple computation nodes (also including a management node in Example 5) each perform the cache control processing.

Example 4

Example 4 will be explained. Herein, the differences from Examples 1 to 3 will be mainly explained, and explanations of points in common with Examples 1 to 3 will either be simplified or omitted. Further, in the following explanation, in a case where the similar elements are separately explained, all the symbols may be used (for example, the computation nodes 2A and 2B), and in a case where the similar elements are explained without distinction therebetween, only a common symbol of the symbols may be used (for example, the computation node 2). Further, this may be also the same even in Examples 1 to 3.

In Example 4, the computation node 2 (specifically, the cache management program 2113 of FIG. 23) performs the cache control processing.

Figure 50:
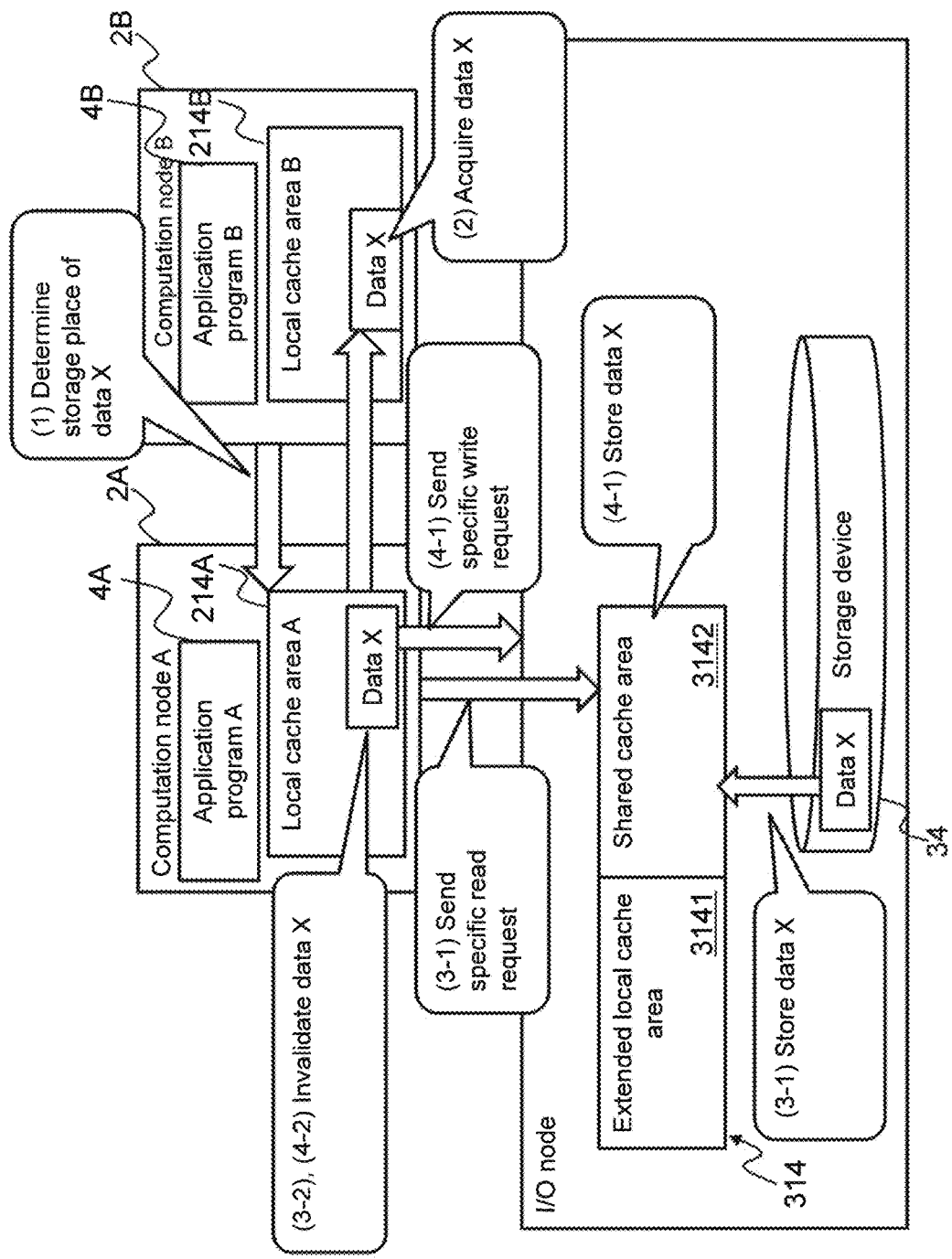
FIG. 50 is a schematic diagram for illustrating the migration of data according to cache control processing related to Example 4.

FIG. 50 is a schematic diagram for illustrating the migration of data according to cache control processing related to Example 4. Further, in the explanation of FIG. 50, it is supposed that the computer system 1 is as substantially explained in (1), (3), and (4) of FIG. 22.

<Data Migration Process>

Herein, a process of migrating the data X from the local cache area A (214A) to the shared cache area 3142 will be explained.

First, as an assumption, the read request is issued to read the data X from the application program A (4A) of the computation node A (2A), the computation node A (2A) sends the read request to the I/O node 3, and the data X received from the I/O node 3 in response to the read request is stored in the local cache area A (214A).

In addition, the computation node 2 includes the cache management table 2122 and an address management table 2123 (see FIG. 25) to be described below. These tables 2122 and 2123 having the computation node 2 is sent to another computation node 2 by a predetermined opportunity. In addition, the address management table 3123 of the I/O node 3 is also sent to the computation node 2 by a predetermined opportunity.

In a case where the data is stored in the cache area of the computation node 2 of its own and even in a case where is stored in the cache areas of another computation node 2 and the I/O node 3, the respective computation nodes 2 can identify the physical address of the data by using these tables 2122 and 2123 and the address management table 3123. For example, the operation is as follows.

(1) In a case where a read request for the data X (more properly, for example, a read request for specifying an address of a page with the data X stored) is issued from the application program B of the computation node B (2B), the computation node B (2B) uses the cache management table 2122 and the address management table 2123 of the computation node B (2B) to identify that the data X is stored in the local cache area A (214A) of the computation node A (2A).

(2) The computation node B (2B) acquires the data X from the local cache area A (214A) of the computation node A (2A) through the RDMA transfer process. Specifically, the computation node B (2B) sends a read request for specifying a virtual address (or a physical address) of the data X to the computation node A (2A). The computation node A (2A) receives the read request, reads the data X from the local cache area A (214A) based on the virtual address (or the physical address) specified by the read request and the table 2123 (and 2122), and sends the read data X to the computation node B (2B).

Thereafter, the computation node A (2A) stores the data X in the shared cache area 3142 to allow another computation node B (2B) to use the data X without passing through the computation node A (2A). Then, the computation node B (2B) acquires the data X from the shared cache area 3142. In this way, it is possible to avoid a load on the computation node A (2A) having the frequently used data X stored therein due to the access from another computation node B (2B).

In this example, there are two methods in which the computation node A (2A) causes the I/O node 3 to store the data X in a desired area (for example, the shared cache area 3142) of the computation node A (2A) from among multiple areas included in the cache area 314 of the I/O node 3. In the following, the two methods will be explained.

<Method 1 of Storing Data X in Shared Cache Area 3142>

(3-1) the computation node A (2A) (for example, the cache management program of the computation node A (2A)) sends a specific read request for the data X to the I/O node 3. The specific read request of the data X is sent in a case where the data X stored in the local cache area A (214A) is acquired from another computation node B (2B). Herein, the "specific read request" is a read request which contains information indicating an area in the cache area 314 of the I/O node 3. The "information indicating an area in the cache area 314" may be an address (the virtual address or the physical address) of the cache area 314, or may be an ON/OFF flag indicating the type of an area (for example, the shared cache area 3142 or the extended local cache area 3411) in the cache area 314. In this example, the address (the virtual address or the physical address) of the cache area 314 is employed. In a normal read request, information (for example, an LUN (Logical Unit Number) and an LBA (Logical Block Address)) indicating an area of a logical volume provided by the I/O node 3 to the computation node is specified, but there is no specified information indicating an area in the cache area 314. In order to make a distinction from such a normal read request, the read request containing the information indicating an area in the cache area 314 will be referred to as a "specific read request" for convenience sake. In the specific read request, the information indicating an area of the logical volume may be specified in addition to the information indicating an area in the cache area 314. The I/O node 3 receiving the specific read request reads the data X out of the storage device 34, stores the read data X in an area in the shared cache area 3142 specified by the specific read request, and then sends the data X to the computation node A (2A).

(3-2) The computation node A (2A) receives the data X from the I/O node 3, and invalidates the data X stored in the local cache area A (214A) without storing the data X in the local cache area A (214A). The "invalidating of the data X stored in the local cache area A (214A)" may means that the data X is erased from the local cache area A (214A), or that the computation node A (2A) manages the data X as invalid data.

In Method 1, the I/O node 3 receives the specific read request from the computation node A (2A), and stores the data X in the shared cache area 3142 based on the specific read request. In other words, in Method 1, the I/O node 3 performs a process of reading the data X out of the storage device 34 and a process of sending the read data to the computation node A (2A).

<Method 2 of Storing Data X in Shared Cache Area 3142>

(4-1) The computation node A (2A) sends a specific write request for the data X to the I/O node 3. The specific write request of the data X is sent in a case where the data X stored in the local cache area A (214A) is acquired from another computation node B (2B). Herein, the "specific write request" is a write request which contains information indicating an area in the cache area 314 of the I/O node 3. In this example, the "information indicating an area in the cache area 314" is an address of the cache area 314 (the virtual address or the physical address) as described above. In a normal write request, information indicating an area of the logical volume provided by the I/O node 3 to the computation node is specified, but information indicating an area in the cache area 314 is not specified. In order to make a distinction from such a normal write request, the write request containing the information indicating an area in the cache area 314 will be referred to as a "specific write request" for convenience sake. The specific write request is a request for writing the write-target data in an area of the cache area 314 but not in the logical volume. For example, in the specific write request, the information indicating an area in the cache area 314 is specified, but the information indicating an area of the logical volume is not specified (or, there is specified information such as a flag meaning that the information indicating an area of the logical volume is specified as dummy data and thus the data is not written in the logical volume). The I/O node 3 receives the specific write request of the data X, and stores the data X associated with the specific write request in the shared cache area 3142 according to the specific write request.

(4-2) The computation node A (2A) invalidates the data X stored in the local cache area A (214A).

The computation node 2 may send the specific read request and the specific write request, for example, by using a cache control API (Application Program Interface) provided by the I/O node 3.

The computation node A (2A) may use the specific read request and the specific write request in different ways according to a status of the computation node A (2A) or the I/O node 3. For example, in a case where transfer data is large, or in a case where an I/O request is frequently issued from another computation node 2, the computation node A (2A) may select the specific write request in order to complete a transfer process in a short time and, in other cases, may select the specific read request.

In addition, in both Methods 1 and 2 described above, the computation node B (2B) requesting for the data X instead of the computation node A (2A) requested for the data X may send the specific read request or the specific write request of the data X to the I/O node 3.

Specifically, in Method 1, the computation node B (2B) may send the specific read request of the data X to the I/O node 3 before acquiring the data X from the computation node A (2A). In this case, since the data X is not stored in the local cache area B (214B), the computation node B (2B) need not perform a process of invalidating the data X. In addition, in a case where the data X is acquired by the computation node B (2B), the computation node A (2A) invalidates the data X from the local cache area A (214A).

In addition, in Method 1, after acquiring the data X from the computation node A (2A), the computation node B (2B) may send the specific read request for the data X to the I/O node 3. In this case, since the data X is stored in the local cache area B (214B), the computation node B (2B) performs a process of invalidating the data X. In addition, in a case where the data X is acquired by the computation node B (2B), the computation node A (2A) invalidates the data X from the local cache area A (214A) after receiving a completion notification on the specific read process from the computation node B.

Alternatively, in Method 2, the computation node B (2B) sends the specific write request for the data X to the I/O node 3 after acquiring the data X from the computation node A (2A).

Hereinafter, Example 4 will be explained in more detail.

Figure 23:
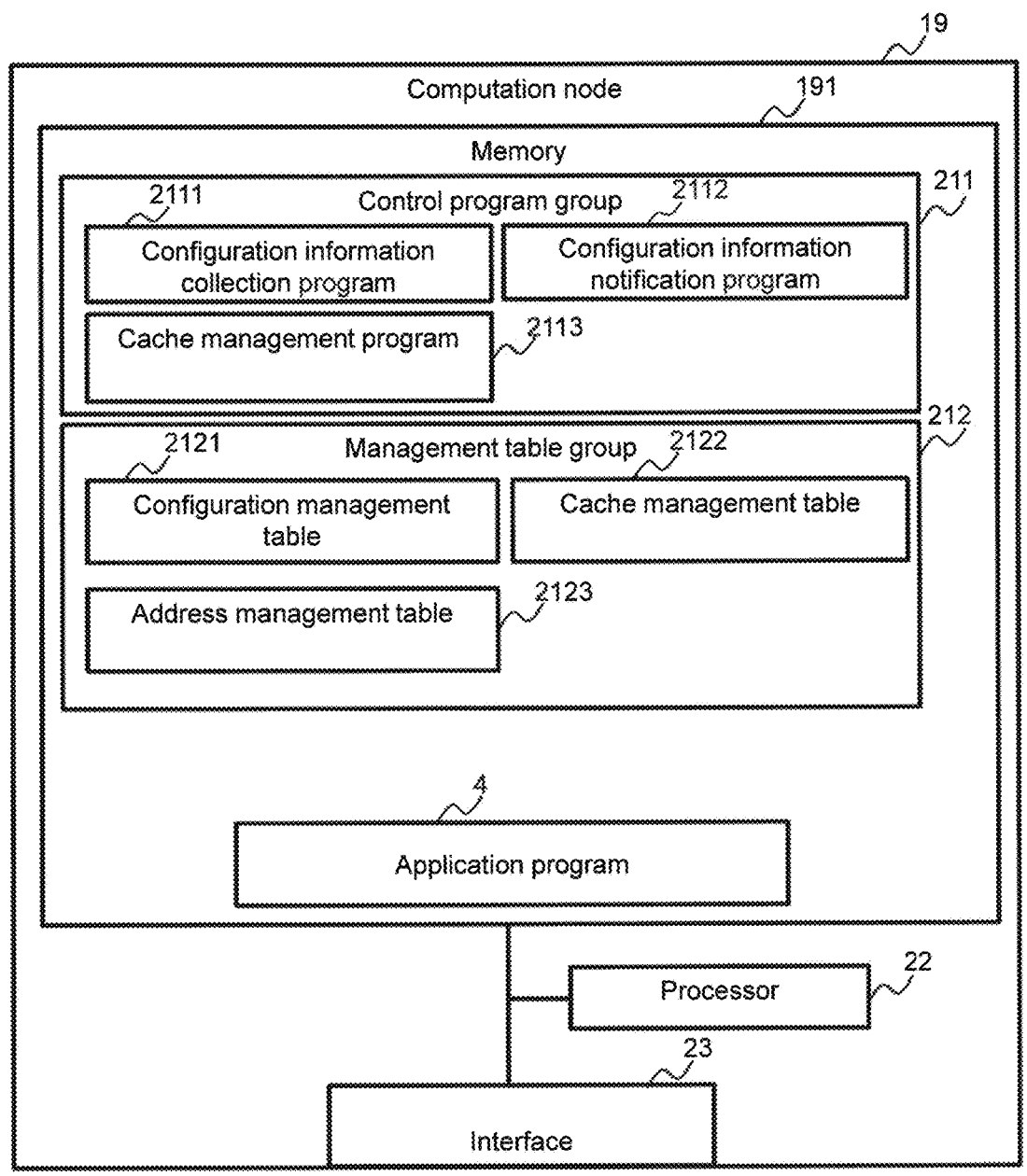
FIG. 23 is a block diagram showing an example of the configuration of the computation node 2 related to Example 4.

FIG. 23 is a block diagram showing an example of the configuration of the computation node 2 related to Example 4.

The memory 21 stores the control program group 211 and the management table group 212.

The programs 2111 to 2113 of the control program group 211, for example, may be different from the programs 2111 to 2113 of the control program group 211 of Example 1, respectively. At least the cache management program 2113 is different from the cache management program 2113 of Example 1. For example, the cache management program 2113 performs the data migration process as explained with reference to FIG. 50 in addition to the process similar to the cache management program 2113 of Example 1.

The tables 2121 and 2122 of the control table group 212, for example, may be different from the tables 2121 and 2122 of the control table group 212 of Example 1, respectively. For example, the cache management table 2122 may contain the physical address 21222 of the cache management table 2122 of FIG. 7 as a virtual address, while not illustrated in the drawing.

In addition, the control table group 212 further includes the address management table 2123. The details of the address management table 2123 will be described below.

Figures 24, 25:
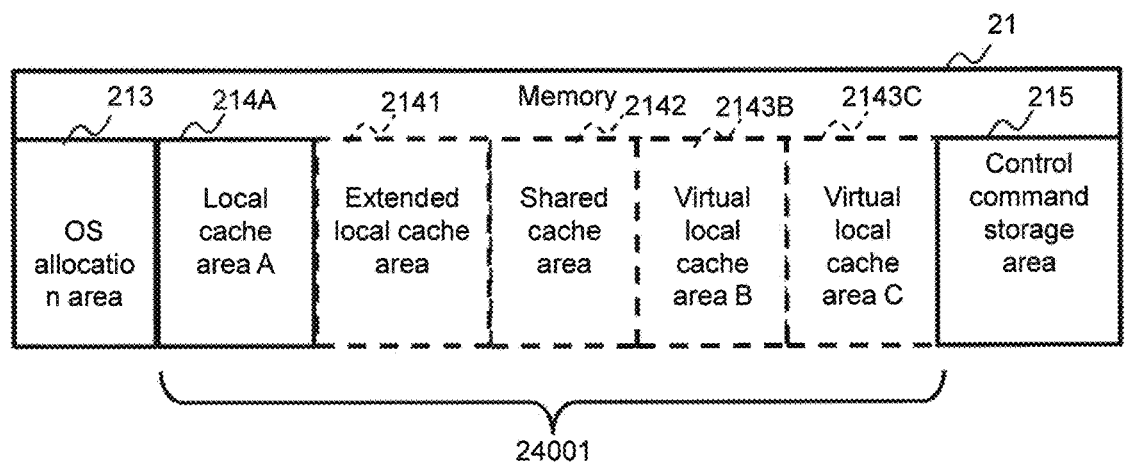
FIG. 24 is a schematic diagram for illustrating a method for using the memory 21 of a computation node 2A related to Example 4.
FIG. 25 shows an example of an address management table 2123 of the computation node 2A related to Example 4.

FIG. 24 is a schematic diagram for illustrating a method for using the memory 21 of the computation node 2A related to Example 4.

The memory 21 includes a virtual local extended cache area 2141, a virtual shared cache area 2142, and virtual local cache areas B (2143B) and C (2143C) in addition to the OS allocation area 213, the local cache area A (214A), and the control command storage area 215. In other words, in Example 4, the virtual areas 2141, 2142, 2413B, and 2413C are managed as the storage area of the memory 21 in addition to the physical areas 213, 214A, and 215. The virtual local extended cache area 2141 is an area associated with the local extended cache area 3141 of the I/O node 3, and the virtual shared cache area 2142 is an area associated with the shared cache area 3142 of the I/O node 3. In addition, the virtual local cache areas B (2143B) and C (2143C) are associated with the local cache areas B (214B) and C (214C) of the other computation nodes B (2B) and C (2C), respectively. A cache area 24001 of the memory 21 includes the local cache area A (214A) and the virtual areas 2141, 2142, 2413B, and 2413C.

FIG. 25 shows an example of the address management table 2123 of the computation node 2A related to Example 4.

The configuration of the address management table 2123 is equal to the address management table 3123 of the I/O node 3 in Example 1 (see FIG. 10). In other words, information 21231 to 21235 is equal to the information 31231 to 31235 of Example 1, respectively. However, according to FIG. 25, a physical location 21233 corresponding to attribute values 21232 "extended" and "shared" is the "I/O node" unlike the physical location 31233 of Example 1. This is because entities of the local extended cache area 3141 and the shared cache area 3142 are in the I/O node 3.

Using the address management table 2123 and the above-mentioned cache management table 2122, the computation node A (2A) can determine whether the read-target data is stored in the local cache area A (214A) of the computation node A (2A) or in the cache area 314 of the other computation nodes B (2B) and C (2C) or the I/O node 3.

Figures 26, 27:
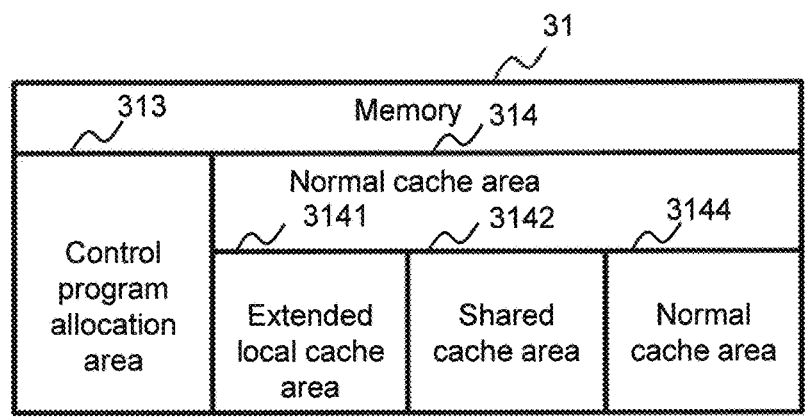
FIG. 26 is a schematic diagram for illustrating a method for using the memory 31 of the I/O node 3 related to Example 4.
FIG. 27 shows an example of an address management table 3123 related to Example 4.

FIG. 26 is a schematic diagram for illustrating a method for using the memory 31 of the I/O node 3 related to Example 4. FIG. 27 shows an example of the address management table 3123 related to Example 4.

In Example 4, the I/O node 3 does not manage the virtual local cache area 3143 in Example 1. For this reason, the cache area 314 of the memory 31 includes the local extended cache area 3141, the shared cache area 3142, and the normal cache area 3144, but does not include the virtual local cache areas 3143A to 3143C. In addition, since the I/O node 3 does not manage the virtual local cache areas 3143A to 3143C, "Virtual A" to "Virtual C" are not stored in the attribute value 31232 in the address management table 3123.

Figure 28:
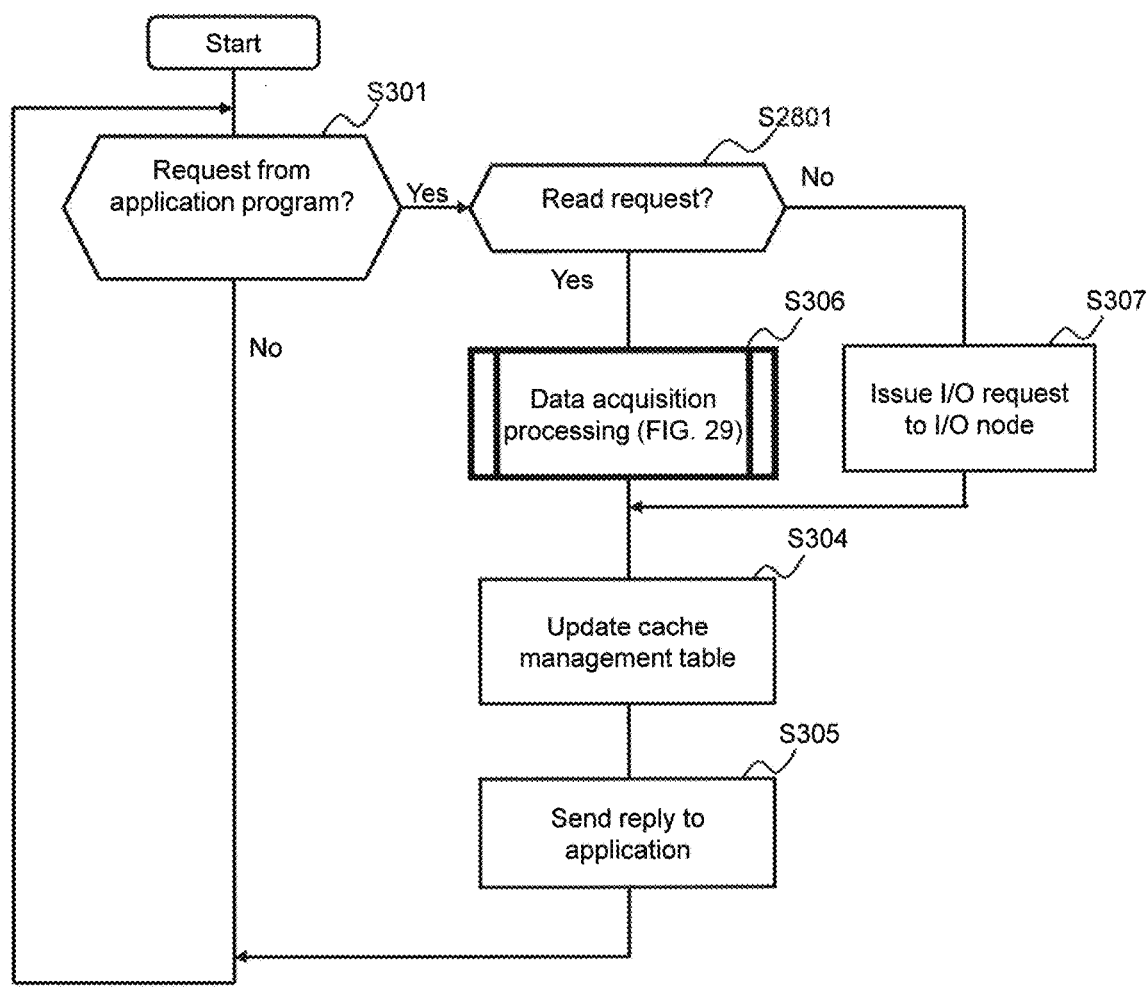
FIG. 28 is an example of a flowchart of the processing of the cache management program 2113 of the computation node 2 related to Example 4.

FIG. 28 is an example of a flowchart of the processing of the cache management program 2113 of the computation node 2 related to Example 4.

The cache management program 2113 determines whether the I/O request received from the application program 4 in S301 is the write request or the read request (S2801). In a case where the I/O request is the write request (S2801: No), the cache management program 2113 transmits the write request to the I/O node 3, and performs the processing of S302 through S305 explained in Example 1 after the response thereof is received. In a case where the I/O request is the read request (S2801: Yes), the cache management program 2113 performs data acquisition processing (S306) and then performs the processing of S304 and S305.

Figure 29:
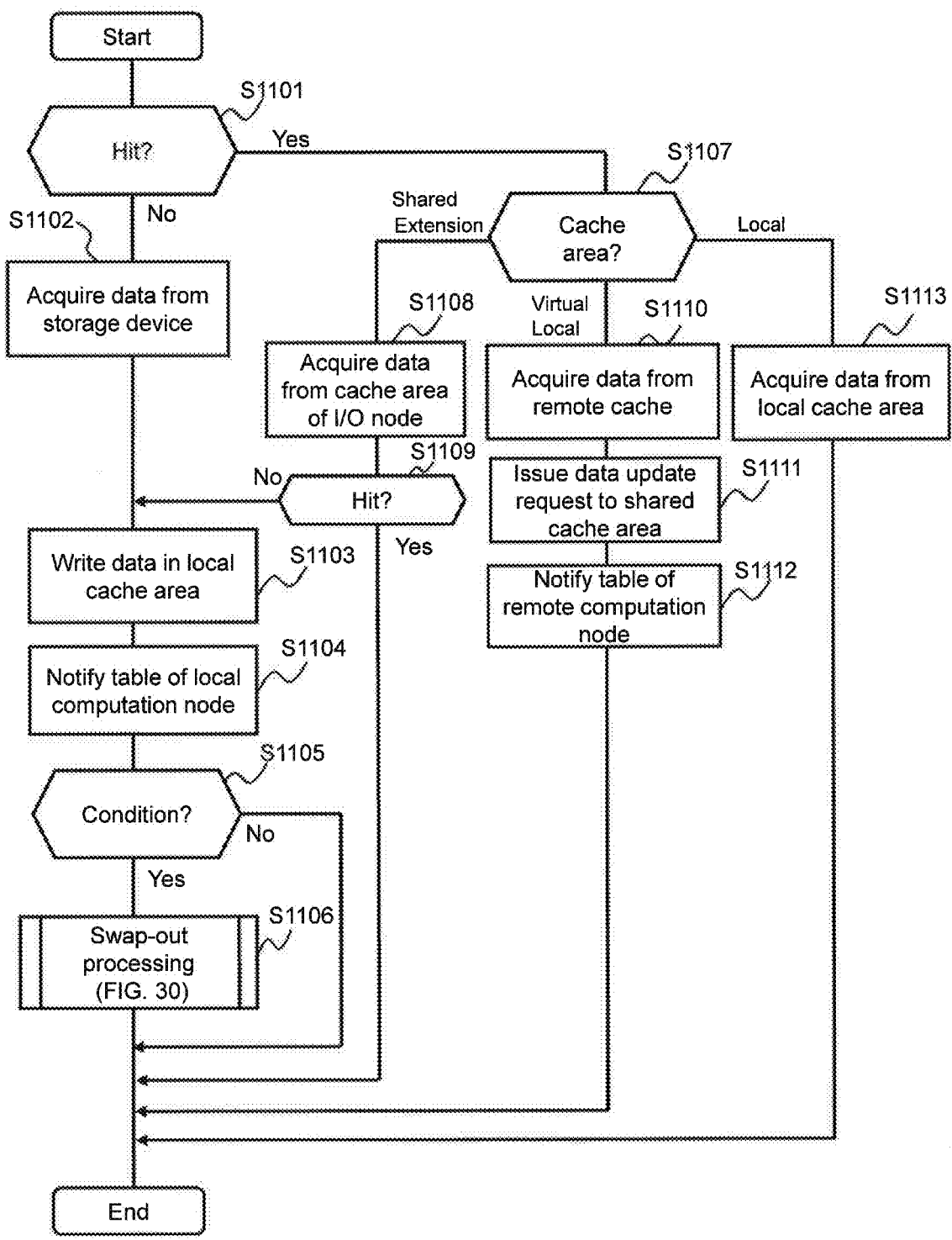
FIG. 29 is a detailed example of data acquisition processing (S306 of FIG. 28) of the computation node 2 related to Example 4.

FIG. 29 is a detailed example of data acquisition processing (S306 of FIG. 28) of the computation node 2 the computation node 2 related to Example 4.

The cache management program 2113 determines which one of a cache hit and a cache miss occurs with reference to the cache management table 2122 (S1101). In a case where there is an entry containing a page number of a read-source page (a page to which an address (an address in the address range of the logical volume) specified by the read request belongs), the cache hit occurs. Further, a page to which the address belongs, for example, may be specified such that the computation node refers to a table (in which a relation between an address and a page is registered, while not illustrated in the drawing) of the computation node 2, or may be specified by the computation node 2 through calculation.

In a case where the cache miss occurs (S1101: No), the cache management program 2113 reads the read-target data out of the read-source page (the storage device 34) (S1102), and stores the read data in the local cache area 214 (S1103). The processing of S1102 corresponds to the processing of S302 and S303 of FIG. 13. The cache management program 2113 changes a utilization status 21235 in the address management table 2123 (corresponding to the virtual address of a storage destination in S1103) to "Used", and notifies the other computation nodes 2 about that a changed content (for example, all information in a record containing the changed place) in the address management table 2123 of its own (S1104).

Thereafter, the cache management program 2113 determines whether the local cache area 214 satisfies a predetermined condition (S1105). Specifically, for example, the cache management program 2113 determines whether or not the remaining amount of capacity (or the free capacity ratio) of the local cache area 214 is equal to or less than a predetermined value. This determination can be made when the cache management program 2113 refers to the configuration management table 2121. In a case where the local cache area 214 satisfies the predetermined condition (S1105: Yes), the cache management program 2113 performs swap-out processing (S1106).

In a case where the cache hit occurs (S1101: Yes), the cache management program 2113 refers to the address management table 2123 to determine whether an area (hereinafter, a "hit area" in the description of FIG. 29) having the read-target data stored therein corresponds to any of the local cache area 214, the local extended cache area 2141, the shared cache area 2142, and the virtual local cache areas 2143B and 2143C (S1107).

As a result of the determination of S1107, in a case where the hit area is the local extended cache area 2141 or the shared cache area 2142, the cache management program 2113 makes a request for the I/O node 3 of acquiring the read-target data by using the address management table 2123 (S1108). Specifically, the cache management program 2113 sends a specific read request for specifying an address (for example, the physical address) corresponding to the local extended cache area 2141 or the shared cache area 2142, and specifying no address of the logical volume. In response to the request of S1108, the cache management program 2113 determines which one of the cache hit and the cache miss occurs (S1109). In a case where the data is received within a predetermined time period after the start of S1108, it is determined that the cache hit occurs. In a case where the data has not been received within the predetermined time period after the start of S1108, it is determined that the cache miss occurs. In a case where the cache hit occurs (S1190: Yes), the cache management program 2113 temporarily stores the received data in the memory 21. In a case where the cache miss occurs (S1109: No), the cache management program 2113 performs S1103.

Through the determination of S1109, since the I/O node 3 performs the swap-out processing after the cache hit is determined in S1101, the computation node 2 can detect a case where the read-target data disappears from the shared cache area 2142, or a case where the process is delayed due to a high load on the I/O node 3. Then, when such cases are detected, the computation node 2 stores the read-target data in the local cache area 214. Therefore, it is possible to suppress the degradation in performance of the entire computer system 1.

By the way, in the determination of S1107, in a case where the hit area is the virtual local cache area 2143, a cache management program 22113 acquires the read-target data from the local cache area B (214B) (or C (214C)) associated with the virtual local cache area B (2143B) (or C (2143C)) through the RDMA transfer process (S1110). Thereafter, in order to move the acquired data to the shared cache area 2142, the cache management program 2113 sends the specific write request (the specific write request in which an address of the shared cache area 2142 is specified) (or the specific read request) for the acquired data to the I/O node 3 (S1111). The cache management program 2113 changes the utilization status 21235 corresponding to the read-source virtual address in the address management table 2123 to be "Unused", and notifies the other computation nodes 2 about the change content of the address management table 2123 of its own (S1112). In the other computation nodes 2, the address management table 2123 is updated based on the changed content of the received address management table 2123.

In the determination of S1107, in a case where the hit area is the local cache area 214, the cache management program 22113 acquires the read-target data from the local cache area with reference to the cache management table 2122 (S1108).

Figure 30:
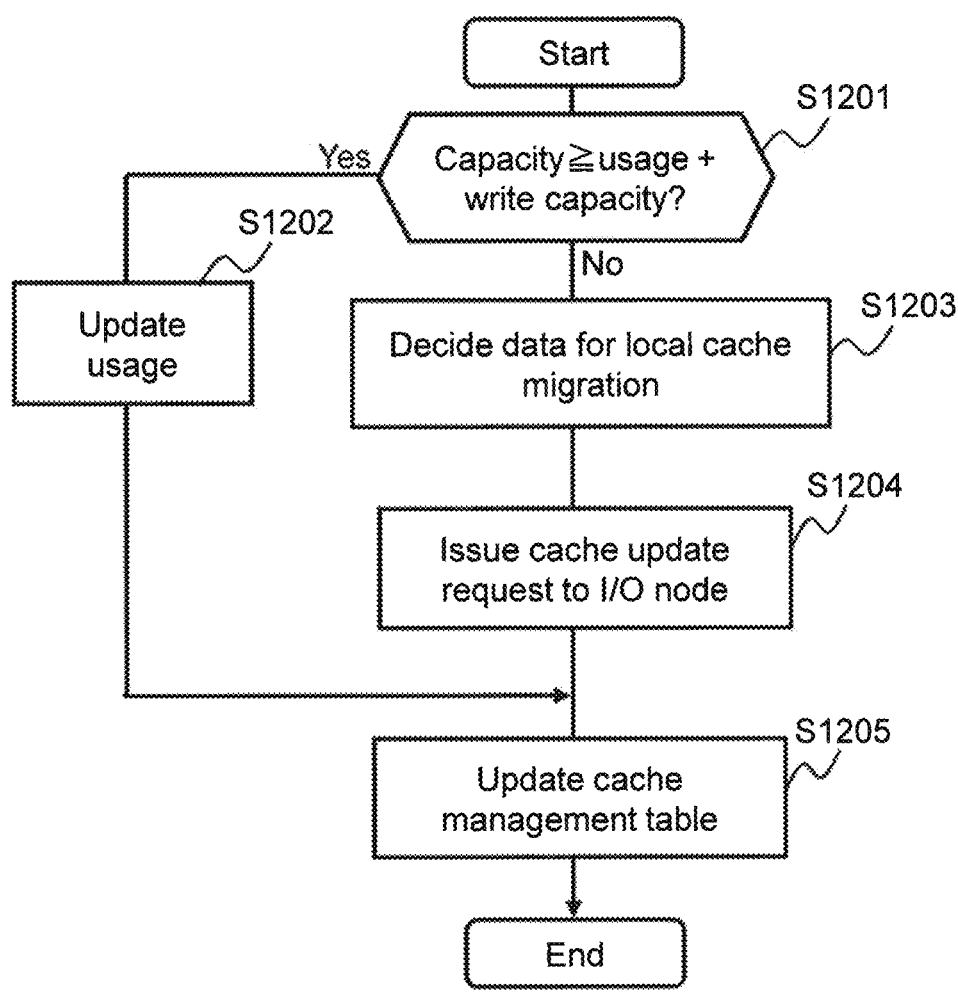
FIG. 30 is a detailed example of swap-out processing (S1106 of FIG. 29) of the computation node 2 related to Example 4.

FIG. 30 illustrates a detailed example of swap-out processing (S1106 of FIG. 29) of the computation node 2 related to Example 4.

The swap-out processing is performed based on the amount of remaining amount of capacity of the local cache area 214. Specifically, for example, the cache management program 2113 refers to the configuration management table 2121 to determine whether a capacity 21213 is equal to or larger than the sum of a used capacity 21214 and a write capacity (a size of the write-target data) (S1201).

In a case where the capacity 21213 is equal to or larger than the sum of the used capacity 21214 and the write capacity (S1201: Yes), the cache management program 2113 writes the write-target data in the local cache area 214, and adds the value of the write capacity in the used capacity 21214 (S1202).

Alternatively, in a case where the capacity 21213 is less than the sum of the used capacity 21214 and the write capacity (S1201: No), the cache management program 2113 decides the migration-target data among the data stored in the local cache area 214, for example, based on an LRU (Least Recently Used) algorithm (S1203). Next, the cache management program 2113 reads the decided migration-target data out of the local cache area 214, and issues a specific write request for writing the read data in the local extended cache area 2141 to the I/O node 3 (S1204). Further, the cache management program 2113 updates the cache management table 2122 with respect to the area in which the swapped out data is stored (the write-destination area of the migration-target data) (S1205). Specifically, for example, the page number 21211 for the relevant area is changed from the page number of the swapped out data to the page number of the migration-target data. In this example, the size of the swapped out data (decided data) matches the size of the migration-target data. For this reason, the updating of the used capacity 21214 as in S1202 need not be performed herein.

Further, the size of the swapped out data (the decided data) may also be larger than the migration-target data.

Figure 31:
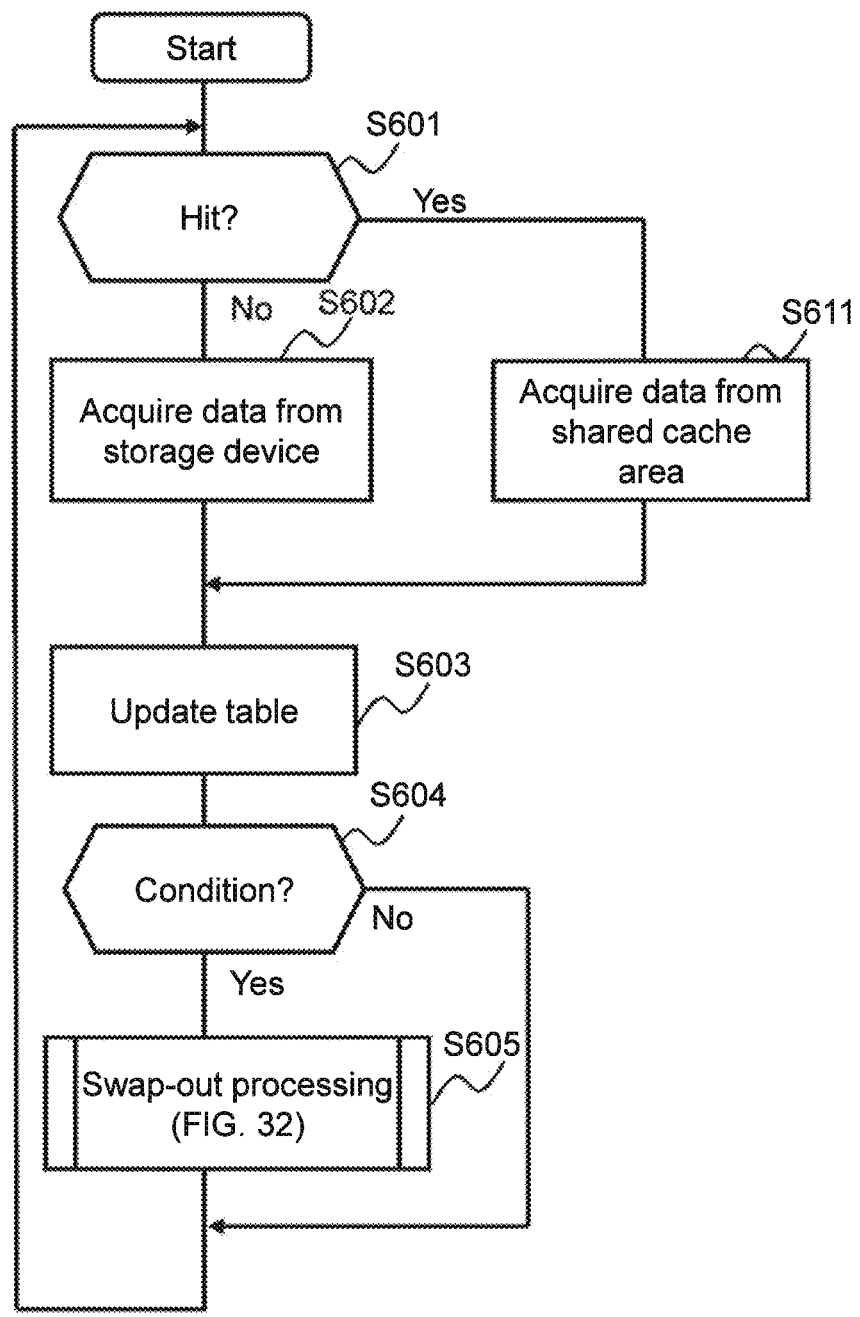
FIG. 31 is a detailed example of data acquisition processing (S504 of FIG. 15) of the I/O node 3 related to Example 4.

FIG. 31 is a detailed example of data acquisition processing (S504 of FIG. 15) of the I/O node 3 related to Example 4.

The shared cache management program 3112 of the I/O node 3 manages only the shared cache area 3142 of the I/O node 3. Therefore, in a case where the cache hit occurs (S601: Yes), the shared cache management program 3112 acquires the data from the shared cache area 3142 (S611). Alternatively, in a case where the cache miss occurs (S601: No), the shared cache management program 3112 performs the same process as Example 1. However, the swap-out processing (S605) related to Example 4 is different from the swap-out processing (S605) related to Example 1.

Figure 32:
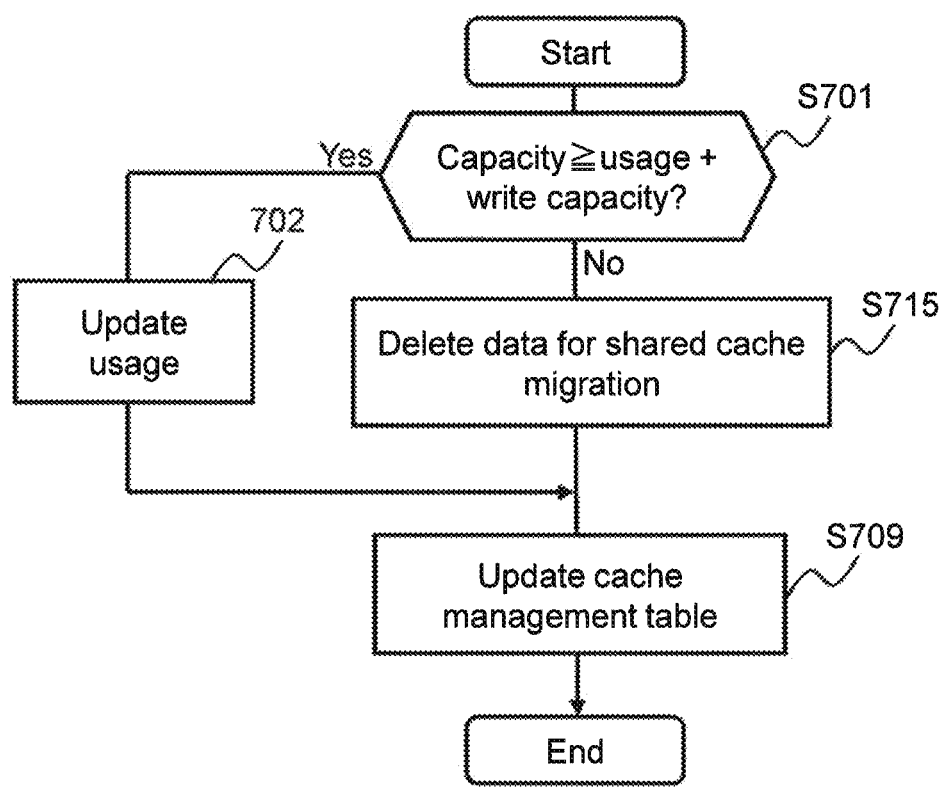
FIG. 32 is a detailed example of swap-out acquisition processing (S605 of FIG. 31) of the I/O node 3 related to Example 4.

FIG. 32 is a detailed example of swap-out acquisition processing (S605 of FIG. 31) of the I/O node 3 related to Example 4.

As described above, the shared cache management program 3112 of the I/O node 3 manages only the shared cache area 3142. Therefore, after only the determination on the excessive capacity with respect to the shared cache area 3142 in S701 is performed, in a case where the capacity 31213 is equal to or less than the sum of the used capacity 31214 and the write capacity (S701: No), the shared cache management program 3112 erases the data from the shared cache area 3142 (S715).

According to Example 4, since there is no need to intervene the I/O node 3 in a process of exchanging the cache data between the computation nodes 2, a load on the network between the computation node 2 and the I/O node 3 is suppressed. Therefore, the bandwidth utilization efficiency is improved, and the processing load on the I/O node 3 is reduced.

In addition, in Example 4, when a process of writing new data is received from the application program, the cache management program 2113 of the computation node 2 can determine whether or not the new data is stored in the shared cache area 3142 with this opportunity. Then, in a case where the new data is already stored in the shared cache area 3142, the cache management program 2113 may not write the new data in the local cache area 214.

In addition, in Example 4, when the data is migrated from the local extended cache area 3141 to the shared cache area 3142, the cache management program 2113 may send a command to cause the I/O node 3 to perform the following processes (1) to (3).

(1) Read the read-target data out of the local extended cache area 3141.

(2) Write the read data in the shared cache area 3142.

(3) Invalidate the read-target data stored in the local extended cache area 3141 at the read source.

In addition, in Example 4, the computation node 2 may use a part of the storage area of the storage device as the cache area. In addition, the I/O node 3 may use a part of the storage area of the storage device 34 as the cache area. The memory 21 (31), the storage device of the computation node 2, and the storage device 34 are generally different in their I/O performances, but the cache control processing according to a difference of these I/O performances may be performed in at least one of the computation node 2 and the I/O node 3.

Example 5

Example 5 will be explained. In so doing, the differences from Examples 1 to 4 will mainly be explained, and explanations of points in common with Examples 1 to 4 will either be simplified or omitted.

In Example 5, a management server 5 (specifically, a cache management program 5113 described below) coupled to both the computation node 2 and the I/O node 3 performs the cache control processing.

An I/O amount (a total amount of data to be input and output) and the performance (typically the I/O performance) of the application program 4 may be not correlated with each other. For this reason, when a typical LRU logic based on the I/O amount is used, there is a possibility of storing data not contributing to an improvement of the performance of the application program in the cache area. In other words, when the typical LRU logic based on the I/O amount is used, there is a possibility of reducing the capacity ratio of the cache.

Therefore, in Example 5, a process explained in the following is performed.

Figure 51:
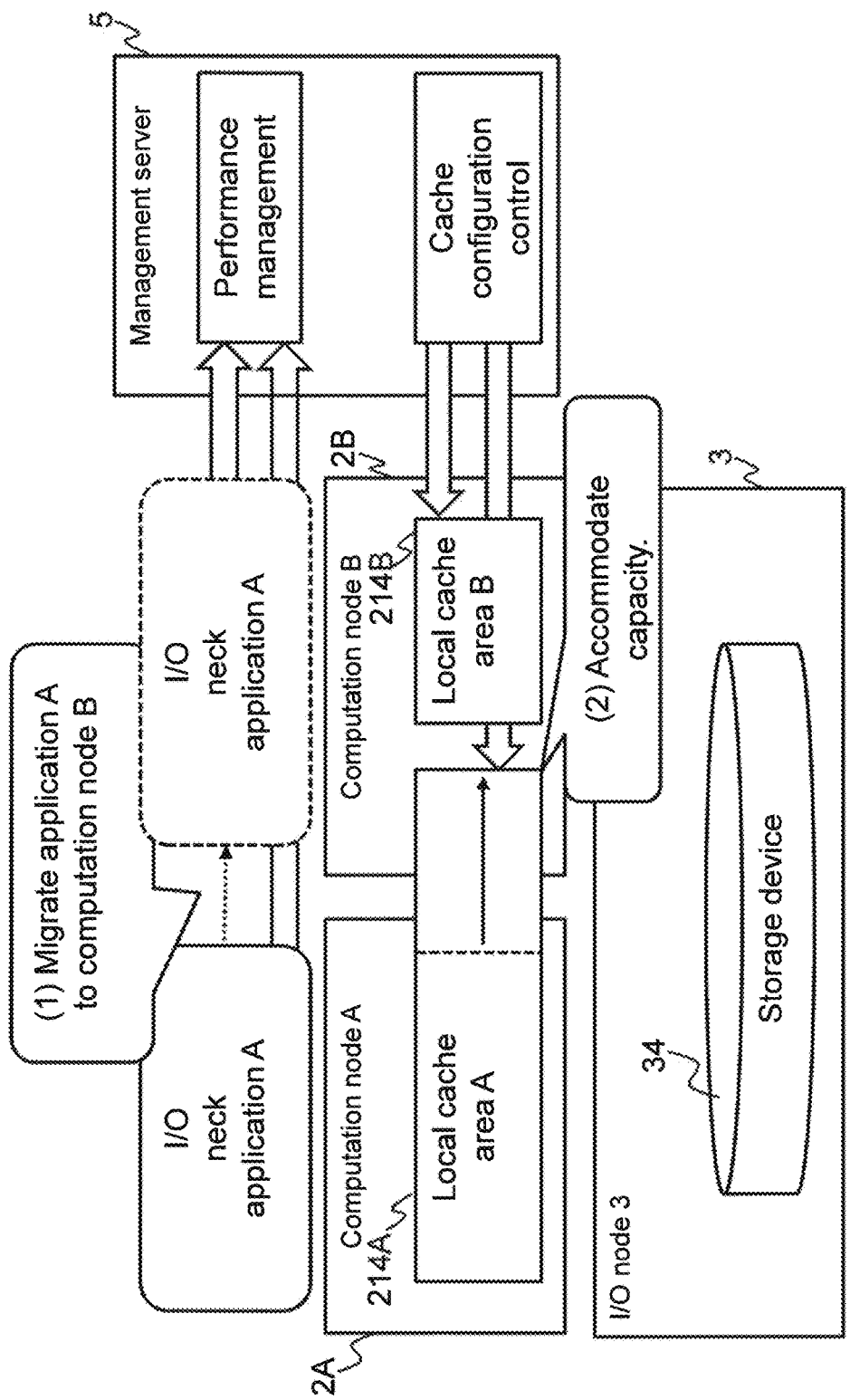
FIG. 51 is a schematic diagram for illustrating cache control processing related to Example 5.

FIG. 51 is a schematic diagram for illustrating the cache control processing related to Example 5.

A management node 5 stores performance information related to the performance (for example, the I/O performance) of the respective application programs 4. The performance information, for example, is SLA (Service Level Agreement) information. Herein, the SLA information is information indicating a target performance of the application program (for example, the number of transactions which can be processed per unit time (for example, 1 seconds)).

In addition, the management node 5 dynamically controls the capacity of the cache area of each computation node 2 based on the performance of the application program.

For example, in a case where the performance of the application program A (4A) of the computation node A (2A) does not satisfy the SLA information of the application program A (4A), the management server 5 selects one computation node 2 having the application program 4 of which the performance is larger than the SLA information. Herein, it is assumed that the computation node B (2B) is selected.

Next, the management server 5 determines whether or not the application program A (4A) can be migrated to the computation node B (2B). In this way, there are two references for determining whether or not the issued application program A (4A) can be migrated to another computation node B (2B) as follows. As a first reference, the management server 5 determines that the migration is not possible in a case where the user is not allowed to migrate the application program A to another server. As a second reference, the management server 5 determines that the migration is not possible in a case where the migration of the application program A may rather cause a degradation in performance due to some reasons such that a load on the CPU of the computation node B at a migration destination is approximately 100%.

In a case where it is determined that the application program A (4A) can be migrated to the computation node B (2B), the management server 5 migrates the application program A (4A) to the computation node B as illustrated in (1) of FIG. 51. In this case, the application program A (4A) is stored in the computation node B (2B), and the local cache area B (214B) is used.

Alternatively, in a case where it is determined that the application program A (4A) is not possible to be migrated to the computation node B (2B), the management server 5 accommodates a part of the storage area of the local cache area B (214B) of the computation node B (2B) to the computation node A (2A) as illustrated in (2) of FIG. 51. In this case, the computation node A (2A) can use the accommodated part of the storage area of the local cache area B (214B) as a part of the local cache area A (214A).

Hereinafter, the detail of Example 5 will be described.

Figure 33:
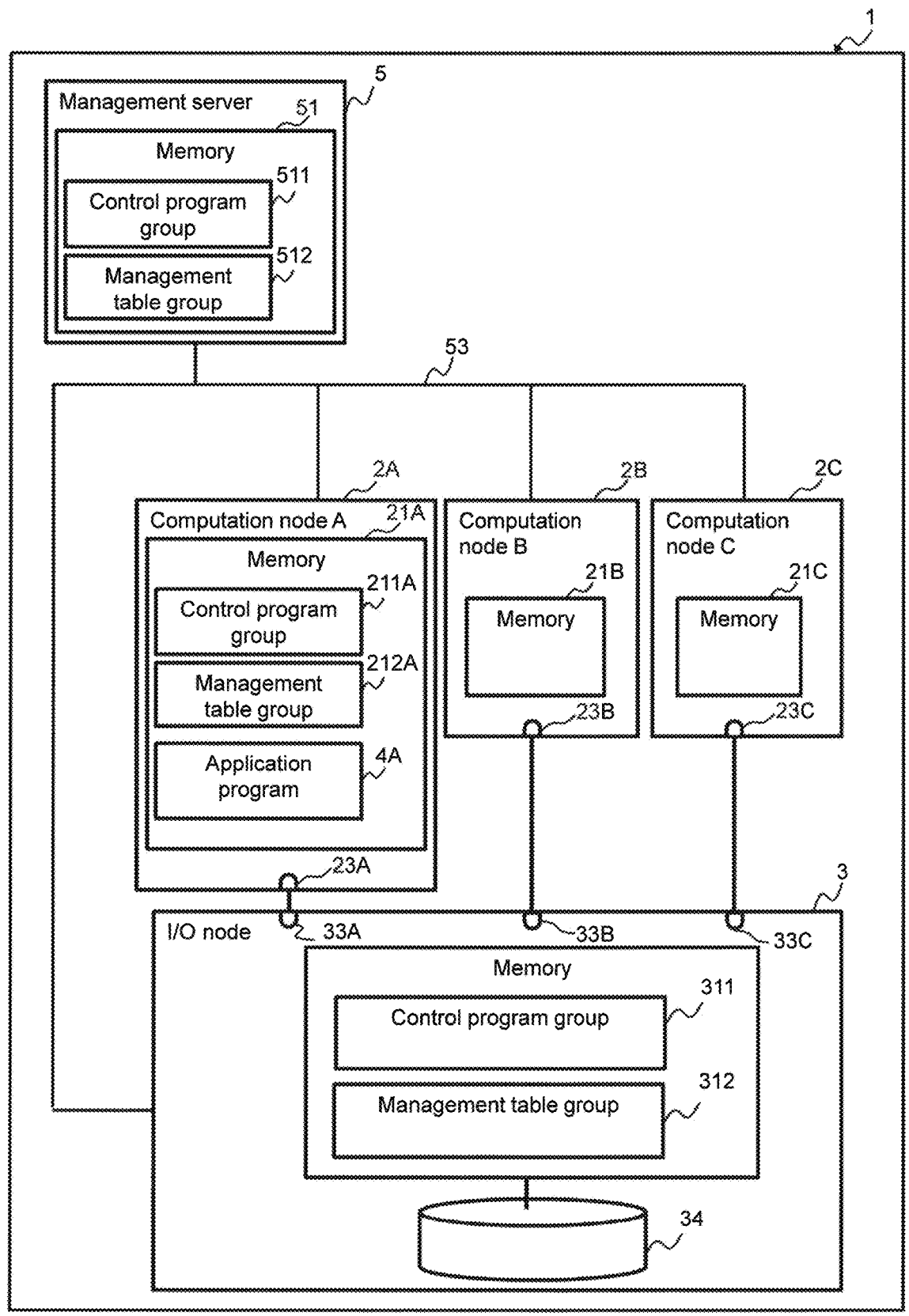
FIG. 33 is a detailed example of swap-out acquisition processing (S605 of FIG. 31) of the I/O node 3 related to Example 4.

FIG. 33 is a block diagram showing an example of the configuration of the entire computer system 1 related to Example 5.

The computer system 1 related to Example 5 includes the management server 5 in addition to the computation node 2 and the I/O node 3 in Example 1. These components (the computation node 2, the I/O node 3, and the management server 5) are provided in the same housing.

The computation node 2, the I/O node 3, and the management server 5 are coupled to a predetermined interface (for example, Ethernet (registered trademark)) 53 in the housing. The computation node 2, for example, is a host computer. In addition, the I/O node 3, for example, is a storage device which is coupled to the host computer.

Further, the computation node 2, the I/O node 3, and the management server 5 may be not disposed in the same housing. In addition, the computation node 2, the I/O node 3, and the management server 5 may be coupled through a predetermined communication network (for example, LAN (Local Area Network)).

The management server 5, for example, is a type of computer. The management server 5 stores a control program group 511 and a management table group 512 in a memory 55. The control program group 511 and the management table group 512 will be described below.

Figure 34:
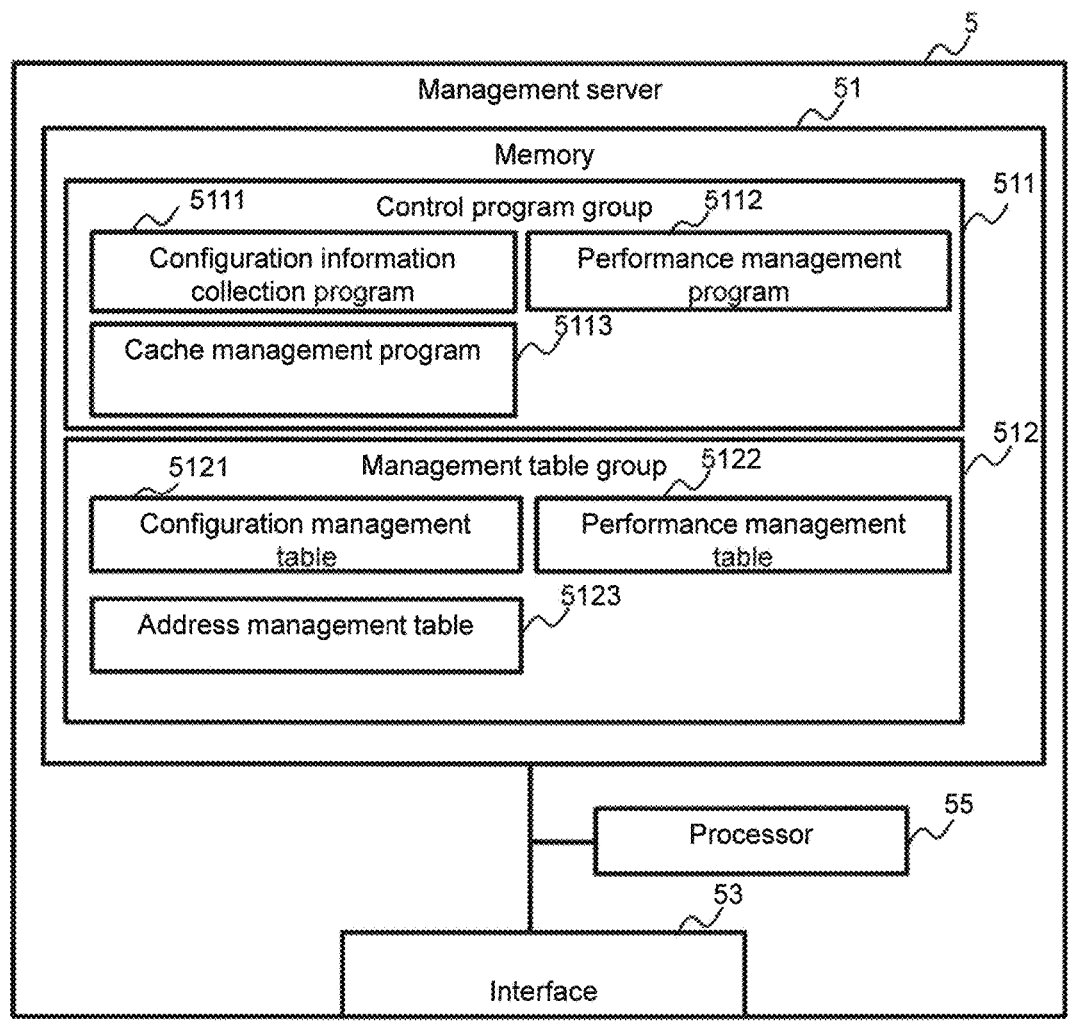
FIG. 34 is a block diagram showing an example of the configuration of a management server 5 related to Example 5.

FIG. 34 is a block diagram showing an example of the configuration of the management server 5 related to Example 5.

The management server 5 includes a memory 51, an interface 53, and a processor (for example, CPU (Central Processing Unit)) 52 which is coupled thereto.

The processor 52 make control on the operation of the management server 5, and performs a necessary process based on the control program group 511 and the management table group 512 stored in the memory 55. The memory 55 is used for storing the control program group 511 and the management table group 512, and also used as a work memory of the processor 52. The interface 53 is a communication interface device, and makes control on a protocol when the management server 5 communicates with the computation node 2 and the I/O node 3.

In the control program group 511, a configuration information collection program 5111, a performance management program 5112, and a cache management program 5113 are included. The programs 5111 to 5113 may be realized by a single program as a whole, or may be divided into two or less or four or more programs according to the circumstance in mounting.

The configuration information collection program 5111, for example, is operated as an interface for setting a configuration management table 5121 to be described below. In addition, the configuration information collection program 5111, for example, sets and/or updates the configuration management table 5121 according to the calling of a setting API (Application Program Interface).

The performance management program 5112 periodically collects information on the performance of the application program 4 of each computation node 2 from a performance information notification program (not illustrated) of the computation node 2 and the I/O node 3, and stores the information in a performance management table 5112 to be described below.

When an SLA violation event is detected, the cache management program 5113 stores the data in the local cache area 214 of the computation node 2 and updates the data stored in the local cache area 214. Specifically, for example, the cache management program 5113 adds an entry in an address management table 5122, updates the entry in the address management table 5122, and issues a cache control instruction to the computation node 2 and the I/O node 3 according to the performance management table 5122. Further, the "SLA violation event" is an event in which the performance of the application program 4 becomes less the SLA information of the application program 4.

In the management table group 512, the configuration management table 5121, the performance management table 5122, and an address management table 5123 are included. These management tables 5121, 5122, and 5123 will be described below.

FIG. 35 shows an example of the configuration management table 2121 of the computation node 2 related to Example 5.

The configuration management table 2121 related to Example 5 includes a physical location 21210, a capacity 21211, a used capacity 21212, and a physical address 21213. The physical location 21210 is information indicating whether or not the cache area is the local cache area 214 or the remote cache area (2141, 2142, or 2143). The capacity 21211 indicates a capacity of the local cache area 214, or the remote cache area (2141 or 2142). The used capacity 21212 indicates the amount of data to be actually used by the computation node 2 in the capacity of the local cache area 214 or the remote cache area (2141, 2142, or 2143). The physical address 21213 indicates a plurality of physical addresses belonging to the local cache area 214 or the remote cache area (2141, 2142, or 2143).

FIG. 36 shows an example of the configuration management table 5121 of the management server 5 related to Example 5.

The configuration management table 5121 includes a computation node identifier 51211 and an application identifier 51212 for each application program 4. The computation node identifier 51211 is an identifier of the computation node which performs the application program 4. The application identifier 51212 is an identifier of the application program 4.

Figure 37:
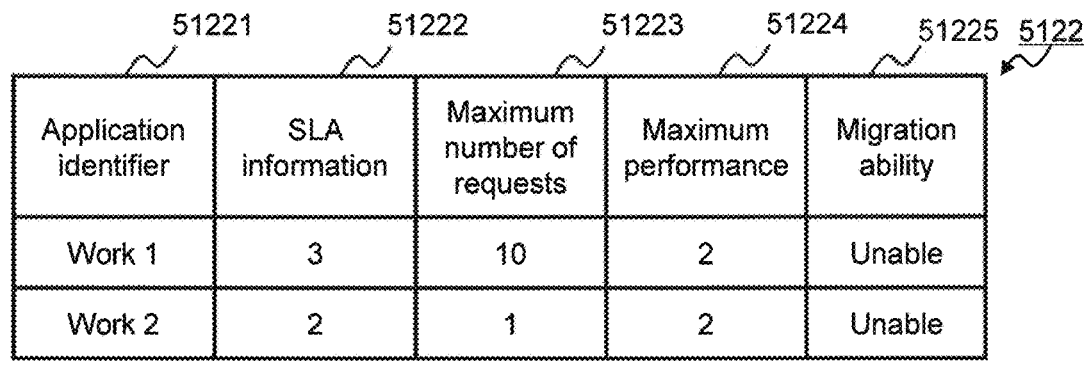
FIG. 37 shows an example of a performance management table 5122 of the management server 5 related to Example 5.

FIG. 37 shows an example of the performance management table 5122 of the management server 5 related to Example 5.

The performance management table 5122 is configured in each computation node 2. The performance management table 5122 includes an application identifier 51221, an SLA information 51222, a maximum request number 51223, a maximum performance 51224, and a migration ability 51225 for the application program 4 which can be migrated among a plurality of application programs 4. All the application programs 4 may be the application program which can be migrated.

The application identifier 51221 is an identifier of the application program 4. The SLA information 51222 is a target performance value which is predetermined in the application program 4, for example, a transaction number which can be processed per second.

The maximum request number 51223 is a maximum value of the number of requests (typically the I/O requests) in which the application program 4 has been possible to be processed in the past (for example, a predetermined period of time in the past). The maximum performance 51224 is a maximum performance which can be expected to be exhibited by the application program 4 in the current configuration (for example, the capacity of the local cache area) of the cache area. For example, the maximum performance 51224 may be a value to be calculated by a specific program based on the capacity of the local cache area. In addition, the maximum performance 51224 may be updated in a case where a configuration change (a configuration change of the cache area) such as the accommodation of the cache capacity is performed.

The migration ability 51225 is information indicating whether or not the application program 4 is possible to be migrated to another computation node 2 during the running of the application program 4. The migration ability 51225 may be a value specified by the user in advance. For example, the user may set the migration ability 51225 to "No" for the application program which is not hoped to migrate to another computation node 2.

FIG. 38 shows an example of an address management table 5133 of the management server 5 related to Example 5.

With the use of the address management table 5123, the management server 5 can ascertain the cache configuration of the computation node 2 and the I/O node 3.

The configuration of the address management table 5123 is substantially equal to the address management table 3123 of the I/O node 3 in Example 1.

However, in the row of which the value of the virtual address 51231 is "5" (in the dotted frame P), an attribute value 51232 is "Virtual A", but a physical location 51233 is "Computation Node B". This indicates that a part of the cache area of the computation node B (2B) is accommodated to the computation node A (2A). The computation node A (2A), for example, can add data in the cache area accommodated from the computation node B (2B) or can erase data from the cache area in data acquisition processing (FIG. 29).

Figure 39:
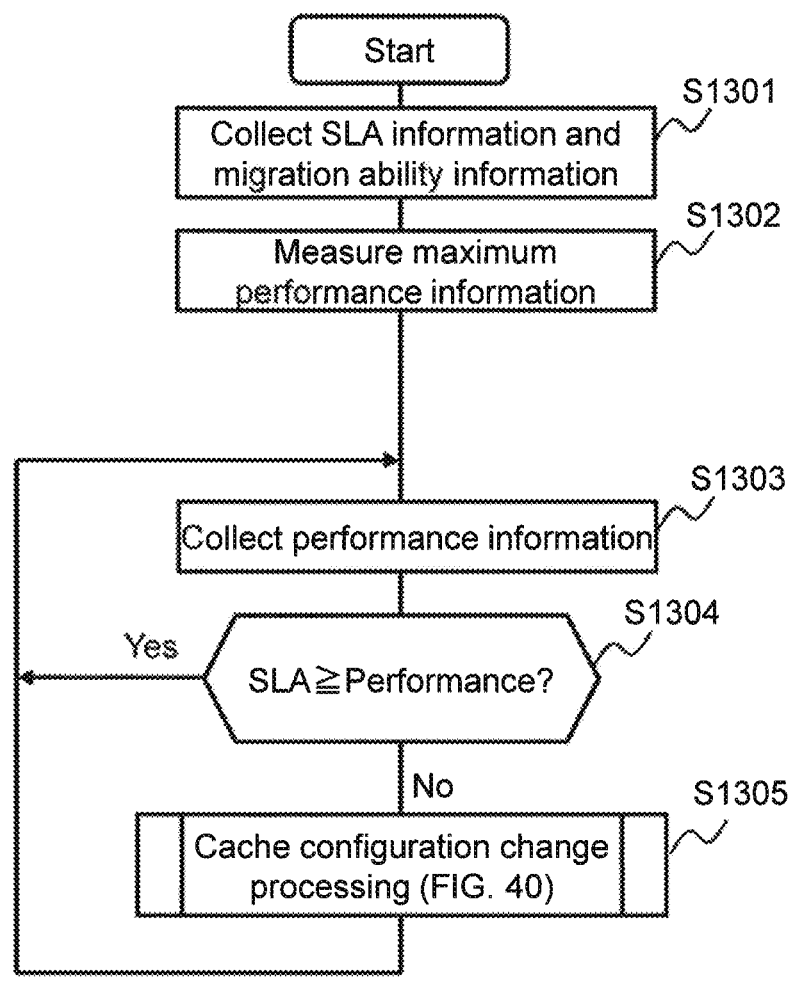
FIG. 39 is an example of a flowchart of the processing of a performance management program 5112 of the management server 5 related to Example 5.

FIG. 39 is an example of a flowchart of the processing of the performance management program 5112 of the management server 5 related to Example 5.

The performance management program 5112 collects the SLA information and the migration ability information set by the user at the time when each application program 4 is established, and registers the information in an SLA information column 51121 and a migration ability column 51125 of the performance management table 5112 (S1301).

Next, the performance management program 5112 measures the number of processes per unit time of the application program 4 in a case where all the data referred by the application program 4 is read out of the local cache area 214 of the computation node 2. Then, the performance management program 5112 registers the measured result in a maximum performance column 51122 of the performance management table 5112 (S1302).

Thereafter, the performance management program 5112 periodically collects the performance of the running application program 4 (S1303), and compares the collected performance with the SLA information 51222 of the application program 4 (S1304).

In a case where the SLA information 51222 is equal to or larger than the performance collected in S1303 (S1304: Yes), the performance management program 5112 returns to the process of S1303. Alternatively, in a case where the SLA information 51222 is less than the performance collected in S1303 (S1304: No), the performance management program 5112 sends an SLA violation event notification to the cache management program 5113 in order to make the cache management program 5113 perform cache configuration change processing (S1305). The SLA violation event notification is a notification to notify an event that the SLA information 51222 is less than the performance collected in S1303, and for example may include information indicating the performance collected in S1303, the SLA information 51222, and the identifier of the application program 4. After the process of S1305, the performance management program 5112 returns to the process of S1503.

Figure 40:
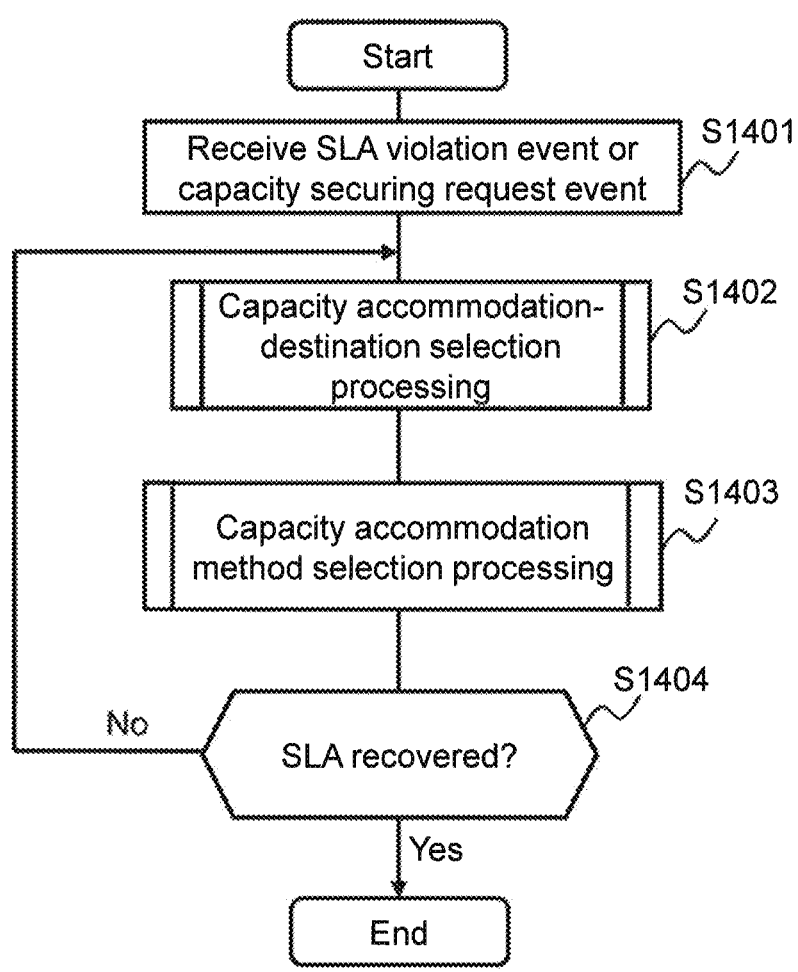
FIG. 40 is a detailed example of cache configuration change processing (S1305 of FIG. 39) of the management server 5 related to Example 5.

FIG. 40 is a detailed example of the cache configuration change processing (S1305 of FIG. 39) of the management server 5 related to Example 5.

The cache management program 5113 receives the SLA violation event notification from the performance management program 5112 (S1401). Alternatively, the cache management program 5113 receives a memory capacity securing request for the allocation of an operating environment of a new application program 4 such as a GUI operation of the user (S1401).

The cache management program 5113 performs capacity accommodation-source selection processing to be described (S1402), and selects the application program 4 which can erase the cache capacity.

The cache management program 5113 refers to the SLA information 51221 of the performance management table 5122, performs capacity accommodation method selection processing to be described below (S1403), and performs the application program 4 and the configuration change of allocating the cache capacity.

The cache management program 5113 collects the performance information of each application program 4, compares the collected performance information with the SLA information 51222, and determines whether or not the application program 4 of an SLA event violation disappears (S1404).

In addition, in a case where there is the SLA event violation (S1404: No), the cache management program 5113 returns to the processing of S1402. Alternatively, in a case where there is no SLA event violation (S1404: Yes), the cache management program 5113 ends the processing.

Figure 41:
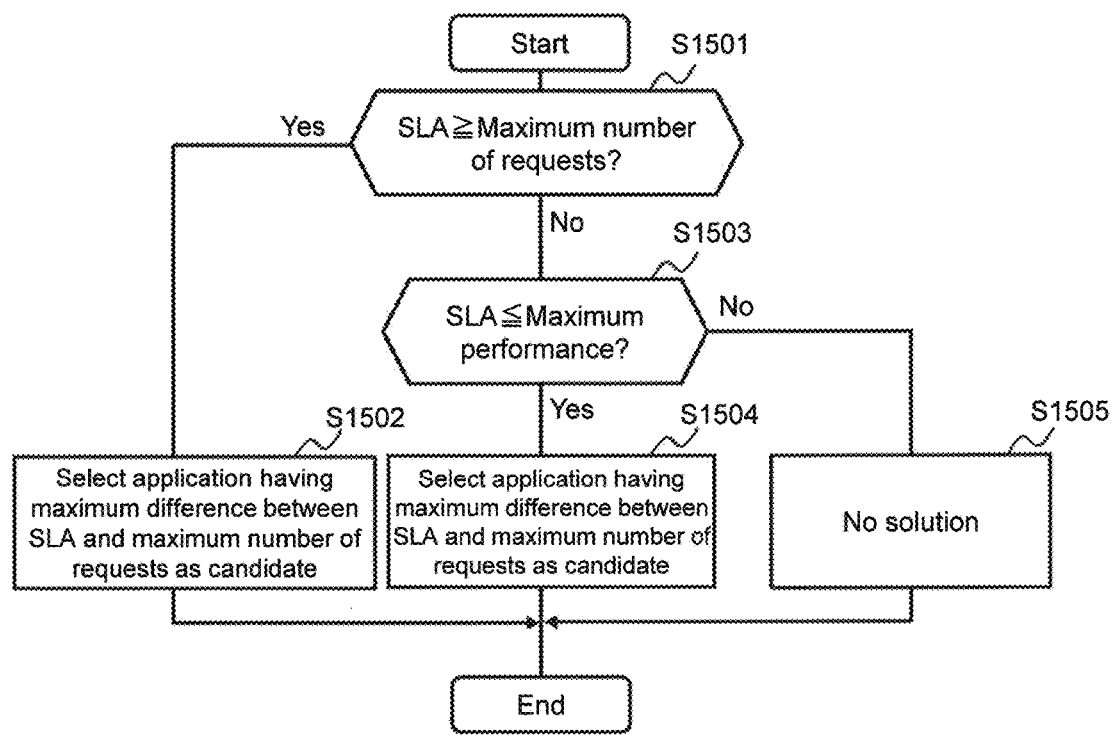
FIG. 41 is a detailed example of capacity accommodation-source selection processing (S1402 of FIG. 39) of the management server 5 related to Example 5.

FIG. 41 is a detailed example of the capacity accommodation-source selection processing (S1402 of FIG. 39) of the management server 5 related to Example 5.

The cache management program 5113 refers to the performance management table 5122, and compares the SLA information 51222 with the maximum request number 51223 for each application program 4 (S1501).

In a case where there is the application program 4 of which the SLA information 51222 is equal to or larger than the maximum request number 51223 (S1501: Yes), the cache management program 5113 selects, as a candidate at the capacity accommodating destination, an application program 4 in which a difference between the SLA information 51222 and the maximum request number 51223 is maximized (S1502). Further, in addition to the criterion of step S1502, a load on the computation node 2, for example, CPU load information may be collected as a selection criterion of the capacity accommodating destination. In a case where the load is high (for example, a load of 80% or more), a criterion of excluding the application program from the candidates may be added.

In a case where there is no application program 4 of which the SLA information 51222 is equal to or larger than the maximum request number 51223 (S1501: No), the cache management program 5113 compares the SLA information 51222 with the maximum performance 51224 (S1503).

In a case where there is the application program 4 of which the SLA information 51222 is equal to or less than the maximum performance 51224 (S1503: Yes), the cache management program 5113 selects, as a candidate at the capacity accommodating destination, an application program 4 in which a difference between the SLA information 51222 and the maximum performance 51224 is maximized (S1504).

In a case where there is no application program 4 of which the SLA information 51222 is equal to or less than the maximum performance 51224 (S1503: No), the cache management program 5113 determines that there is no application program 4 (no solution) as a candidate (S1505).

Figure 42:
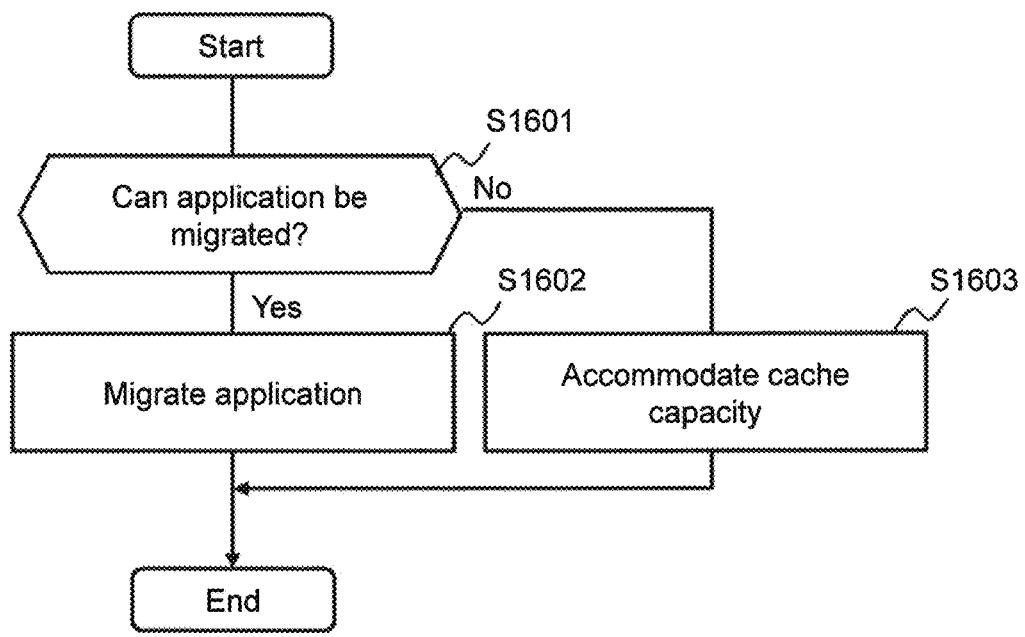
FIG. 42 is a detailed example of capacity accommodation method selection processing (S1403 of FIG. 40) of the management server 5 related to Example 5.

FIG. 42 is a detailed example of the capacity accommodation method selection processing (S1403 of FIG. 40) of the management server 5 related to Example 5.

The cache management program 5113 refers to the migration ability 51225 of the configuration management table 5122, and determines whether or not there is an application program 4 which is possible to be migrated in the computation node 2 in which the application program 4 specified in S1401 is operated (S1601).

In a case where there is the application program 4 which is possible to be migrated (S1601: Yes), the cache management program 5113 migrates the application program 4 specified in S1401 to the computation node 2 selected in the capacity accommodation-source selection processing (S1402) (S1602). In the processing of S1602, the cache management program 5113 is migrated to the computation node 2 selected in S1402 together with the data used in the application program 4. Then, the cache management program 5113 invalidates the data stored in the computation node 2 at the migration source used by the application program 4.

In a case where there is no application program 4 which is possible to be migrated (S1601: No), the cache management program 5113 updates the address management table 5123 and accommodates the cache capacity (S1603). Specifically, for example, the accommodating of the cache capacity of the computation node 2A to the computation node 2B, is associating the physical location 51233 corresponding to the attribute value 51232 "Virtual B" with at least one virtual address 51231 corresponding to the physical location 51233 "Computation Node A", and the configuration change of the cache area is performed in both computation nodes by notifying the virtual address 51231 corresponding to "Computation Node A" to both the computation node A (2A) at the accommodation destination and the computation node B (2B) at the accommodation source.

Figure 43:
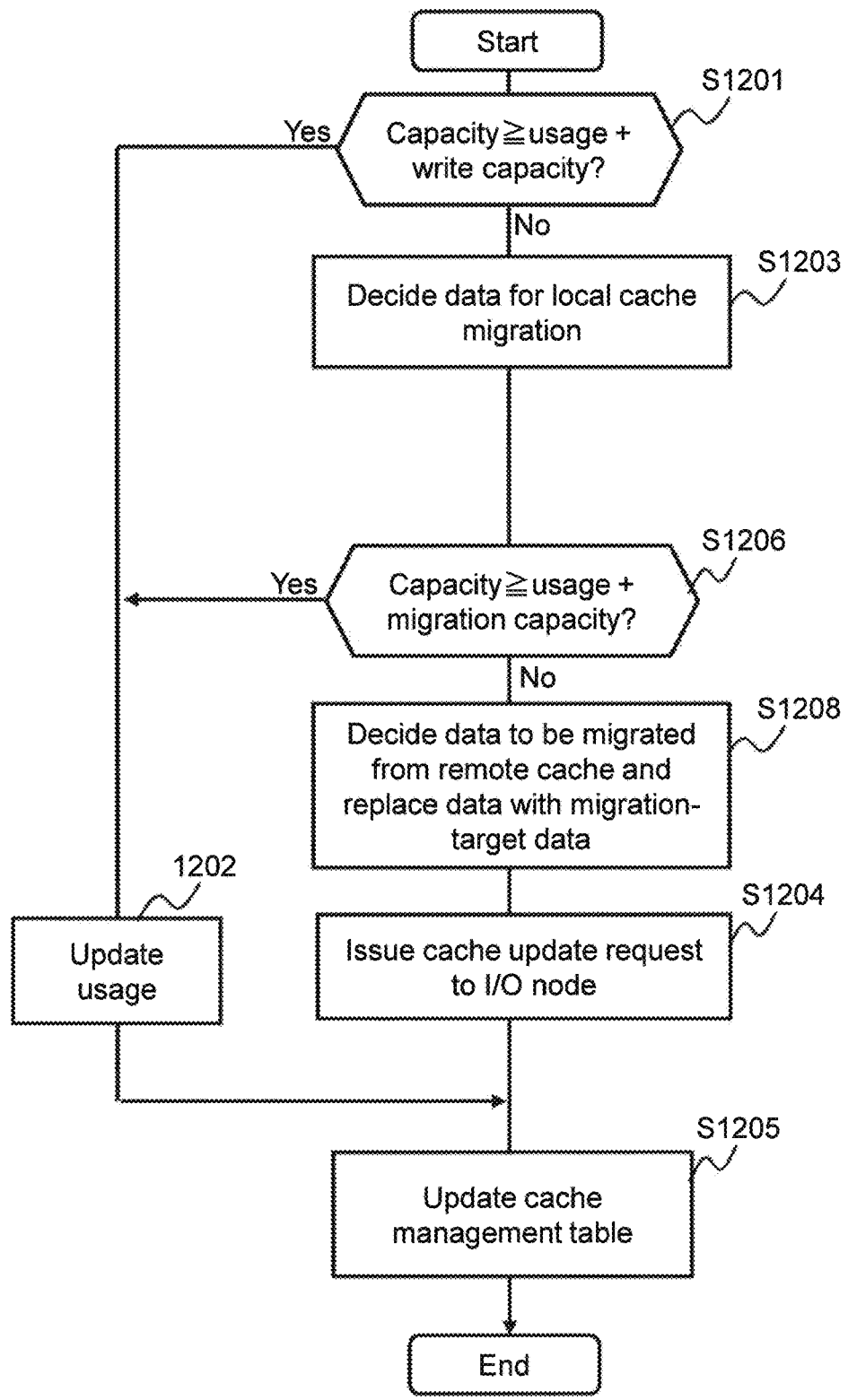
FIG. 43 is a detailed example of swap-out processing of the computation node 2 related to Example 5.

FIG. 43 is a detailed example of swap-out processing of the computation node 2 related to Example 5.

After deciding the data (hereinafter, the migration-target data) to be migrated from the cache area, the cache management program 5113 refers to the configuration management table 2121, and determines whether or not a capacity 51213 of which the physical location 21210 is "remote" is equal to or larger than the sum of the used capacity 21214 and the migration capacity (the size of the migration-target data) (S1206).

In a case where the capacity 21213 is equal to or larger than the sum of the used capacity 21214 and the migration capacity (S1206: Yes), the cache management program 5113 writes the migration-target data in the "remote" area, that is, an area accommodated from another computation node 2, and then the procedure proceeds to the processing of S1202.

Alternatively, in a case where the capacity 21213 is less than the sum of the used capacity 21214 and the migration capacity (S1206: No), the cache management program 5113 decides data to be migrated among the data stored in the "remote" area, for example, based on an LRU algorithm, refers to the address management table 2123, and replaces the decided data with the migration-target data (S1208). Thereafter, the cache management program 5113 proceeds to the processing of step S1204. The other processing is the same as those in Example 4, and thus the descriptions thereof will not be repeated.

According to Example 5, since the capacity of the cache area 24001 usable by each computation node 2 is decided based on the SLA information which is previously set in each application program 4, there is a strong possibility that the data used by the application program 4 is stored in the cache area 24001 of a certain computation node 2. Therefore, a probability of reading the data from the storage device 34 is reduced, and a cache hit rate of the entire system can be improved.

In addition, according to Example 5, for example, the cache area is accommodated from the computation node A (2A) for the computation node B (2B), and the cache area can be further accommodated from the computation node B (2B) for the computation node A (2A). In this case, the cache management program 5113 makes the performance of each application program not to be smaller than the SLA information. Specifically, the cache management program 5113 disposes the data such that the data used by the application program 4 is stored in the local cache area 214, if at all possible, of the computation node which performs the application program 4. More Specifically, for example, the cache management program 2113 of the computation node A (2A) changes the physical location 51233 "Computation Node B" which is allocated to the attribute value 51232 "Virtual A" of the address management table 5123 to "Computation Node A".

Example 6

Next, Example 6 will be described. In so doing, the differences from Examples 1 to 5 will be mainly explained, and explanations of points in common with Examples 1 to 5 will either be simplified or omitted.

In Example 6, the cache management program 2113 in the computation node 2 performs the cache control processing. In addition, in Example 6, the computation node 2 includes a storage device 24 and a part of the storage area of the storage device 24 is used as a part of the cache area.

However, when a part of the storage device 24 is used as a part of the cache area, the storage areas having different I/O performance are mixed in one cache area of one device in the computation node 2 and the I/O node 3. If so, it becomes difficult to distinguish between the memory 21 and the storage device 24, on which the storage area in the cache area is based.

In Example 6, a part of the storage area of the storage device 24 is used as the area to store the swapped out data from the local cache area 214.

Figure 44:
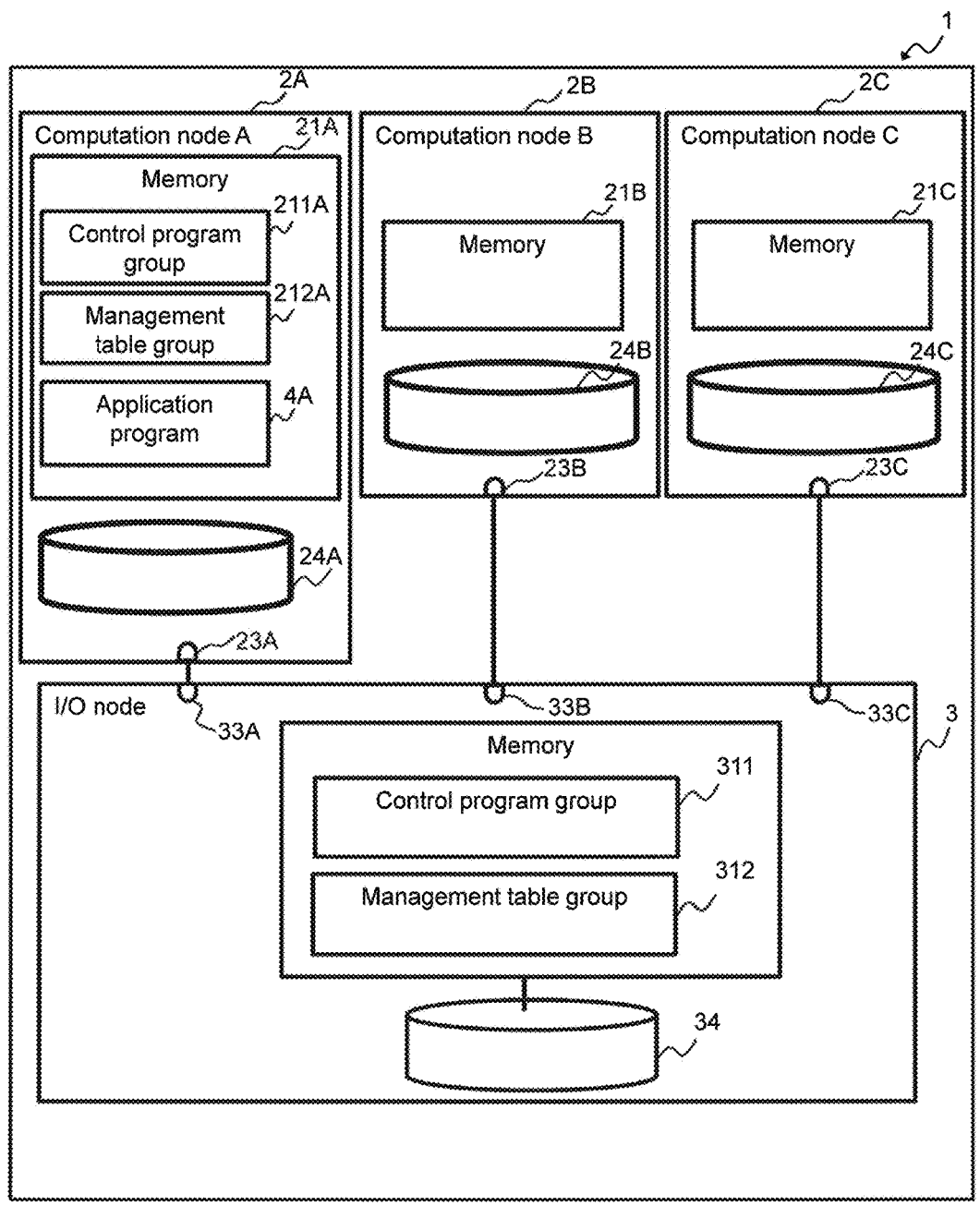
FIG. 44 is a block diagram showing an example of the entire configuration of the computer system 1 related to Example 6.

FIG. 44 is a block diagram showing an example of the entire configuration of the computer system 1 related to Example 6.

The computation node 2 includes the storage device 24. Specifically, each of the computation nodes 2A to 2C includes storage devices 24A to 24C. The storage device 24, for example, is an SSD (Solid State Drive).

Figure 45:
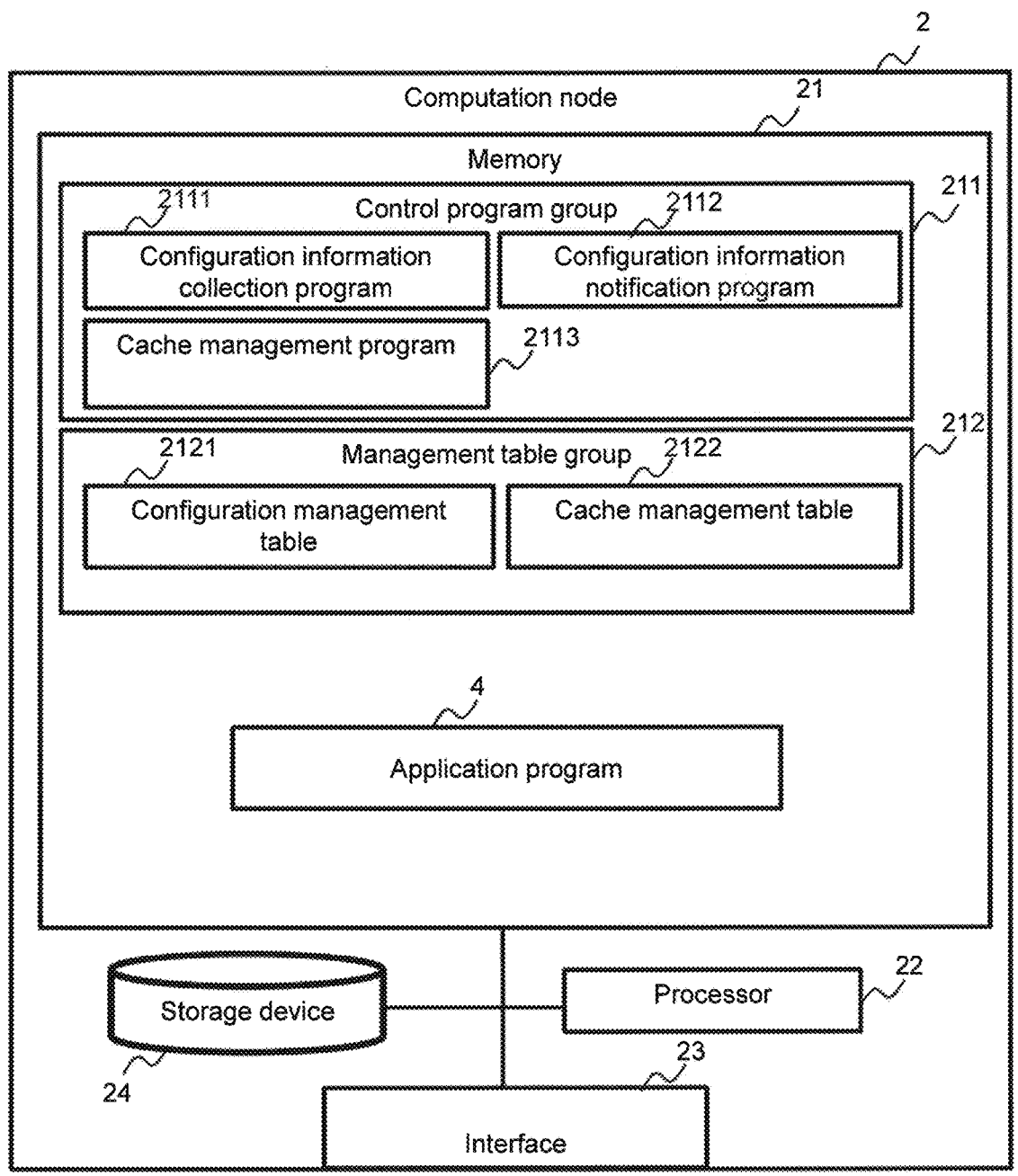
FIG. 45 is a block diagram showing an example of the configuration of the computation node 2 related to Example 6.

FIG. 45 is a block diagram showing an example of the configuration of the computation node 2 related to Example 6.

The computation node 2 has a configuration obtained by adding the storage device 24 to the computation node 2 in Example 4. The other configurations are similar to those of Example 4, and thus the descriptions thereof will not be repeated.

FIG. 46 shows an example of the configuration management table 2121 of the computation node 2 related to Example 6.

Comparing to the configuration management table 2121 related to Example 5, "Local Disk" and "Remote Disk" are added as a physical location 2110.

The "Local Disk" as the physical location 2110 indicates the storage device 24 which includes the computation node 2. In addition, the "Remote Disk" as the physical location 2110 indicates the storage device 24 which includes another computation node 2.

The capacity 21211 of the "Local Disk" as the physical location 21210 indicates a capacity which is usable as the cache area in the capacity of the local disk. The used capacity 21212 indicates a capacity which is used by its own and another computation nodes 2.

The capacity 21211 of the "Remote Disk" as the physical location 21210 indicates a capacity which is usable as the cache area in the capacity of the remote disk. In other words, the capacity 21211 indicates a usable capacity as the cache area of the storage device 24 which is provided from another computation node 2. The used capacity 21212 indicates a capacity which is used by its own and another computation node 2.

In Example 6, the cache management program 5113 can ascertain the capacity and the used capacity of the local cache and the remote cache by referring the configuration management table 2121.

FIG. 47 shows an example of an address management table 2133 of the computation node 2 related to Example 6.

The configuration of the address management table 2123 is similar to the address management table 2123 of the computation node 2 in Example 4 except that "the storage device" is added to an attribute value 21233 corresponding to the storage device 34 of the storage device 24 and the I/O node 3 of the computation node 2 in the address management table 2123 of Example 6. In other words, the computation node 2 can use the physical area of the storage device 24 as the cache area. In addition, the I/O node 3 can use the physical area of the storage device 34 as the cache area.

With the use of the address management table 2123, the computation node 2 can use the storage device 24 of its own and the storage device 34 of the I/O node 3 as the cache area.

Figure 48:
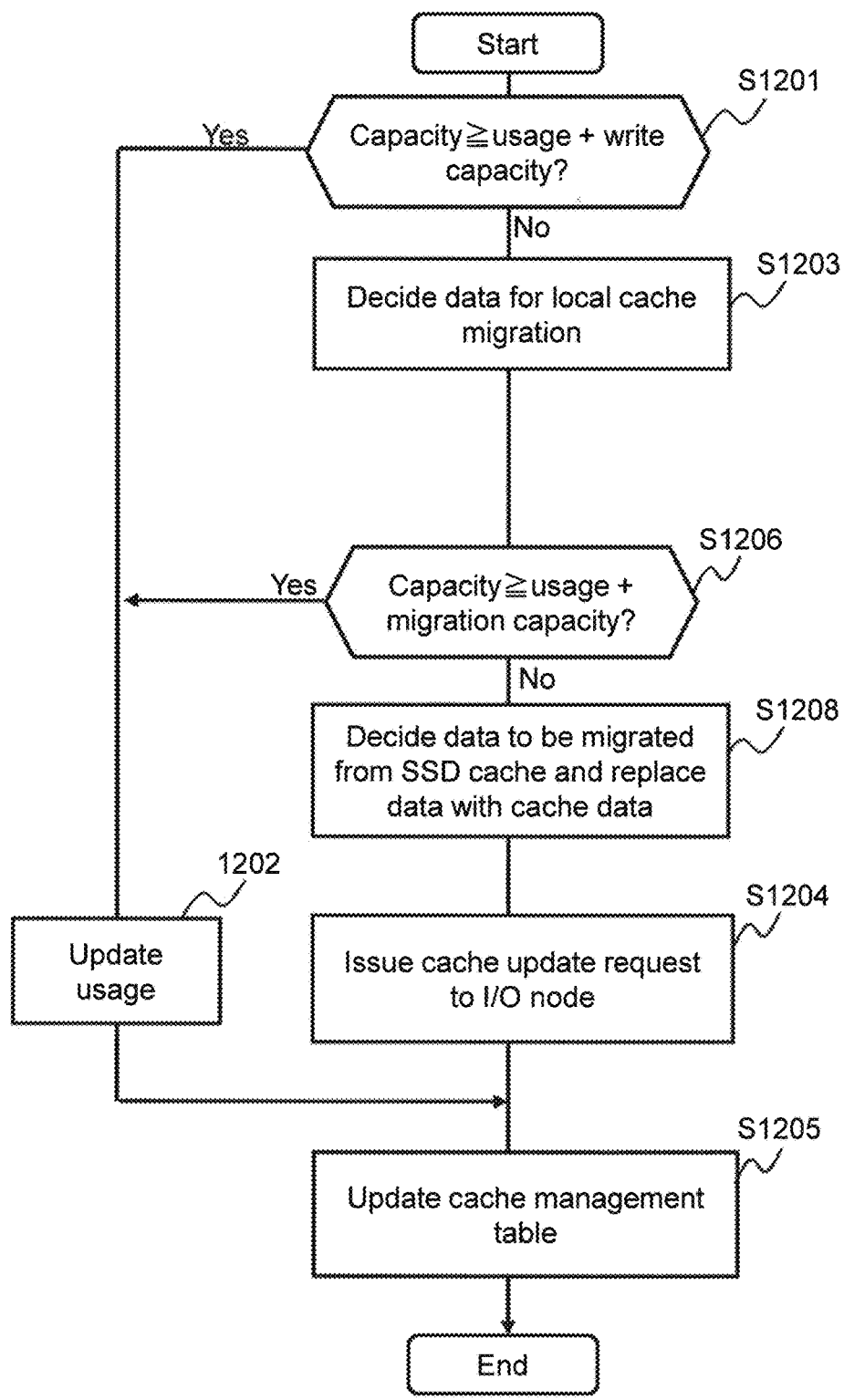
FIG. 48 is a detailed example of swap-out processing (S1106 of FIG. 29) of the computation node 2 related to Example 6.

FIG. 48 is a detailed example of swap-out processing (S1106 of FIG. 29) of the computation node 2 related to Example 6.

After the data to be migrated is decided in S1203, the cache management program 2113 refers to the configuration management table 2121, and determines whether or not the capacity 21213 of which the physical location 21210 is "Local Disk" is equal to or larger than the sum of the used capacity 21214 and the migration capacity (the size of the migration-target data) (S1206).

In a case where the capacity is equal to or larger than the sum of the used capacity 21214 and the migration capacity (S1206: Yes), the cache management program 2113 writes the migration-target data in the storage device 24, and then proceeds to S1202.

Alternatively, in a case where the capacity is less than the sum of the used capacity 21214 and the migration capacity (S1206: No), the cache management program 2113 decides the migration-target data among the data stored in the storage device 24 of the computation node 2, for example, based on an LUR (Least Recently Used) algorithm (S1208). The cache management program 2113 replaces the data in the storage device 24, and then proceeds to S1204. The other processing is the same as those in Example 4, and thus the descriptions thereof will not be repeated.

Further, by combining Example 5 and Example 6, the computation nodes 2 accommodate the cache area to each other, and each computation node 2 can use the storage device 24 as the cache area. In this case, each computation node 2 has four cache areas "Local Memory", "Remote Memory", "Local Disk", and "Remote Disk". Access performances of "Local Memory", "Remote Memory", "Local Disk", and "Remote Disk" are set in a descending order of value.

Figure 52:
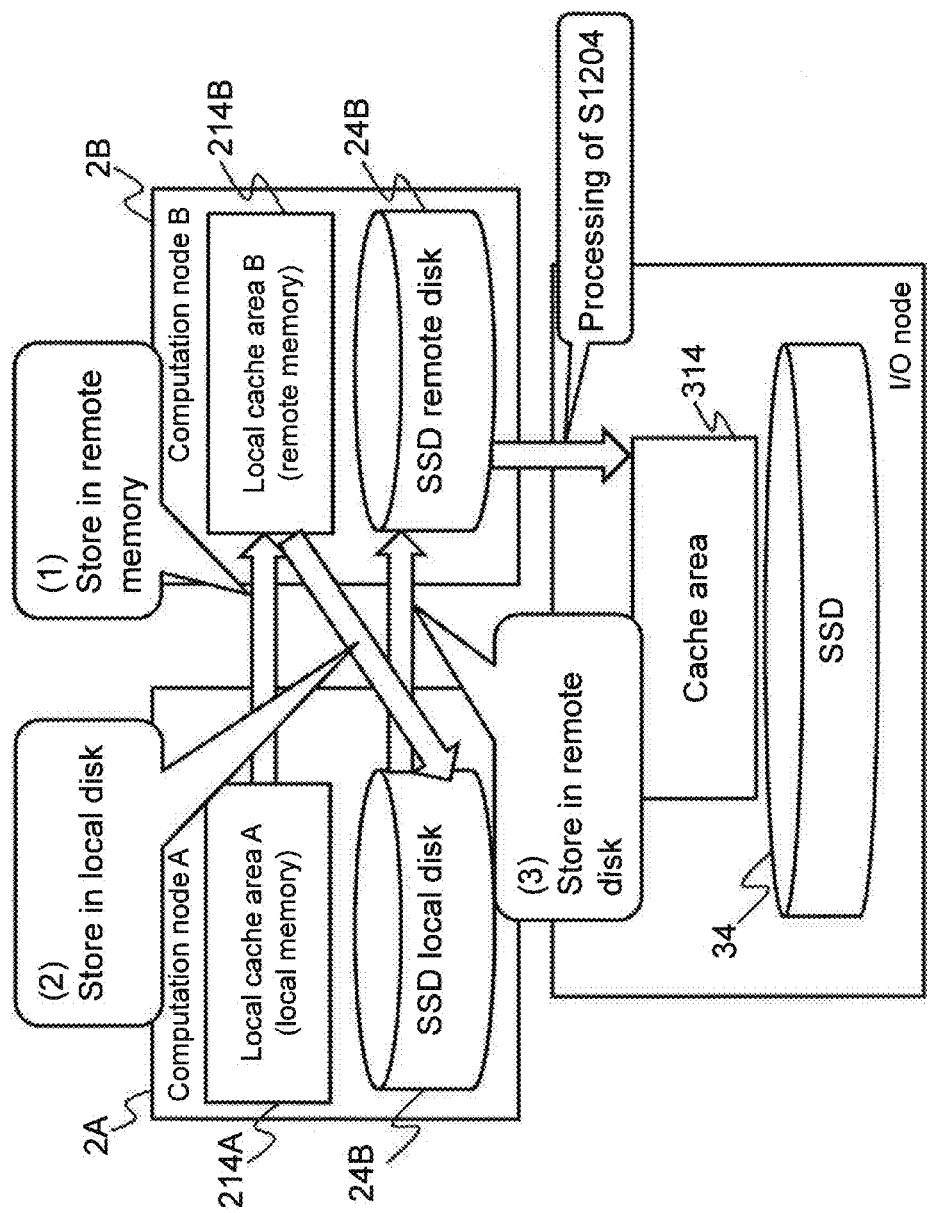
FIG. 52 is a schematic diagram for illustrating swap-out processing in Example 6.

FIG. 52 is a schematic diagram for illustrating swap-out processing in Example 6.

The swap-out processing (S1106 of FIG. 29) is performed in an order of (1) to (3) below.

(1) The computation node A (2A) swaps out the data from the local memory (the local cache area) A (214A) to the remote memory (the local cache area) B (214B).

(2) The computation node A (2A) swaps out the data from the remote memory B (214B) to the local disk A (24A).

(3) The computation node A (2A) swaps out the data from the local disk A (24A) to the remote disk B (24B) (or the remote disk of another computation node).

In other words, S1206 (the capacity determination) for the migration-source cache area and S1208 (replacement of the swapped out data) for the migration-destination cache area are repeatedly performed, and then finally the data is swapped out from the remote disk B (24B) to the I/O node 3 by the processing of S1204.

Furthermore, the read-target data can be erased from the storage device 34 in data acquisition processing (S602) performed by the shared cache management program 3112 of the I/O node 3 of Examples 1 to 6. Then, in a case where the I/O node 3 performs the swap-out processing, a case where a cache update request (S1204) is received from another computation node 2, or a case where the cache update request is received from the management server 3, the shared cache management program 3112 may write the erased read-target data in the storage device 34. Therefore, it is possible to control the arrangement of the data stored in not only the cache area but also the storage device 34. In other words, it is possible to prevent the data from being stored in the cache area and the storage device 34 in an overlapping manner.

Figure 49:
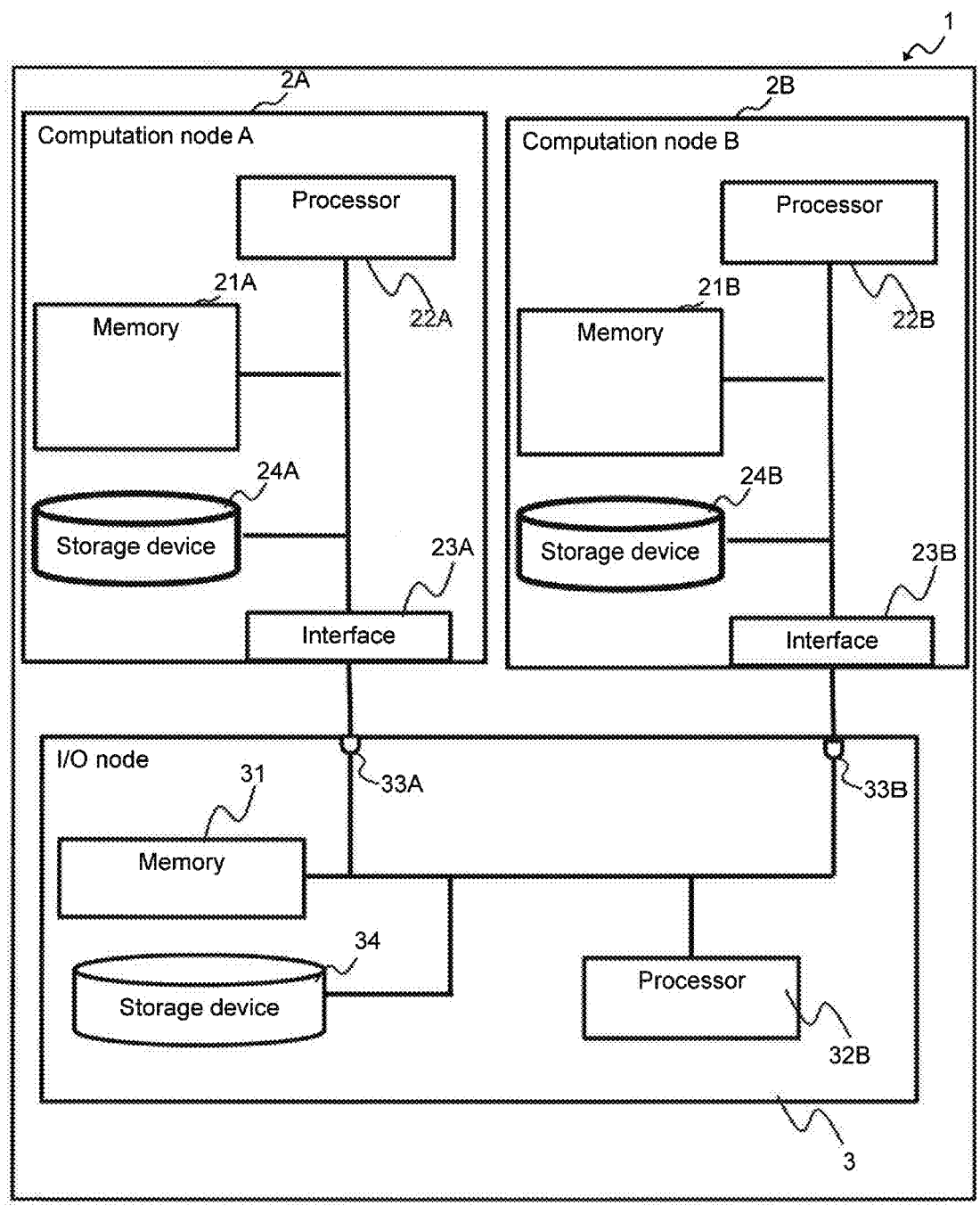
FIG. 49 is a block diagram showing an example of the configuration of a topology of the computer system 1.

FIG. 49 is a block diagram showing an example of the configuration of a network topology of the computer system 1.

The computation node 2 and the I/O node 3 may be mounted on one chassis (housing), and may be coupled to each other using cables or the backplane of the chassis through an interface such as a PCI. In addition, FIG. 49 illustrates two computation nodes, but further more nodes may be mounted on the chassis and coupled to the I/O node 3. Furthermore, a plurality of I/O nodes 3 may be mounted on one chassis.

Further, the computation node 2 in FIG. 49 includes only an interface for the coupling with the I/O node 3, but interfaces for the communication between the computation nodes, the communication with the management server, and the communication with another computer system 1 may be separately included. Similarly, the I/O node 3 may also separately include the interfaces for the communication between the I/O nodes, the communication with the management server, and the communication with another computer system.

In Example 5 or 6, the control-target cache area is not limited to the local cache area 214 or the virtual areas 2141, 2142, and 2413. Specifically, a typical cache area may be used as the control target without logically dividing the cache area 24001 into the local cache area 214 and the virtual areas 2141, 2142, and 2413.

A number of examples have been explained hereinabove, but the present invention is not limited to these examples. In addition, in Examples 1 to 6, even if the components have the same symbols, it cannot be said that at least one of the function and the configuration is the same. For example, the computation node 2 in Examples 1 to 3 has a function different from the computation node 2 in at least one of Examples 4 to 6 as can be known from the explanation. In addition, "swap out" in the explanation of the example is to drive out first data in a first storage area to a second storage area, and replace the first data in the first storage area with second data. Further, a time when the data is written from the first storage area (for example, the local cache area) to the second storage area (for example, the shared cache area) is not limited to the time of swapping-out. For example, in a case where it is detected that the free capacity ratio of the first storage area is less than a predetermined value, the free capacity ratio of the first storage area may be controlled to be equal to or larger than a predetermined value by migrating the data from the first storage area to the second storage area.

REFERENCE SIGNS LIST

1 Computer system
2 Computation node
3 I/O node

The invention claimed is:

1. A computer system comprising:
a plurality of nodes, wherein
the plurality of nodes include an I/O (Input/Output) node and a plurality of computation nodes which are coupled to the I/O node and send an I/O request to the I/O node,
the I/O node includes a first storage device, which stores data written or read according to the I/O request and a first memory device on which a first cache area is based to temporarily store the data written in the first storage device or read from the first storage device,
one of the computation nodes includes a second memory device on which a second cache area is based to temporarily store the data according to the I/O request,
at least one of the I/O node and the one of the computation nodes stores management information containing physical storage area information on a physical storage area in the cache area of the other of the I/O node and the one of the computation nodes, and virtual storage area information on a virtual storage area associated with the physical storage area and having a part of its own cache area, and
a target node in the plurality of nodes controls arrangement of data stored in the second cache area based on the stored management information,
the target node is the computation node,
the computation node includes a second storage device, uses a part of the second storage device as a part of the second cache area, and uses a plurality of storage areas in the second cache area based on a plurality of priorities corresponding to the plurality of the storage areas, and
in the second cache area, an area based on the second memory device of the computation node has the highest priority, an area based on the second memory device of another computation node has the second highest priority, an area based on the second storage device of the computation node has the third highest priority, and an area based on the second storage device of the other computation node has the fourth highest priority.

2. The computer system according to claim 1, wherein
the plurality of nodes includes a management node which is coupled to the plurality of computation nodes and the I/O nodes,
the target node is the management node,
the plurality of computation nodes perform a plurality of application programs which contain a first application program,
the plurality of computation nodes includes a first computation node which performs the first application program,
the application program is associated with a performance condition,
the management node controls arrangement of data to be stored in the second cache area by performing any one of migration of the first application program from the first computation node to a second computation node and accommodation of a part of the second cache area of a third computation node to the first computation node,
the second computation node is any one of computation node other than the first computation node, and
the third computation node is any one of computation node other than the first computation node, and is the second computation node or a computation node different from the second computation node.

3. The computer system according to claim 1, wherein
the plurality of computation nodes includes a first computation node which is any one of the plurality of computation nodes, and
the first computation node is configured to
migrate data from the second cache area of the first computation node to the second cache area of a second computation node,
migrate data from the second cache area of the second computation node to an area which is a part of the second cache area of the first computation node and based on the second storage device of the first computation node, and
migrate data from an area which is a part of the second cache area of the first computation node and based on the second storage device of the first computation node to an area which is a part of the second cache area of a third computation node and based on the second storage device of the third computation node, the second computation node is any one of computation node other than the first computation node, and the third computation node is any one of computation node other than the first computation node, and is the second computation node or a computation node different from the second computation node.

4. A computer system comprising:

a plurality of nodes, wherein the plurality of nodes include an I/O (Input/Output) node and a plurality of computation nodes which are coupled to the I/O node and send an I/O request to the I/O node, the I/O node includes a first storage device, which stores data written or read according to the I/O request and a first memory device on which a first cache area is based to temporarily store the data written in the first storage device or read from the first storage device, one of the computation nodes includes a second memory device on which a second cache area is based to temporarily store the data according to the I/O request, at least one of the I/O node and the one of the computation nodes stores management information containing physical storage area information on a physical storage area in the cache area of the other of the I/O node and the one of the computation nodes, and virtual storage area information on a virtual storage area associated with the physical storage area and having a part of its own cache area, and a target node in the plurality of nodes controls arrangement of data stored in the second cache area based on the stored management information, the target node is the one of the computation nodes, the first cache area includes a normal area and a shared area, the normal area is a storage area, which temporarily stores data to be written in the first storage device or to be read from the first storage device according to the I/O request, the shared area is a storage area associated with a virtual shared area, which is a first virtual storage area managed by the computation node, in the one of the computation nodes, the virtual shared area is a part of the second cache area, the management information of the one of the computation nodes contains information on a virtual local area which is a second virtual storage area associated with a storage area of the second storage area of another computation node, and information indicating an association between an area and data, the plurality of computation nodes includes a first computation node, which is any one of the plurality of computation nodes, and a second computation node, which is any one of computation node other than the first computation node, the first computation node specifies read-target first data based on the management information of the first computation node, the first data being in the virtual local area associated with the storage area of the second cache area of the second computation node, in a case where the first data is acquired from the second cache area of the second computation node, the first computation node or the second computation node causes the I/O node to store the first data in the shared area based on the management information of the computation node, and the second computation node invalidates the first data in the second cache area of the second computation node.

5. The computer system according to claim 4, wherein the first computation node is configured to send a first read request specifying an address of the shared area to the I/O node based on the management information of the first computation node in a case where it is specified that the first data is in the virtual shared area, receive the first data from the I/O node, and write the first data in the second cache area of the first computation node.

6. The computer system according to claim 5, wherein after sending the first read request, the first computation node determines whether or not there occurs a cache hit indicating the first data is in the virtual shared area, and in a case where the determination result is true, the first data received by the first computation node from the I/O node is first data received in response to the first read request.

7. The computer system according to claim 6, wherein in a case where the determination result is false, the first computation node sends a second read request specifying an address of the first data to the I/O node, and the first data received by the first computation node from the I/O node is first data received in response to the second read request.

8. The computer system according to claim 6, wherein in a case where a response time of the first read request exceeds a predetermined value, or in a case where the response to the first read request indicates a cache miss, the determination result becomes false.

9. The computer system according to claim 4, wherein the first computation node or the second computation node sends a read request specifying an address of the first data and an address of the shared area toward the I/O node based on the management information of the computation node, and the I/O node reads the first data from the first storage device to the shared area.

10. The computer system according to claim 4, wherein the first computation node or the second computation node sets the first data as a write target, specifies an address of the shared area, and sends a write request not specifying an address related to the first storage device to the I/O node based on the management information of the computation node, and the I/O node writes the first data in the shared area.

11. The computer system according to claim 4, wherein the first computation node or the second computation node notifies the other computation nodes about that the first data is in the shared area from among the shared area and the second cache area of the first computation node.

12. The computer system according to claim 11, wherein the management node is configured to determine whether or not the first application program is migrated to the second computation node, migrate the first application program to the second node in a case where the determination result is true, and accommodate a part of the second cache area of the third computation node to the third computation node in a case where the determination result is false.

13. The computer system according to claim 11, wherein a performance condition is satisfied when a performance exceeds a performance threshold, the first application program is an application program in which the performance threshold is equal to or larger than a maximum request number and a difference between the performance threshold and the maximum request number is maximized, or an application program in which the performance threshold is equal to or less than a maximum performance and a difference between the performance threshold and the maximum performance is maximized, the maximum request number of each application program is a maximum number of requests processed per unit time by the application program, and the maximum performance of each application program is a value calculated based on a capacity of the second cache area of the computation node which performs the application program, and is a performance which is expected to be exhibited by the application program.

14. A cache control method which is performed by a computer system including a plurality of nodes, the plurality of nodes including an I/O (Input/Output) node and a plurality of computation nodes which are coupled to the I/O node and send an I/O request to the I/O node, the I/O node including a first storage device, which stores data written or read according to the I/O request and a first memory device on which a first cache area is based to temporarily store the data written in the first storage device or read from the first storage device, and one of the computation nodes including a second memory device on which a second cache area is based to temporarily store the data according to the I/O request, the cache control method comprising:

storing, by at least one of the I/O node and the one of the computation nodes, management information containing physical storage area information on a physical storage area in the cache area of the other of the I/O node and the one of the computation nodes, and virtual storage area information on a virtual storage area associated with the physical storage area and having a part of its own cache area, and controlling, by a target node in the plurality of nodes, arrangement of data stored in the second cache area based on the stored management information, wherein the target node is the computation node, the computation node includes a second storage device, uses a part of the second storage device as a part of the second cache area, and uses a plurality of storage areas in the second cache area based on a plurality of priorities corresponding to the plurality of the storage areas, and in the second cache area, an area based on the second memory device of the computation node has the highest priority, an area based on the second memory device of another computation node has the second highest priority, an area based on the second storage device of the computation node has the third highest priority, and an area based on the second storage device of the other computation node has the fourth highest priority.

* * * * *